United States Patent
Hatakeyama et al.

(10) Patent No.: US 12,506,985 B2
(45) Date of Patent: Dec. 23, 2025

(54) RANGE IMAGING DEVICE AND RANGE IMAGING METHOD

(71) Applicant: TOPPAN Inc., Tokyo (JP)

(72) Inventors: Kunihiro Hatakeyama, Taito-ku (JP); Tomohiro Nakagome, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 129 days.

(21) Appl. No.: 18/355,978

(22) Filed: Jul. 20, 2023

(65) Prior Publication Data

US 2024/0022833 A1 Jan. 18, 2024

Related U.S. Application Data

(63) Continuation of application No. PCT/JP2022/002193, filed on Jan. 21, 2022.

(30) Foreign Application Priority Data

Jan. 21, 2021 (JP) ................................. 2021-008218
Jan. 21, 2021 (JP) ................................. 2021-008219

(51) Int. Cl.
H04N 25/705 (2023.01)
(52) U.S. Cl.
CPC .................. H04N 25/705 (2023.01)
(58) Field of Classification Search
CPC ...... H04N 25/705; H04N 5/33; H04N 25/771; G01C 3/08; G01S 7/4816; G01S 7/4863; G01S 7/4876; G01S 7/4865; G01S 17/894
See application file for complete search history.

(56) References Cited

U.S. PATENT DOCUMENTS

| | | | |
|---|---|---|---|
| 2006/0192938 A1 | 8/2006 | Kawahito | |
| 2019/0391238 A1* | 12/2019 | Barnes | G01S 7/4808 |
| 2023/0358863 A1* | 11/2023 | Takahashi | H04N 25/532 |
| 2023/0358889 A1* | 11/2023 | Ookubo | G01S 7/497 |
| 2023/0366990 A1* | 11/2023 | Hatakeyama | G01S 7/4814 |

FOREIGN PATENT DOCUMENTS

| | | |
|---|---|---|
| JP | 4235729 B | 3/2009 |
| JP | 2019-219400 A | 12/2019 |

OTHER PUBLICATIONS

International Search Report issued Mar. 29, 2022 in PCT/JP 2022/002193, filed Jan. 21, 2022, 5 pages.

* cited by examiner

*Primary Examiner* — Shahbaz Nazrul
(74) *Attorney, Agent, or Firm* — Oblon, McClelland, Maier & Neustadt, L.L.P.

(57) ABSTRACT

A range imaging device includes a light source unit, a light-receiving unit that includes pixel driving circuit and a pixel including a photoelectric conversion element and charge storage units, a storage unit that stores table information in which electric charge ratios are associated with corresponding distances to an object, and a range image processing unit that determines a measured distance to an object using the table information and the amounts of electric charge accumulated in the charge storage units. The range image processing unit calculates the electric charge ratio based on the amounts of electric charge accumulated in the charge storage units, acquires the corresponding distance associated with the calculated electric charge ratio from the table information, and determines the measured distance using the acquired corresponding distance.

24 Claims, 24 Drawing Sheets

FIG.5A

| | R1 | R2 | R3 | R4 | ... |
|---|---|---|---|---|---|
| Qint1 | D11 | D12 | D13 | D14 | ... |

| | R1 | R2 | R3 | R4 | ... |
|---|---|---|---|---|---|
| Qint2 | D21 | D22 | D23 | D24 | ... |

| | R1 | R2 | R3 | R4 | ... |
|---|---|---|---|---|---|
| Qint3 | D31 | D32 | D33 | D34 | ... |

| | R1 | R2 | R3 | R4 | ... |
|---|---|---|---|---|---|
| Qint4 | D41 | D42 | D43 | D44 | ... |

440

|  | R1 | R2 | R3 | R4 | ... |
|---|---|---|---|---|---|
| Qint < Th | D311 | D312 | D313 | D314 | ... |
| Qint ≧ Th | D321 | D322 | D323 | D324 | ... |

440A

|  | R1 | R2 | R3 | R4 | ... |
|---|---|---|---|---|---|
| Th1 ≦ Qint < Th2 | D411 | D412 | D413 | D414 | ... |
| Th2 ≦ Qint < Th3 | D421 | D422 | D423 | D424 | ... |
| ... | ... | ... | ... | ... | ... |

440B

|  | R1 | R2 | R3 | R4 | ... |
|---|---|---|---|---|---|
| Qint1 | D111 | D112 | D113 | D114 | ... |
| Qint2 | D121 | D122 | D123 | D124 | ... |
| Qint3 | D131 | D132 | D133 | D134 | ... |
| Qint4 | D141 | D142 | D143 | D144 | ... |
| ... | ... | ... | ... | ... | ... |

440C

|  | R1 | R2 | R3 | R4 | ... |
|---|---|---|---|---|---|
| Qint1 | D211 | D212 | D213 | D214 | ... |
| Qint2 | D221 | D222 | D223 | D224 | ... |
| Qint3 | D231 | D232 | D233 | D234 | ... |
| Qint4 | D241 | D242 | D243 | D244 | ... |
| ... | ... | ... | ... | ... | ... |

440D

| THRESHOLD ELECTRIC CHARGE RATIO | R5 | | | | | | | | |
|---|---|---|---|---|---|---|---|---|---|
| TABLE INTERVAL | TK2 | | | | TK3 | | | | |
| ELECTRIC CHARGE RATIO | R1 | R2 | R3 | R4 | R5 | R6 | R7 | R8 | R9 ... |
| DISTANCE | D1 | D2 | D3 | D4 | D5 | D6 | D7 | D8 | D9 ... |

FIG.29

| TIME WINDOW | \multicolumn{9}{l}{Q1Q2} | |
|---|---|---|---|---|---|---|---|---|---|
| THRESHOLD ELECTRIC CHARGE RATIO | R5 | | | | | | | | |
| TABLE INTERVAL | TK2 | | | | TK3 | | | | |
| ELECTRIC CHARGE RATIO | R1 | R2 | R3 | R4 | R5 | R6 | R7 | R8 | R9 | ... |
| DISTANCE | D1 | D2 | D3 | D4 | D5 | D6 | D7 | D8 | D9 | ... |

| TIME WINDOW | Q2Q3 | | | | | | | | |
|---|---|---|---|---|---|---|---|---|---|
| THRESHOLD ELECTRIC CHARGE RATIO | R15 | | | | | | | | |
| TABLE INTERVAL | TK4 | | | | TK5 | | | | |
| ELECTRIC CHARGE RATIO | ... | R11 | R12 | R13 | R14 | R15 | R16 | R17 | R18 | R19 |
| DISTANCE | ... | D11 | D12 | D13 | D14 | D15 | D16 | D17 | D18 | D19 |

540B

RANGE IMAGING DEVICE AND RANGE IMAGING METHOD

CROSS-REFERENCE TO RELATED APPLICATIONS

The present application is a continuation of and claims the benefit of priority to International Application No. PCT/JP2022/002193, filed Jan. 21, 2022, which is based upon and claims the benefit of priority to Japanese Applications No. 2021-008218, filed Jan. 21, 2021 and No. 2021-008219, filed Jan. 21, 2021. The entire contents of these applications are incorporated herein by reference.

BACKGROUND OF THE INVENTION

Field of the Invention

The present invention relates to range imaging devices and range imaging methods.

Description of Background Art

For example, JP 4235729 B describes a technique for calculating the distance by sequentially distributing electric charge to three charge storage units provided for each pixel. The entire contents of this publication are incorporated herein by reference.

SUMMARY OF THE INVENTION

According to one aspect of the present invention, a range imaging device includes a light source that emits an optical pulse to a measurement space, a storage unit that stores table information in which an electric charge ratio is associated with a corresponding distance to an object, a light-receiving unit including a pixel driving circuit and a pixel including a photoelectric conversion element and charge storage units, and a range image processing unit including circuitry that determines a measured distance to the object in the measurement space using the table information and an amount of electric charge accumulated in each of the charge storage units. The photoelectric conversion element in the pixel of the light-receiving unit generates electric charge corresponding to incident light, the charge storage units in the pixel of the light-receiving unit store the electric charge, the pixel driving circuit in the light-receiving unit distributes and accumulates the electric charge in each of the charge storage units in the pixel at a predetermined time in synchronization with the emission of the optical pulse, the circuitry of the range image processing unit calculates the electric charge ratio based on the amount of electric charge accumulated in each of the charge storage units, acquires the corresponding distance associated with the calculated electric charge ratio from the table information, and determines the measured distance using the acquired corresponding distance.

According to another aspect of the present invention, a range imaging method includes emitting an optical pulse to a measurement space, and determining a measured distance to an object in the measurement space using table information and an amount of electric charge accumulated in each of charge storage units. A range imaging device executes the range imaging method and includes a light source that emits the optical pulse to the measurement space, a storage unit that stores the table information in which an electric charge ratio is associated with a corresponding distance to the object, a light-receiving unit including a pixel driving circuit and a pixel including a photoelectric conversion element and charge storage units, and a range image processing unit including circuitry that determines the measured distance to the object in the measurement space using the table information and the amount of electric charge accumulated in each of the charge storage units, the photoelectric conversion element in the pixel of the light-receiving unit generates the electric charge corresponding to incident light, the charge storage units in the pixel of the light-receiving unit store the electric charge, the pixel driving circuit in the light-receiving unit distributes and accumulates the electric charge in each of the charge storage units in the pixel at a predetermined time in synchronization with the emission of the optical pulse, the circuitry of the range image processing unit calculates the electric charge ratio based on the amount of electric charge accumulated in each of the charge storage units, acquires the corresponding distance associated with the calculated electric charge ratio from the table information, and determines the measured distance using the acquired corresponding distance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A shows an example structure of table information according to the first embodiment of the present invention;

FIG. 5B shows an example structure of table information according to the first embodiment of the present invention;

FIG. 5C shows an example structure of table information according to the first embodiment of the present invention;

FIG. 5D shows an example structure of table information according to the first embodiment of the present invention;

FIG. 29 shows an example structure of table information according to the modification of the second embodiment of the present invention;

FIG. 30 shows an example structure of table information according to the modification of the second embodiment of the present invention;

DETAILED DESCRIPTION OF THE EMBODIMENTS

Figure 1:
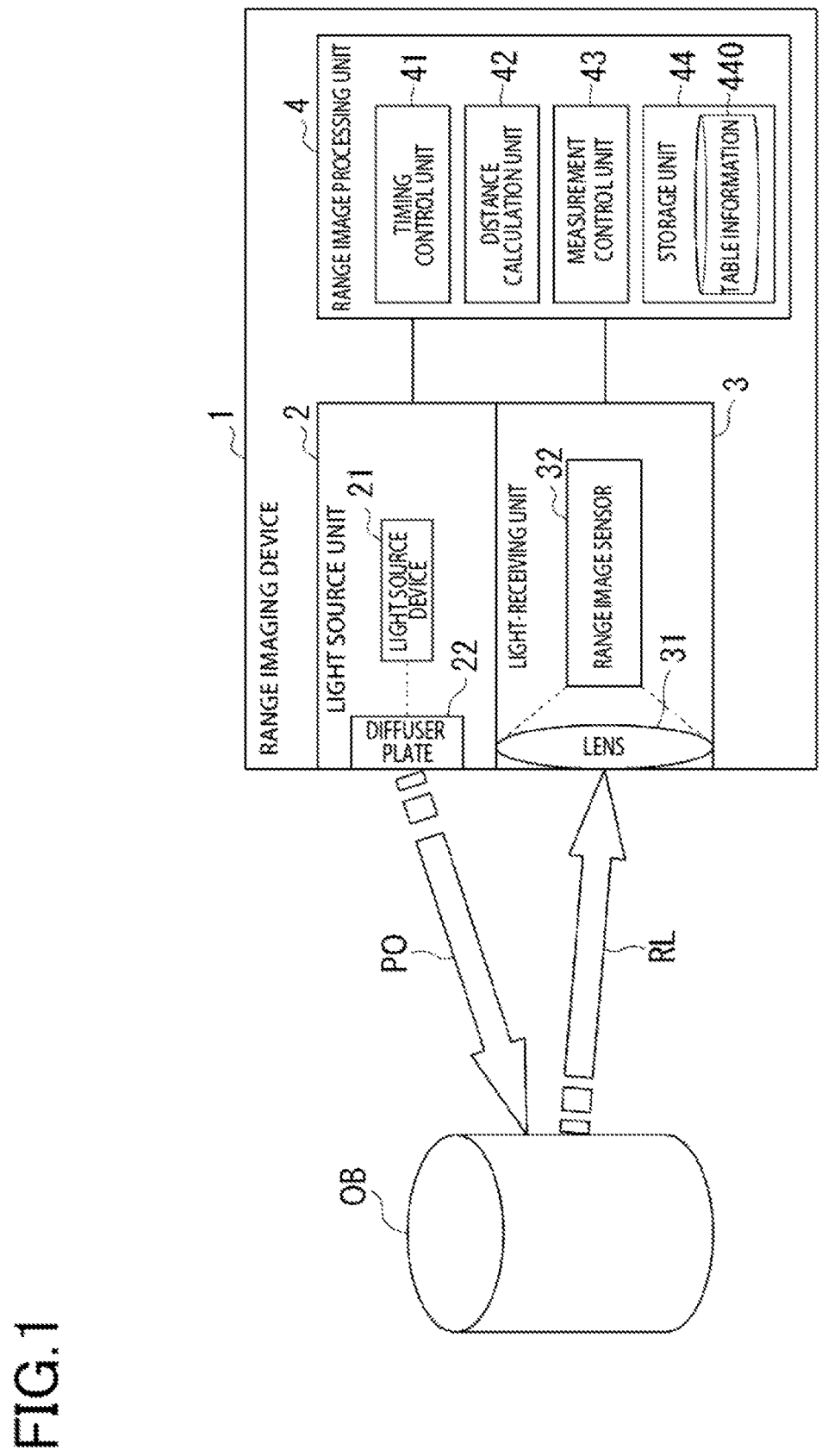
FIG. 1 is a schematic block diagram of a range imaging device according to a first embodiment of the present invention.

Embodiments will now be described with reference to the accompanying drawings, wherein like reference numerals designate corresponding or identical elements throughout the various drawings.

First Embodiment

A range imaging device according to a first embodiment will now be described with reference to the drawings.

The first embodiment will be described first. FIG. 1 is a schematic block diagram of a range imaging device 1 according to the first embodiment of the present invention. The range imaging device 1 having the configuration illustrated in FIG. 1 includes a light source unit 2, a light-receiving unit 3, and a range image processing unit 4. In FIG. 1, an object OB subjected to distance measurement in the range imaging device 1 is also illustrated together with the range imaging device 1.

In accordance with control from the range image processing unit 4, the light source unit 2 emits an optical pulse PO to a space to be imaged where the object OB subjected to distance measurement in the range imaging device 1 is located. The light source unit 2 is, for example, a surface emitting semiconductor laser module such as a vertical cavity surface emitting laser (VCSEL). The light source unit 2 includes a light source device 21 and a diffuser plate 22.

The light source device 21 is a light source that emits near-infrared laser light (for example, in the wavelength range of 850 nm to 940 nm) to be the optical pulse PO applied to the object OB. The light source device 21 is, for example, a semiconductor laser light emitting device. The light source device 21 emits pulsed laser light in accordance with control from a timing control unit 41.

The diffuser plate 22 is an optical component that diffuses the near-infrared laser light emitted from the light source device 21 over the area of a surface for application to the object OB. The pulsed laser light diffused by the diffuser plate 22 is emitted as the optical pulse PO and applied to the object OB.

The light-receiving unit 3 receives reflected light RL resulting from the optical pulse PO reflected by the object OB subjected to distance measurement in the range imaging device 1 and outputs a pixel signal corresponding to the received reflected light RL. The light-receiving unit 3 includes a lens 31 and a range image sensor 32.

The lens 31 is an optical lens that guides the incident reflected light RL to the range image sensor 32. The lens 31 emits the incident reflected light RL to the range image sensor 32, causing the reflected light RL to be received by (incident on) pixels included in the light receiving area of the range image sensor 32.

The range image sensor 32 is an imaging device used in the range imaging device 1. The range image sensor 32 includes multiple pixels in its two-dimensional light receiving area. The pixels of the range image sensor 32 each include a single photoelectric conversion element, multiple charge storage units corresponding to the single photoelectric conversion element, and a component that distributes electric charge to each charge storage unit. In other words, each pixel is a distribution imaging element that causes electric charge to be distributed and accumulated in the charge storage units.

In accordance with control from the timing control unit 41, the range image sensor 32 distributes electric charge generated by the photoelectric conversion element to each charge storage unit. The range image sensor 32 also outputs a pixel signal corresponding to the amount of the electric charge distributed to the charge storage units. The range image sensor 32, in which the multiple pixels are positioned in a two-dimensional matrix, outputs a one-frame pixel signal corresponding to each pixel.

The range image processing unit 4 controls the range imaging device 1 and calculates the distance to the object OB. The range image processing unit 4 includes the timing control unit 41, a distance calculation unit 42, a measurement control unit 43, and a storage unit 44. Some of the functional components of the range image processing unit 4 (the timing control unit 41, the distance calculation unit 42, the measurement control unit 43, and the storage unit 44) may be incorporated in the range image sensor 32.

Responsive to control by the measurement control unit 43, the timing control unit 41 controls the output timing of various control signals needed for measurement. Examples of the various control signals include a signal for controlling the emission of the optical pulse PO, a signal for distributing and accumulating the reflected light RL in the charge storage units, and a signal for controlling the number of distributions (the accumulation count) per frame. The number of distributions refers to the number of times the process of distributing electric charge to charge storage units CS (see FIG. 3) is repeated. The product of the number of charge distributions and the time during which electric charge is accumulated in each charge storage unit CS per charge distribution process (accumulation time Ta described later) is the exposure time.

The distance calculation unit 42 calculates the distance to the object OB based on the pixel signal output from the range image sensor 32 and outputs the calculated distance information. The distance calculation unit 42 calculates the distance to the object OB based on the amounts of the electric charge accumulated in multiple charge storage units CS.

In the first embodiment, the distance calculation unit 42 determines the distance to the object OB using table information 440 described later. The table information 440 will be described in detail later. The way the distance calculation unit 42 determines the distance to the object OB using the table information 440 will also be described in detail later.

The measurement control unit 43 controls the timing control unit 41. For example, the measurement control unit 43 sets parameters such as the number of distributions and the accumulation time Ta for one frame and controls the timing control unit 41 to capture an image based on the set parameters.

The storage unit 44 includes a storage medium, such as a hard disk drive (HDD), a flash memory, an electrically erasable programmable read-only memory (EEPROM), a random access read/write memory (RAM), or a read-only memory (ROM), or any combination of these storage media. For example, the storage unit 44 stores the table information 440. The table information 440 will be described in detail later.

In the range imaging device 1 with this configuration, the light-receiving unit 3 receives the reflected light RL resulting from the near-infrared optical pulse PO emitted by the light source unit 2 to the object OB and reflected by the object OB, and the range image processing unit 4 outputs the distance information obtained by measuring the distance to the object OB.

Although FIG. 1 illustrates the range imaging device 1 with the range image processing unit 4 inside, the range image processing unit 4 may be a component outside the range imaging device 1.

Figure 2:
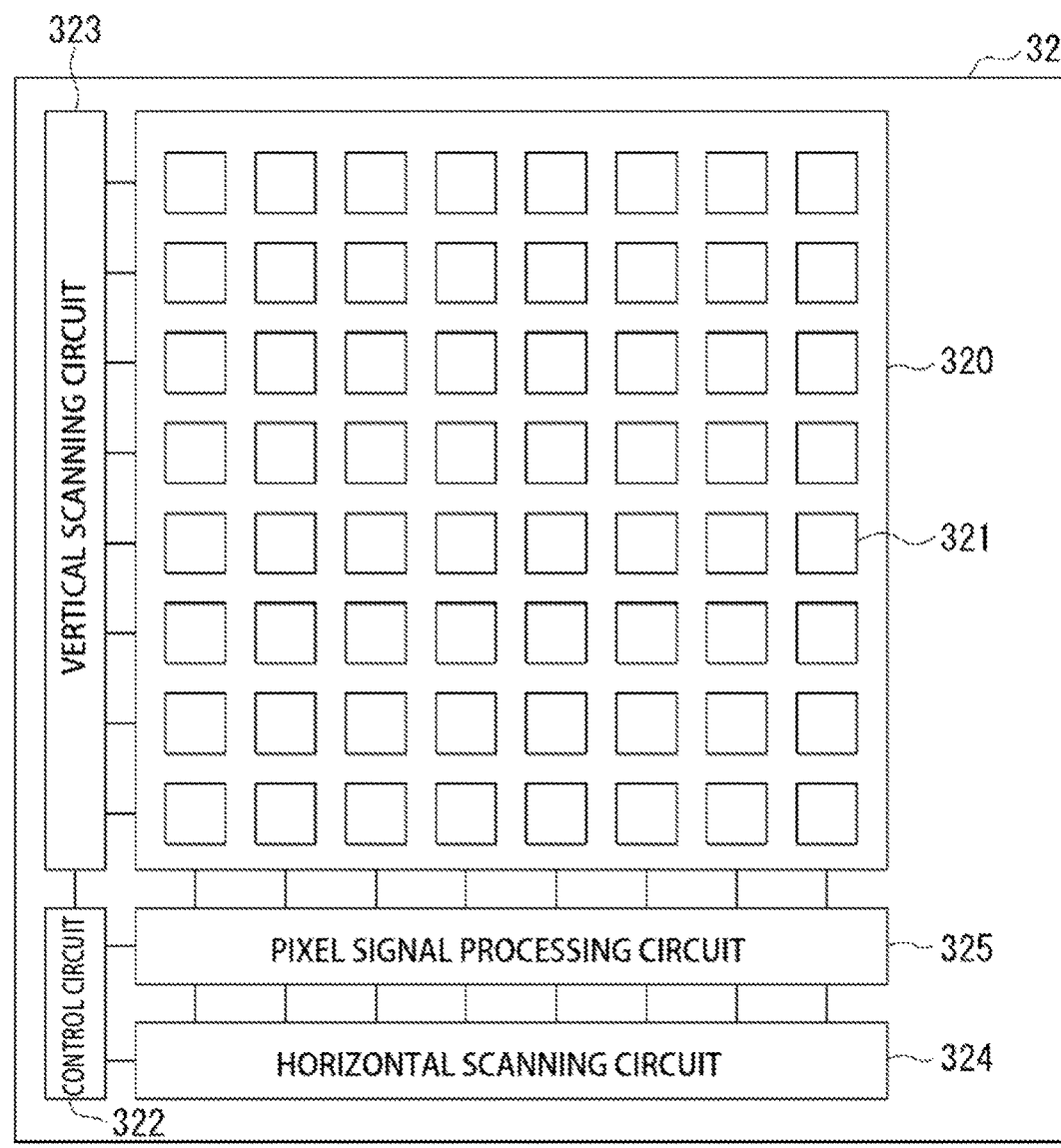
FIG. 2 is a schematic block diagram of a range image sensor according to the first embodiment of the present invention.

The configuration of the range image sensor 32 used as an imaging device in the range imaging device 1 will now be described. FIG. 2 is a schematic block diagram of the imaging device (the range image sensor 32) used in the range imaging device 1 according to the embodiment.

As illustrated in FIG. 2, the range image sensor 32 includes, for example, a light receiving area 320 in which multiple pixels 321 are positioned, a control circuit 322, a vertical scanning circuit 323 having the distribution function, a horizontal scanning circuit 324, and a pixel signal processing circuit 325.

The light receiving area 320 is an area in which the multiple pixels 321 are positioned, and FIG. 2 illustrates an example arrangement that is an 8 by 8 two-dimensional matrix. The pixels 321 store electric charge corresponding to the intensity of received light. The control circuit 322 centrally controls the range image sensor 32. For example, the control circuit 322 controls the operation of the components in the range image sensor 32 based on instructions from the timing control unit 41 in the range image processing unit 4. It is noted that the components included in the range image sensor 32 may be directly controlled by the timing control unit 41. In this case, the control circuit 322 may be omitted.

The vertical scanning circuit 323 is a circuit that controls the pixels 321 positioned in the light receiving area 320, on a row-by-row basis in accordance with control from the control circuit 322. The vertical scanning circuit 323 causes the voltage signal corresponding to the amount of electric charge accumulated in each charge storage unit CS of each pixel 321 to be output to the pixel signal processing circuit 325. In this case, the vertical scanning circuit 323 distributes the electric charge produced through conversion by the photoelectric conversion element to each charge storage unit in the pixel 321. In other words, the vertical scanning circuit 323 is an example of a pixel driving circuit.

The pixel signal processing circuit 325 is a circuit that, in accordance with control from the control circuit 322, performs predetermined signal processing (for example, noise suppression processing or A/D conversion processing) on voltage signals output from the pixels 321 in each column to the corresponding vertical signal line.

The horizontal scanning circuit 324 is a circuit that, in accordance with control from the control circuit 322, causes signals output from the pixel signal processing circuit 325 to be sequentially output to a horizontal signal line. As a result, the pixel signals corresponding to the amounts of electric charge accumulated for one frame is sequentially output to the range image processing unit 4 through the horizontal signal line.

In the following description, the pixel signal processing circuit 325 performs A/D conversion processing, and pixel signals are digital signals.

Figure 3:
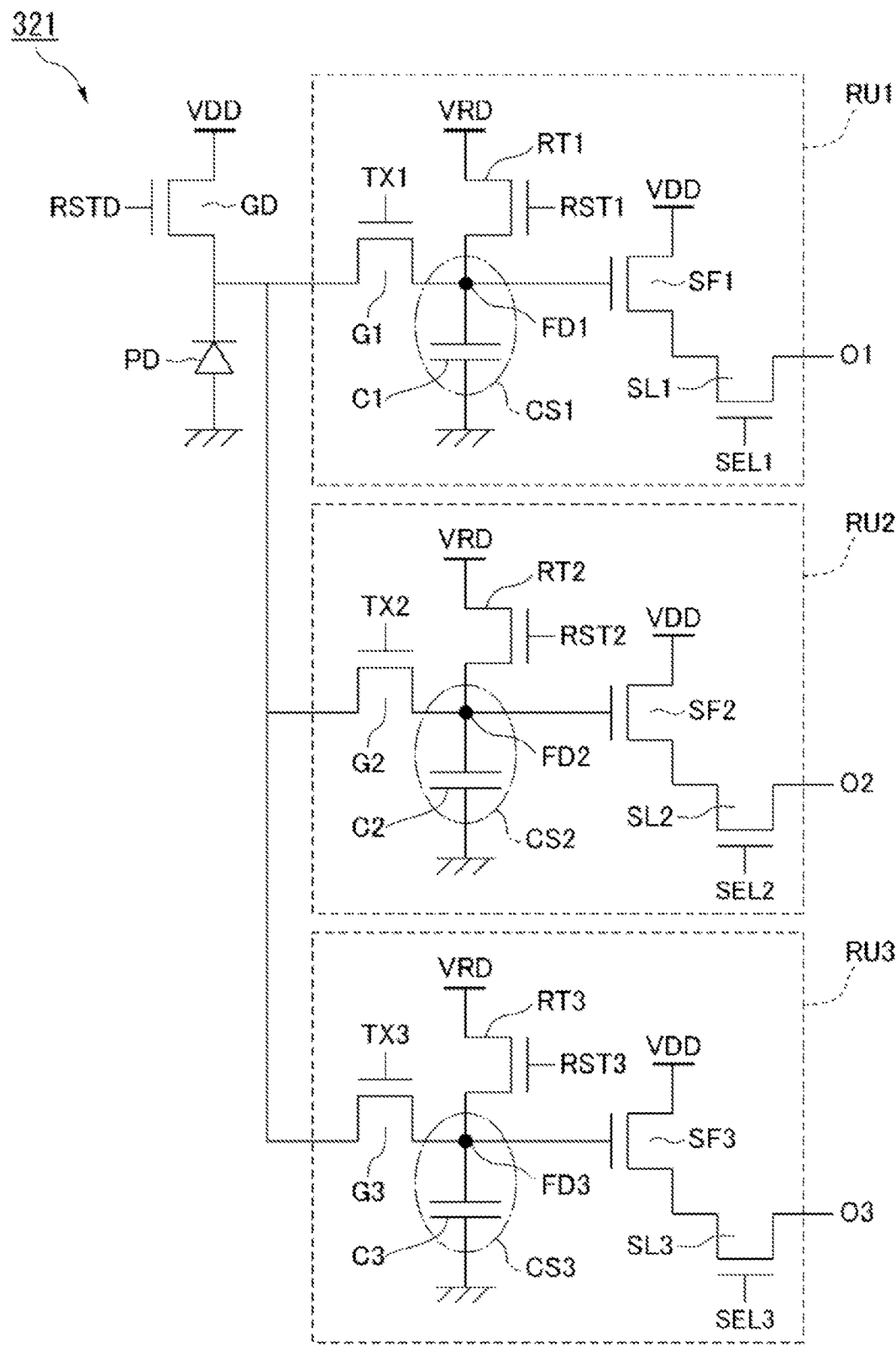
FIG. 3 is a circuit diagram illustrating an example of the structure of a pixel according to the first embodiment of the present invention.

The structure of the pixels 321 positioned in the light receiving area 320 included in the range image sensor 32 will now be described. FIG. 3 is a circuit diagram illustrating an example of the structure of the pixels 321 positioned in the light receiving area 320 of the range image sensor 32 according to the embodiment. FIG. 3 shows an example of the structure of one pixel 321 of the multiple pixels 321 positioned in the light receiving area 320. The pixel 321 is an example of the structure including three pixel signal readout units.

As illustrated in FIG. 3, the pixel 321 includes a single photoelectric conversion element PD, a drain gate transistor GD, and three pixel signal readout units RU that output a voltage signal through their corresponding output terminals O. Each of the pixel signal readout units RU includes a readout gate transistor G, a floating diffusion FD, a charge storage capacitor C, a reset gate transistor RT, a source follower gate transistor SF, and a selection gate transistor SL. In each pixel signal readout unit RU, the floating diffusion FD and the charge storage capacitor C form a charge storage unit CS.

In FIG. 3, the three pixel signal readout units RU are distinguished from each other by adding the numerals 1, 2, and 3 after the reference signs "RU" of the individual pixel signal readout units RU. Similarly to the three pixel signal readout units RU, the components included in the three pixel signal readout units RU are also distinguished from each other by adding the numerals of their corresponding pixel signal readout units RU after the reference signs of the components.

In the pixel 321 illustrated in FIG. 3, a pixel signal readout unit RU1 that outputs a voltage signal through an output terminal O1 includes a readout gate transistor G1, a floating diffusion FD1, a charge storage capacitor C1, a reset gate transistor RT1, a source follower gate transistor SF1, and a selection gate transistor SL1. In the pixel signal readout unit RU1, the floating diffusion FD1 and the charge storage capacitor C1 form a charge storage unit CS1. A pixel signal readout unit RU2 and a pixel signal readout unit RU3 have a structure similar to the structure of the pixel signal readout unit RU1.

The photoelectric conversion element PD is an embedded photodiode that photoelectrically converts incident light to generate electric charge and accumulates the generated electric charge. The photoelectric conversion element PD may have any structure. The photoelectric conversion element PD may be, for example, a PN photodiode with a p-type semiconductor and an n-type semiconductor joined together or a PIN photodiode with an I-type semiconductor sandwiched between a p-type semiconductor and an n-type semiconductor. The photoelectric conversion element PD is not limited to a photodiode, but it may be, for example, a photogate photoelectric conversion element.

In the pixel 321, the electric charge generated by the photoelectric conversion element PD through the photoelectric conversion of the incident light is distributed to each of the three charge storage units CS, and voltage signals corresponding to the amounts of the distributed electric charge are output to the pixel signal processing circuit 325.

The structure of the pixels positioned in the range image sensor 32 is not limited to the structure including the three pixel signal readout units RU as illustrated in FIG. 3, but the pixels may have a structure including multiple pixel signal readout units RU. In other words, each of the pixels positioned in the range image sensor 32 may include two or four or more pixel signal readout units RU (charge storage units CS).

In the structure of the pixel 321 illustrated as an example in FIG. 3, the charge storage unit CS is formed by the floating diffusion FD and the charge storage capacitor C. However, the charge storage unit CS may be formed by at least the floating diffusion FD, and the pixel 321 may not include the charge storage capacitor C.

Although the structure of the pixel 321 illustrated as an example in FIG. 3 includes the drain gate transistor GD, this is not restrictive. For example, in the case where it is unnecessary to discard the electric charge not accumulated in the charge storage unit CS but remaining in the photoelectric conversion element PD, the structure may not include the drain gate transistor GD.

Figure 4:
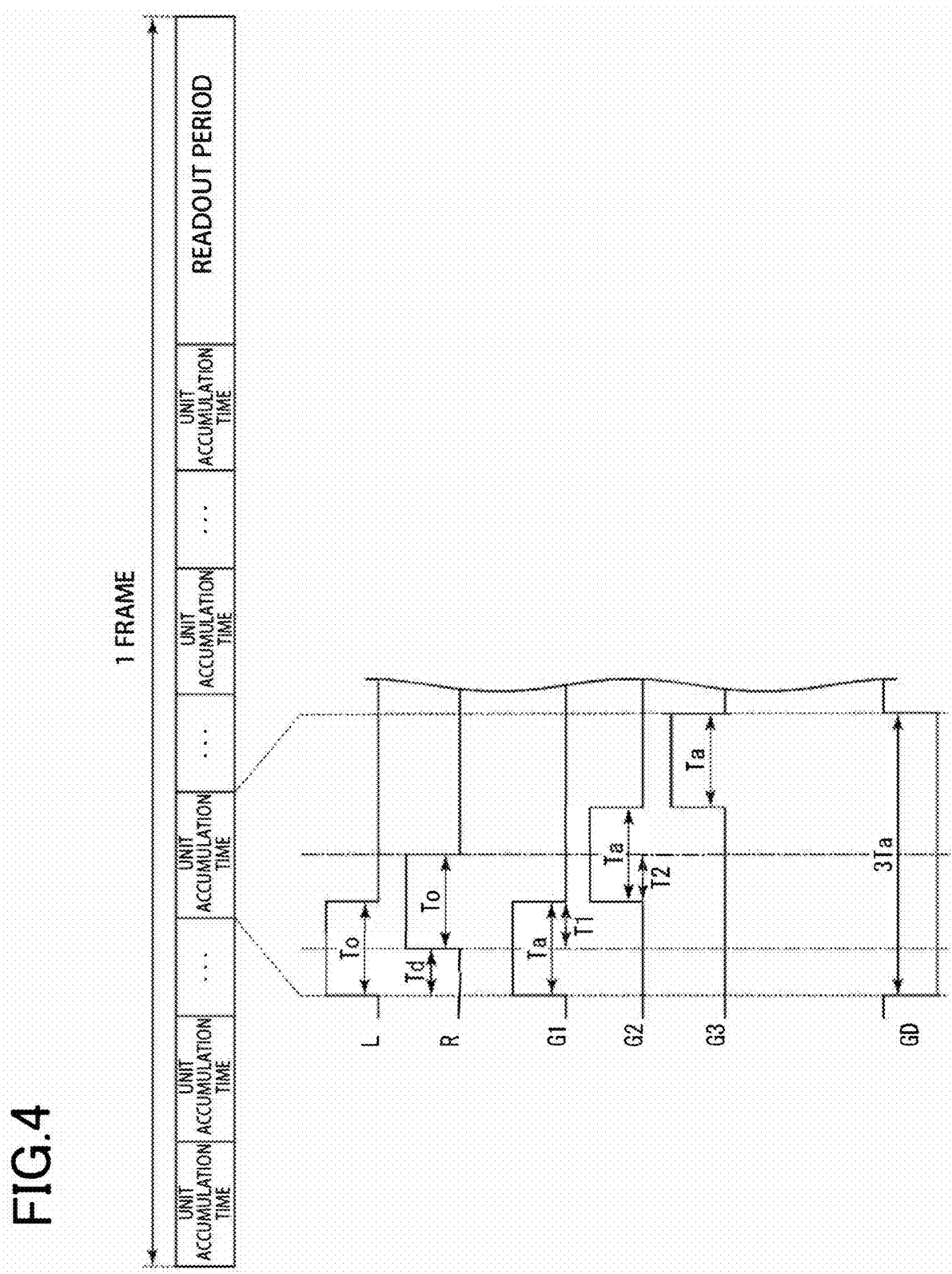
FIG. 4 is a timing chart showing an example of the timing of driving the pixel according to the first embodiment of the present invention.

The timing of driving the pixel 321 will now be described with reference to FIG. 4. FIG. 4 is a timing chart showing the timing of driving the pixel 321 according to the first embodiment.

In FIG. 4, the timing of the emission of the optical pulse PO is indicated in the section named L, the timing of the reception of reflected light is indicated in the section named R, the timing of a drive signal TX1 is indicated in the section named G1, the timing of a drive signal TX2 is indicated in the section named G2, the timing of a drive signal TX3 is indicated in the section named G3, and the timing of a drive signal RSTD is indicated in the section named GD. The drive signal TX1 is a signal for driving the readout gate transistor G1. The drive signals TX2 and TX3 are similar to the drive signal TX1.

As illustrated in FIG. 4, the optical pulse PO is emitted during an emission time To, and the reflected light RL is received by the range image sensor 32 after the elapse of a delay time Td. The vertical scanning circuit 323 accumulates electric charge in the charge storage units CS1, CS2, and CS3 in the stated order in synchronization with the emission of the optical pulse PO. In FIG. 4, the time for the emission of the optical pulse PO and the accumulation of the electric charge in the charge storage units CS1, CS2, and CS3 in the stated order in one distributing process is indicated as a unit accumulation period. After the distributing process for the unit accumulation period is repeated the number of times equal to the accumulation count for one frame, the amount of the electric charge accumulated during this time is read out. The time for the readout of the amount of the accumulated electric charge is indicated as a readout period.

The reception of the reflected light RL from a near object will be described first with reference to FIG. 4. The vertical scanning circuit 323 turns off the drain gate transistor GD and also turns on the readout gate transistor G1 in synchronization with the emission of the optical pulse PO. After the accumulation time Ta has elapsed from when the readout gate transistor G1 is turned on, the vertical scanning circuit 323 turns off the readout gate transistor G1. As a result, the electric charge generated through photoelectric conversion by the photoelectric conversion element PD while the readout gate transistor G1 is controlled in the on state is accumulated in the charge storage unit CS1 via the readout gate transistor G1.

Next, when turning off the readout gate transistor G1, the vertical scanning circuit 323 turns on the readout gate transistor G2 for the accumulation time Ta. As a result, the electric charge generated through photoelectric conversion by the photoelectric conversion element PD while the readout gate transistor G2 is controlled in the on state is accumulated in the charge storage unit CS2 via the readout gate transistor G2.

Next, when ending the accumulation of the electric charge in the charge storage unit CS2, the vertical scanning circuit 323 turns on the readout gate transistor G3, and turns off the readout gate transistor G3 after the elapse of the accumulation time Ta. As a result, the electric charge generated through photoelectric conversion by the photoelectric conversion element PD while the readout gate transistor G3 is controlled in the on state is accumulated in the charge storage unit CS3 via the readout gate transistor G3.

Next, when ending the accumulation of the electric charge in the charge storage unit CS3, the vertical scanning circuit 323 turns on the drain gate transistor GD to discharge the electric charge. As a result, the electric charge generated through photoelectric conversion by the photoelectric conversion element PD is discarded via the drain gate transistor GD.

The vertical scanning circuit 323 repeats the above-described drive the same number of times as the predetermined number of distributions over one frame. Then, the vertical scanning circuit 323 outputs voltage signals corresponding to the amounts of electric charge distributed to the individual charge storage units CS. Specifically, the vertical scanning circuit 323 turns on the selection gate transistor SL1 for a predetermined time, causing the voltage signal corresponding to the amount of the electric charge accumulated in the charge storage unit CS1 through the pixel signal readout unit RU1 to be output from the output terminal O1. Likewise, the vertical scanning circuit 323 turns on the selection gate transistors SL2 and SL3 sequentially, causing the voltage signals corresponding to the amounts of the electric charge accumulated in the charge storage units CS2 and CS3 to be output from the output terminals O2 and O3. Then, the electrical signal corresponding to the amount of the one-frame electric charge accumulated in each of the charge storage units CS1 to CS3 is output to the distance calculation unit 42 through the pixel signal processing circuit 325 and the horizontal scanning circuit 324.

In the example described above, when the readout gate transistor G1 is turned on, the light source unit 2 emits the optical pulse PO. However, this is not restrictive. The light source unit 2 only emits the optical pulse PO at least when the reflected light RL from a near object is received across the charge storage units CS1 and CS2. For example, the light source unit 2 may emit the optical pulse PO before the readout gate transistor G1 is turned on. Additionally, in the example described above, the emission time To for the emission of the optical pulse PO has the same length as the accumulation time Ta. However, this is not restrictive. The emission time To and the accumulation time Ta may be different time intervals.

In the near-range light receiving pixel shown in FIG. 4, on the basis of the relationship between when the optical pulse PO is emitted and when electric charge is accumulated in each of the charge storage units CS1 to CS3, an amount of electric charge corresponding to the reflected light RL and the ambient light component is distributed to and held in the charge storage units CS1 and CS2. The charge storage unit CS3 holds an amount of electric charge corresponding to the ambient light component including background light. In this case, the charge storage units CS1 and CS2 are examples of charge storage units for distance calculation. In this case, the amounts of electric charge corresponding to the reflected light RL accumulated in the charge storage units CS1 and CS2 are examples of the amount of electric charge for distance calculation.

The allocation of electric charge distributed to the charge storage units CS1 and CS2 (distribution ratio) corresponds to a ratio that is based on the delay time Td taken for the optical pulse PO to be reflected by the object OB and enter the range imaging device 1.

For a conventional near-range light receiving pixel, the distance calculation unit 42 calculates the delay time Td based on the above principle using equation (1) below.

$$Td = To \times (Q2-Q3)/(Q1+Q2-2 \times Q3) \quad (1)$$

In the equation, To denotes the period for which the optical pulse PO is emitted, Q1 denotes the amount of electric charge accumulated in the charge storage unit CS1, Q2 denotes the amount of electric charge accumulated in the charge storage unit CS2, and Q3 denotes the amount of electric charge accumulated in the charge storage unit CS3. Equation (1) is based on the assumption that, in the amounts of electric charge accumulated in the charge storage units CS1 and CS2, the amount of electric charge corresponding to the ambient light component is equal to the amount of electric charge accumulated in the charge storage unit CS3.

For the near-range light receiving pixel, the distance calculation unit 42 multiplies the delay time Td determined from equation (1) by the speed (velocity) of light to calculate the round trip distance to the object OB. The distance calculation unit 42 then halves the calculated round trip distance to determine the distance to the object OB.

Factors causing an error in the distance (measured distance) calculated in a conventional range imaging device 1 from the amount of the accumulated electric charge will now be described.

A factor causing such an error may be a signal delay in a circuit in the range imaging device 1. Due to the signal delay, the rectangular signal may be delayed in rising or falling, thus rounding the waveform. In other words, such rounding of the optical pulse and gate pulse waveforms and a delay in charge transfer may cause an error in the measured distance. As a measure against the factor, for example, a method is adopted for correcting the error using a correspondence table in which electric charge ratios R are associated with distances D (an example of table information). The distances herein refer to distances to the object OB.

The electric charge ratio R herein refers to the ratio between the amounts of electric charge accumulated in the two charge storage units CS in which the reflected light RL is distributed and accumulated (the charge storage units CS1 and CS2 in FIG. 4). In this case, the electric charge ratio R is expressed by, for example, equation (2) or (3) below.

$$R = Q1\,\#/(Q1\,\# + Q2\,\#) \quad (2)$$

$$R = Q2\,\#/(Q1\,\# + Q2\,\#) \quad (3)$$

In the equations, $Q1\,\# = Q1 - Qb,$ $Q2\,\# = Q2 - Qb,$

Q1 denotes the amount of electric charge accumulated in the charge storage unit CS1, Q2 denotes the amount of electric charge accumulated in the charge storage unit CS2, and Qb denotes the amount of electric charge corresponding to the ambient light component accumulated in the charge storage units CS.

Even with an error in the distance calculated from equation (1), the use of the correspondence table in which electric charge ratios R are associated with distances D enables the distance to be corrected to reduce the error. A method for calculating the amount of electric charge corresponding to the ambient light component Qb will be described in detail later.

Another error factor may be that the efficiency of charge transfer (transfer efficiency) varies depending on the absolute quantity of electric charge generated per photoelectric conversion. The transfer refers to the accumulation of electric charge from the photoelectric conversion element PD to each of the charge storage units CS.

For example, when the intensity of light (the amount of light) incident on the photoelectric conversion element PD is low, the transfer efficiency is lower than when the intensity of light incident on the photoelectric conversion element PD is high. This seems to be because when a transfer path has a potential pocket (hole), electrons associated with the electric charge being transferred are used to fill the pocket.

For example, when the intensity of light incident on the photoelectric conversion element PD is high, the photoelectric conversion element PD generates a large amount of electric charge. Thus, even when electrons are used to fill a pocket, the total amount of electric charge varies little, and the transfer efficiency does not significantly decrease.

In contrast, when the intensity of light incident on the photoelectric conversion element PD is low, the photoelectric conversion element PD generates a small amount of electric charge. Thus, when electrons are used to fill a pocket, the total amount of electric charge lowers significantly, reducing the transfer efficiency.

When a correspondence table in which electric charge ratios R are associated with distances D is used, the degree of transfer efficiency cannot be taken into account. This is because the electric charge ratio R is a value calculated for the amount of electric charge Q1 or Q2 accumulated per frame, and the amount of accumulated electric charge per accumulation is unknown. As a result, a measured distance may be different from the actual distance, and the failure to take into account the degree of transfer efficiency causes a distance deviation.

As a measure against the issue, in the present embodiment, the table information 440 is created per unit amount of accumulated electric charge Qint. The unit amount of accumulated electric charge Qint is the sum of the amounts of electric charge accumulated in the charge storage units CS1 to CS3 per unit accumulation count (for example, per accumulation count). For example, the unit amount of accumulated electric charge Qint is expressed by equation (4) below.

$$Qint = QSUM/int \quad (4)$$

In the equations, $$QSUM = Q1 + Q2 + Q3,$$

Q1 denotes the amount of electric charge accumulated in the charge storage unit CS1,
Q2 denotes the amount of electric charge accumulated in the charge storage unit CS2, and
Q3 denotes the amount of electric charge accumulated in the charge storage unit CS3, and
int denotes the accumulation count per frame.

Alternatively, instead of the unit amount of accumulated electric charge Qint, the table information 440 may be created per unit number of accumulated electrons Nint. The unit number of accumulated electrons Nint is the sum of the numbers of electrons accumulated in the charge storage units CS1 to CS3 per unit accumulation count (for example, per accumulation count). For example, the unit number of accumulated electrons Nint is expressed by equation (5) below.

$$Nint = NSUM/int \quad (5)$$

In the equations, $$NSUM = Q1/CG1 + Q2/CG2 + Q3/CG3,$$

NSUM denotes the sum of the numbers of electrons [e⁻] accumulated in the charge storage units CS1 to CS3,
int denotes the accumulation count per frame.
Q1 denotes the amount of electric charge [V] accumulated in the charge storage unit CS1,
Q2 denotes the amount of electric charge [V] accumulated in the charge storage unit CS2,
Q3 denotes the amount of electric charge [V] accumulated in the charge storage unit CS3,
CG1 denotes a conversion gain [V/e⁻] for the amount of electric charge accumulated in the charge storage unit CS1,
CG2 denotes a conversion gain [V/e⁻] for the amount of electric charge accumulated in the charge storage unit CS2, and
CG3 denotes a conversion gain [V/e⁻] for the amount of electric charge accumulated in the charge storage unit CS3.

The conversion gains CG1 to CG3 are coefficients for changing (converting) electric charge into the number of electrons, such as a value predetermined based on, for example, the layout. The conversion gains CG1 to CG3 may be values different from each other, or all or some of the conversion gains CG1 to CG3 may be the same value.

In this manner, the creation of the table information 440 per unit amount of accumulated electric charge Qint (or per unit number of accumulated electrons Nint) enables appropriate table information 440 to be selected in accordance with the unit amount of accumulated electric charge Qint (or the unit number of accumulated electrons Nint).

For example, when the unit amount of accumulated electric charge Qint is large, and the transfer efficiency is not reduced, typical table information 440 is used to correct the distance. In contrast, when the unit amount of accumulated electric charge Qint is small, and the transfer efficiency is reduced, table information 440 for a low transfer efficiency is used to correct the distance. This enables the distance to be corrected with high accuracy even for different charge transfer efficiencies. The unit amount of accumulated electric charge Qint is an example of a first variable. The electric charge ratio R is an example of a second variable.

The table information 440 will now be described with reference to FIGS. 5A to 5D. FIGS. 5A to 5D illustrate example structures of the table information 440 according to the first embodiment. FIG. 5A illustrates the table information 440 in which electric charge ratios R are associated with distances when the unit amount of accumulated electric charge Qint is Qint1. FIG. 5B illustrates the table information 440 in which electric charge ratios R are associated with distances when the unit amount of accumulated electric charge Qint is Qint2. FIG. 5C illustrates the table information 440 in which electric charge ratios R are associated with distances when the unit amount of accumulated electric charge Qint is Qint3. FIG. 5D illustrates the table information 440 in which electric charge ratios R are associated with distances when the unit amount of accumulated electric charge Qint is Qint4.

In this example, for the same electric charge ratio R1, when the unit amount of accumulated electric charge Qint is Qint1, the distance is a distance D11. When the unit amount of accumulated electric charge Qint is Qint3, the distance is a distance D31. In this manner, even for the same electric charge ratio R, the calculated distance may have different values in accordance with the amount of electric charge accumulated per accumulation process.

Figure 6:
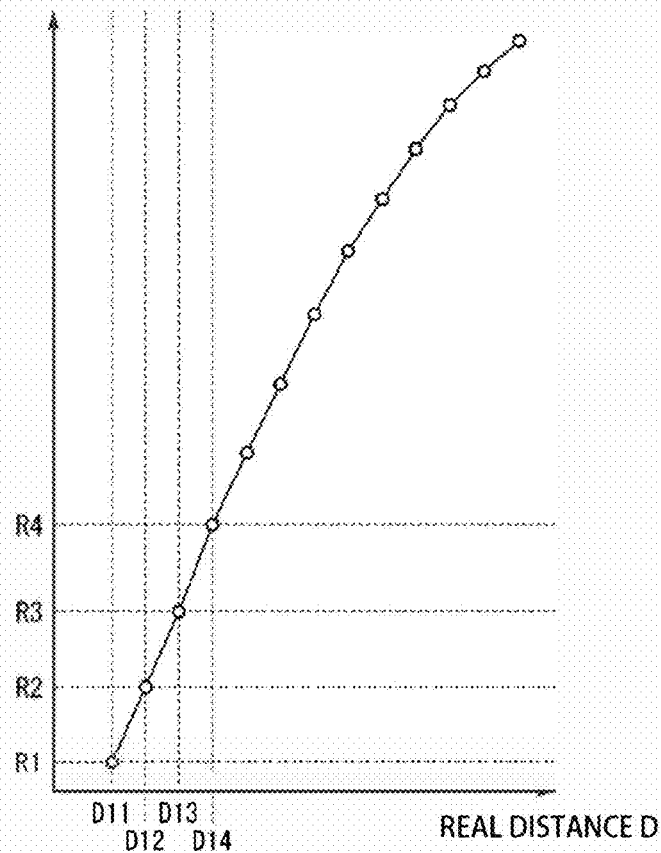
FIG. 6 illustrates the table information according to the first embodiment of the present invention.

FIG. 6 illustrates the table information 440 according to the first embodiment. FIG. 6 shows the relationship between the electric charge ratio R and the distance (real distance D in FIG. 6) for a certain unit amount of accumulated electric charge Qint. As illustrated in FIG. 6, the relationship between the electric charge ratio R and the distance D may not be proportional but may be nonlinear. In such a case, if the relationship between the electric charge ratio R and the distance D is expressed as a function, the function may be a complicated multidimensional relationship. In such a case, each correction to the distance needs calculation based on the complicated multidimensional relation, involving a significant processing load. With the relationship between the electric charge ratio R and the distance D determined as in the correspondence tables that are the table information 440 shown in FIGS. 5A to 5D, correction processing can be performed without increasing the processing load even when the relationship between the electric charge ratio R and the distance D is nonlinear.

Figure 7:
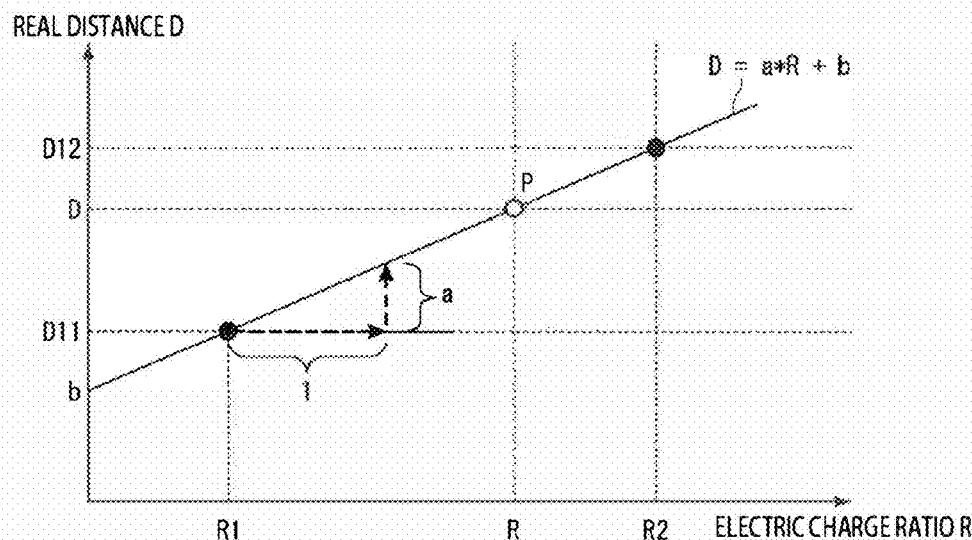
FIG. 7 illustrates linear interpolation processing performed by a range image processing unit according to the first embodiment of the present invention using the table information.

FIG. 7 illustrates linear interpolation processing performed by the range image processing unit 4 according to the first embodiment using the table information 440. FIG. 7 shows a part of the profile in FIG. 6 (the range of the electric charge ratios R1 to R2). In the example of FIG. 7, the electric charge ratio calculated based on the amount of electric charge accumulated in the photoelectric conversion element PD is an electric charge ratio R corresponding to the middle value between the electric charge ratio R1 and the electric charge ratio R2. In this case, the distance calculation unit 42 may calculate the distance corresponding to the electric charge ratio R through linear interpolation between the distance D11 corresponding to the electric charge ratio R1 and the distance D12 corresponding to the electric charge ratio R2. The linear interpolation enables the distance to be calculated with higher accuracy.

Furthermore, the multiple electric charge ratios R in the table information 440 may have an interval determined so that the distance resulting from linear interpolation between two distances D has accuracy within a predetermined range. In this case, the interval between the multiple electric charge ratios R in the table information 440 is determined to be, for example, within a range in which the profile can be regarded as being linear.

Figure 8:
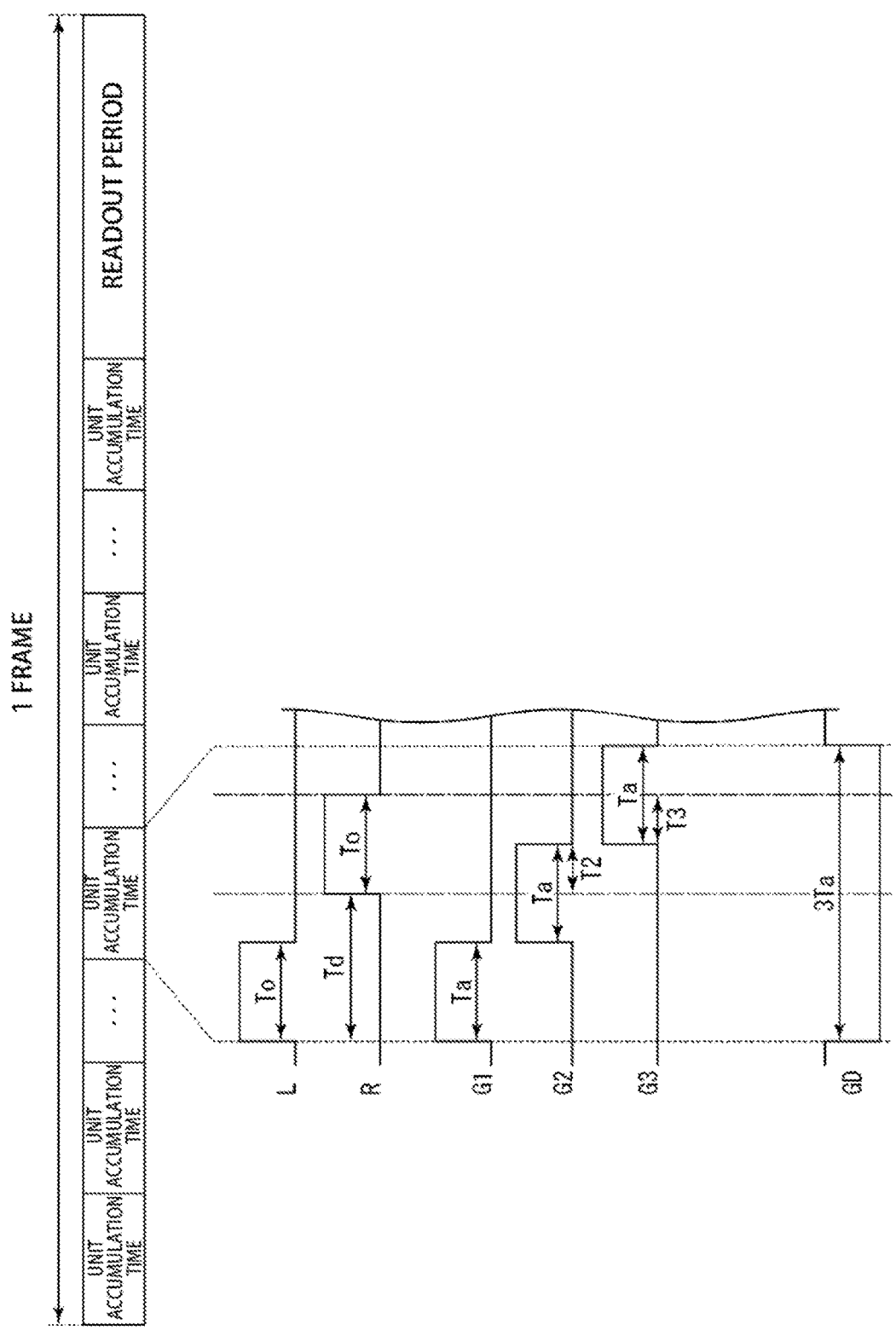
FIG. 8 illustrates ambient light component determination processing performed by the range image processing unit according to the first embodiment of the present invention.
Figure 9:
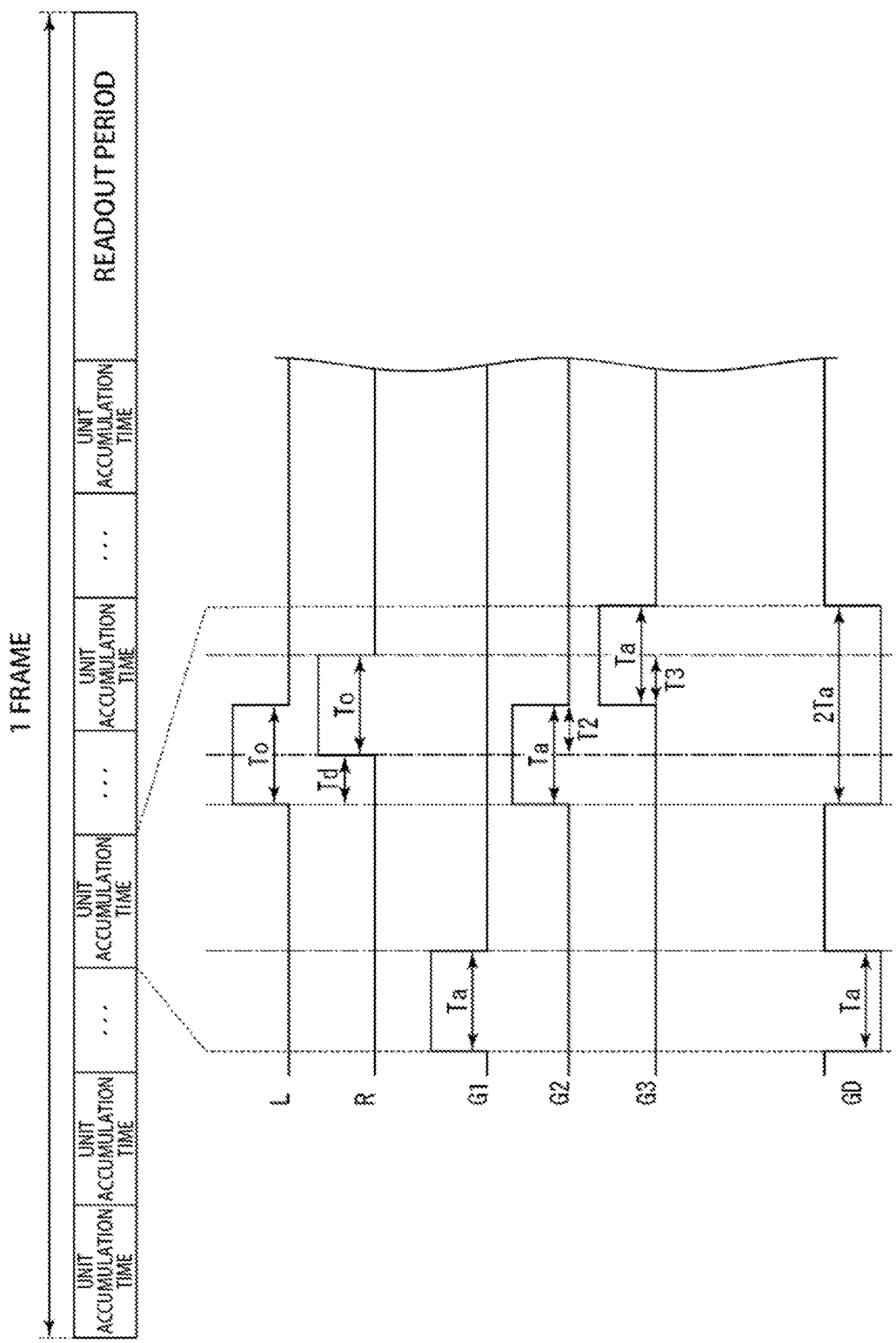
FIG. 9 illustrates ambient light component determination processing performed by the range image processing unit according to the first embodiment of the present invention.

A method for calculating the amount of electric charge corresponding to the ambient light component Qb will now be described with reference to FIGS. 8 and 9. FIGS. 8 and 9 illustrate ambient light component determination processing performed by the range image processing unit 4 according to the first embodiment.

Method 1 for Calculating Amount of Electric Charge Corresponding to Ambient Light Component Qb FIG. 8 is a timing chart for the reception of the reflected light RL from an object located farther than in FIG. 4. In FIG. 8, the time at which the vertical scanning circuit 323 emits the optical pulse PO, and the times at which the readout gate transistors G1 to G3 and the drain gate transistor GD are turned on are the same as in FIG. 4 and will thus not be described.

As illustrated in FIG. 8, in which the delay time Td is greater than in the timing chart of FIG. 4, when electric charge is accumulated in each of the charge storage units CS1 to CS3 at the same time as in FIG. 4, an amount of electric charge corresponding to the ambient light component Qb is accumulated in the charge storage unit CS1, and the reflected light RL and an amount of electric charge corresponding to the ambient light component Qb are distributed to and accumulated in the charge storage units CS2 and CS3. In this case, the charge storage units CS2 and CS3 are examples of charge storage units for distance calculation.

In other words, when the delay time Td is not great (in the case of FIG. 4), an amount of electric charge corresponding to the ambient light component Qb is accumulated in the charge storage unit CS3, and when the delay time Td is great (in the case of FIG. 8), an amount of electric charge corresponding to the ambient light component Qb is accumulated in the charge storage unit CS1. In both FIGS. 4 and 8, an equal amount of electric charge corresponding to the ambient light component Qb is accumulated in each of the charge storage units CS1 to CS3. Thus, the charge storage units CS in which the reflected light RL is distributed and accumulated store a greater amount of electric charge than the other charge storage unit CS storing only the ambient light component.

Based on this property, the distance calculation unit 42 determines the smallest amount of electric charge among the amounts of electric charge accumulated in the charge storage units CS1 to CS3, as the amount of electric charge corresponding to the ambient light component Qb.

The electric charge ratio R herein refers to the ratio between the amounts of electric charge accumulated in the two charge storage units CS in which the reflected light RL is distributed and accumulated (the charge storage units CS2 and CS3 in FIG. 8). In this case, an electric charge ratio R is expressed by, for example, equation (6) or (7) below.

$$R = Q2\#/(Q2\# + Q3\#) \quad (6)$$

$$R = Q3\#/(Q2\# + Q3\#) \quad (7)$$

In the equations, $$Q2\# = Q2 - Qb,$$

$$Q3\# = Q3 - Qb,$$

Q2 denotes the amount of electric charge accumulated in the charge storage unit CS2, and Q3 denotes the amount of electric charge accumulated in the charge storage unit CS3, and Qb denotes the amount of electric charge corresponding to the ambient light component accumulated in the charge storage units CS.

Method 2 for Calculating Amount of Electric Charge Corresponding to Ambient Light Component Qb The range imaging device 1 may control timing in such a way that a predetermined specific charge storage unit CS stores only an amount of electric charge corresponding to the ambient light component Qb. In this case, the distance calculation unit 42 may determine the amount of electric charge accumulated in the specific charge storage unit CS as the amount of electric charge corresponding to the ambient light component Qb irrespective of the length of the delay time Td.

FIG. 9 is a timing chart with timing controlled in such a way that the charge storage unit CS1 stores only an amount of electric charge corresponding to the ambient light component Qb. In FIG. 9, the time at which the vertical scanning circuit 323 emits the optical pulse PO, and the times at which the readout gate transistors G1 to G3 and the drain gate transistor GD are turned on are the same as in FIG. 4, and will thus not be described.

As shown in the example in FIG. 9, the accumulation of electric charge in the charge storage unit CS1 before the emission of the optical pulse PO allows the charge storage unit CS1 to store only an amount of electric charge corresponding to the ambient light component Qb. In this case, the distance calculation unit 42 determines the amount of electric charge accumulated in the charge storage unit CS1 as the amount of electric charge corresponding to the ambient light component Qb. In this case, the charge storage unit CS1 is an example of a predetermined charge storage unit for storing ambient light.

Figure 10:
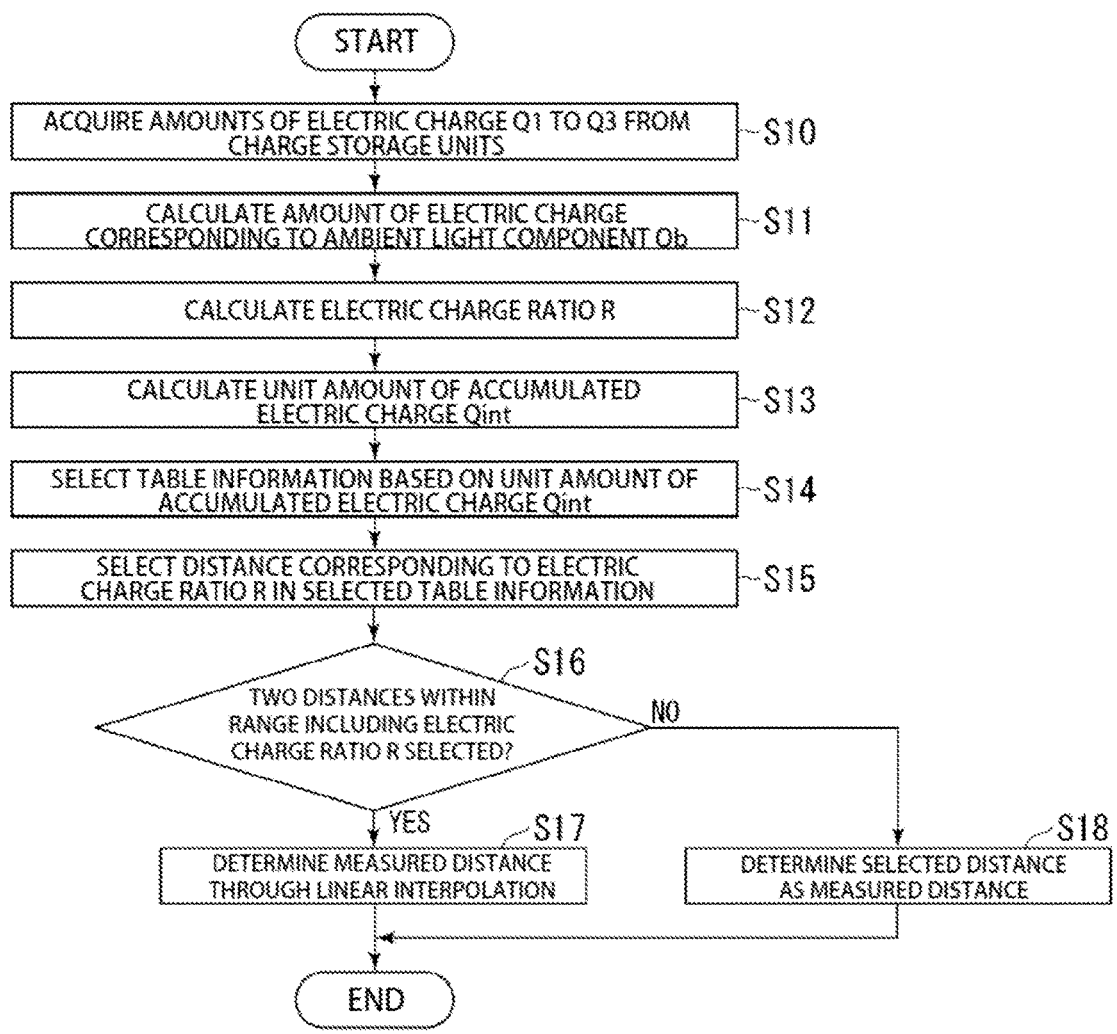
FIG. 10 is a flowchart showing the procedure performed by the range image processing unit according to the first embodiment of the present invention.

FIG. 10 is a flowchart showing the procedure performed by the range image processing unit 4 according to the first embodiment. The distance calculation unit 42 acquires the amounts of electric charge Q1 to Q3 accumulated respectively in the charge storage units CS1 to CS3 (step S10). The distance calculation unit 42 uses the acquired amounts of electric charge Q1 to Q3 to calculate the amount of electric charge corresponding to the ambient light component Qb (step S11). The distance calculation unit 42 may determine the smallest amount of electric charge among the amounts of electric charge Q1 to Q3 as the amount of electric charge Qb or determine the amount of electric charge accumulated in a predetermined specific charge storage unit CS (for example, the charge storage unit CS1 in FIG. 9) as the amount of electric charge Qb.

The distance calculation unit 42 uses the amounts of electric charge Q1 to Q3 and the amount of electric charge Qb to calculate the electric charge ratio R (step S12). For example, the distance calculation unit 42 calculates the electric charge ratio R by substituting the amounts of electric charge Q1 to Q3 and the amount of electric charge Qb into equation (2) or (3). In this case, the distance calculation unit 42 selects equation (2) or (3) in a manner that matches the list of the electric charge ratios R indicated in the table information 440, and uses the selected equation to calculate the electric charge ratio R.

The distance calculation unit 42 uses the amounts of electric charge Q1 to Q3 and the accumulation count int to calculate the unit amount of accumulated electric charge Qint (step S13). The accumulation count int is a predetermined value and, for example, stored in the storage unit 44. In this case, the distance calculation unit 42 calculates the unit amount of accumulated electric charge Qint by reading out the accumulation count int from the storage unit 44 and substituting the amounts of electric charge Q1 to Q3 and the readout accumulation count int into equation (4).

The distance calculation unit 42 uses the unit amount of accumulated electric charge Qint calculated in step S13 to select the table information 440 corresponding to the unit amount of accumulated electric charge Qint (step S14). The distance calculation unit 42 uses the selected table information 440 to select the distance corresponding to the electric charge ratio R calculated in step S12. In this case, the distance calculation unit 42 may select the two distances corresponding to two electric charge ratios R for linear interpolation or select the one distance corresponding to the electric charge ratio R closest to the electric charge ratio R calculated in step S12.

If selecting two distances (YES in step S16), the distance calculation unit 42 determines the distance (measured distance) through linear interpolation (step S17). If selecting one distance (NO in step S16), the distance calculation unit 42 determines the selected distance as the corrected distance (measured distance) (step S18).

In the example described above, the pixel 321 in the range imaging device 1 includes the three charge storage units CS1 to CS3. However, this is not restrictive. The pixel 321 in the range imaging device 1 may include four or more (for example, N (N≥4)) charge storage units CS.

In the process shown in FIG. 10, the calculation may be determined to be valid or invalid. For example, if the electric charge ratio R calculated in step S12 exceeds a predetermined upper limit threshold (for example, 0.98), the distance calculation unit 42 may determine the calculation to be invalid. If the electric charge ratio R calculated in step S12 is below a predetermined lower limit threshold (for example, 0.12), the distance calculation unit 42 may determine the calculation to be invalid.

When the pixel 321 in the range imaging device 1 includes N (N≥4) charge storage units CS, in step S10, the distance calculation unit 42 acquires the amounts of electric charge Q1 to QN accumulated respectively in the charge storage units CS1 to CSN. In step S11, the distance calculation unit 42 uses the acquired amounts of electric charge Q1 to QN to calculate the amount of electric charge corresponding to the ambient light component Qb. The method by which the distance calculation unit 42 calculates the amount of electric charge Qb is the same as when the pixel 321 in the range imaging device 1 includes the three charge storage units CS1 to CS3.

In step S12, the distance calculation unit 42 selects, from the charge storage units CS1 to CSN, the two charge storage units CS in which the electric charge corresponding to the reflected light RL is distributed and accumulated (charge storage units for distance measurement). The method by which the distance calculation unit 42 selects the two charge storage units CS is described below. For example, among combinations of two charge storage units CS in which electric charge is accumulated successively, the distance calculation unit 42 determines the combination in which the sum of the amounts of electric charge accumulated in the respective charge storage units CS is largest, as the two charge storage units CS in which the electric charge corresponding to the reflected light RL is distributed and accumulated (charge storage units for distance measurement). The distance calculation unit 42 calculates the electric charge ratio R using the amount of electric charge accumulated in each of the two charge storage units CS in which the electric charge corresponding to the reflected light RL is distributed and accumulated and also using the amount of electric charge corresponding to the ambient light component Qb. The processing in steps S13 to S18 is the same as when the pixel 321 in the range imaging device 1 includes the three charge storage units CS1 to CS3.

Alternatively, the pixel 321 in the range imaging device 1 may include two charge storage units CS. In this case, per measurement, the range imaging device 1 performs two types of charge accumulation processing: the processing of accumulating only the electric charge corresponding to the ambient light component (referred to as first processing), and the processing of accumulating electric charge including the reflected light RL (referred to as second processing). For example, the range imaging device 1 performs the first processing in the first frame and the second processing in the next frame. In the first processing, the range imaging device 1 accumulates the electric charge in each of the charge storage units CS1 and CS2 without emitting the optical pulse PO. In the second processing, the range imaging device 1 emits the optical pulse PO and accumulates the electric charge in each of the charge storage units CS1 and CS2.

In this case, in step S10, the distance calculation unit 42 acquires the amounts of electric charge $Q1f$ and $Q2f$ accumulated respectively in the charge storage units CS1 and CS2 in the first processing. The distance calculation unit 42 also acquires the amounts of electric charge $Q1s$ and $Q2s$ accumulated respectively in the charge storage units CS1 and CS2 in the second processing. In step S11, the distance calculation unit 42 determines one of the acquired amounts of electric charge $Q1f$ and $Q2f$ as the amount of electric charge corresponding to the ambient light component Qb. In step S12, the distance calculation unit 42 uses the acquired amounts of electric charge $Q1s$ and $Q2s$ and the amount of electric charge Qb to calculate the electric charge ratio R. The method by which the distance calculation unit 42 calculates the electric charge ratio R is the same as when the pixel 321 in the range imaging device 1 includes the three charge storage units CS1 to CS3.

As described above, the range imaging device 1 according to the embodiment includes the light source unit 2, the light-receiving unit 3, and the range image processing unit 4. The light source unit 2 emits the optical pulse PO to a measurement space where the object OB is located. The light-receiving unit 3 includes the pixel 321 and the vertical scanning circuit 323 (an example of a driving circuit). The pixel 321 includes the photoelectric conversion element PD and the charge storage units CS. The vertical scanning circuit 323 distributes and accumulates electric charge in each of the charge storage units CS in the pixel 321 at a predetermined time in synchronization with the emission of the optical pulse PO. The range image processing unit 4 includes the storage unit 44. The storage unit 44 stores the table information 440. The table information 440 is information indicating, for each unit amount of accumulated electric charge Qint (an example of a first variable), the relationship between the electric charge ratio R (an example of a second variable) and the distance D (an example of a corresponding distance). The unit amount of accumulated electric charge Qint is a variable expressed by equation (4) or (5). The unit amount of accumulated electric charge Qint is a variable corresponding to the sum of the amounts of electric charge accumulated in the charge storage units CS1 to CS3 per unit accumulation count. The electric charge ratio R is a variable expressed by equation (2) or (3). The electric charge ratio R is a ratio indicated using the amounts of electric charge obtained by subtracting the ambient light component (the amount of electric charge Qb) from each of the amounts of electric charge (for example, the amounts of electric charge Q1 and Q2 in FIG. 4) accumulated in at least two charge storage units for distance calculation (for example, the charge storage units CS1 and CS2 in FIG. 4). The electric charge ratio R is a ratio of the amount of electric charge for distance calculation in one or a combination of the at least two charge storage units for distance calculation. For example, the electric charge ratio R is a ratio of either amount of electric charge (Q1 # or Q2 #) to the amount of electric charge corresponding to the reflected light RL (Q1 #+Q2 #), that is, a variable expressed by equation (2) or (3). The range image processing unit 4 calculates the unit amount of accumulated electric charge Qint and the electric charge ratio R based on the amount of electric charge accumulated in each of the charge storage units CS. The range image processing unit 4 selects the table information 440 corresponding to the calculated unit amount of accumulated electric charge Qint. The distance calculation unit 42 uses the selected table information 440 to acquire the distance corresponding to the calculated electric charge ratio R (corresponding distance). The distance calculation unit 42 uses the acquired distance (corresponding distance) to determine the corrected distance (measured distance).

In this manner, the range imaging device 1 according to the first embodiment can use the table information 440 to acquire the distance corresponding to the electric charge ratio R. Thus, even with an error in the distance calculated based on the amounts of electric charge Q1 to Q3 accumulated in the charge storage units CS1 to CS3, the distance can be corrected to be closer to the actual distance D. That is, the distance calculated based on the amounts of electric charge Q1 to Q3 accumulated in the charge storage units CS1 to CS3 can be corrected to be closer to the actual distance D. Moreover, in the present embodiment, the table information 440 is created for each unit amount of accumulated electric charge Qint. This allows appropriate table information 440 to be selected in accordance with the unit amount of accumulated electric charge Qint. Thus, even when the transfer efficiency varies significantly depending on the absolute value of the amount of electric charge Qint accumulated per accumulation process, the distance can be corrected with high accuracy.

Also, in the range imaging device 1 according to the first embodiment, the range image processing unit 4 determines the corrected distance through linear interpolation. The range image processing unit 4 uses the table information 440 to extract a first distance (for example, the distance D11) associated with an electric charge ratio (for example, the electric charge ratio R1) smaller than the calculated electric charge ratio R and a second distance (for example, the distance D12) associated with an electric charge ratio (for example, the electric charge ratio R2) greater than the electric charge ratio R. The range image processing unit 4 performs linear interpolation between the extracted first distance (for example, the distance D11) and the extracted second distance (for example, the distance D12), and determines the resultant distance as the corrected distance (measured distance). As a result, the range imaging device 1 according to the first embodiment enables the distance to be corrected with higher accuracy.

The pixel 321 according to the first embodiment also includes the at least three charge storage units CS1 to CS3. The range image processing unit 4 determines the smallest amount of electric charge among the amounts of electric charge Q1 to Q3 accumulated respectively in the charge storage units CS1 to CS3, as the amount of electric charge corresponding to the ambient light component Qb. Thus, the range imaging device 1 according to the first embodiment enables the amount of electric charge corresponding to the ambient light component Qb to be calculated by simply comparing the amounts of electric charge Q1 to Q3 accumulated respectively in the charge storage units CS1 to CS3.

The pixel 321 according to the first embodiment also includes the at least three charge storage units CS1 to CS3. The range image processing unit 4 controls accumulation timing in such a way that a specific charge storage unit CS of the charge storage units CS1 to CS3 stores only an amount of light corresponding to the ambient light component. The distance calculation unit 42 determines the amount of electric charge Q accumulated in the specific charge storage unit CS, as the amount of electric charge corresponding to the ambient light component Qb. Thus, the range imaging device 1 according to the first embodiment enables the amount of electric charge Q accumulated in the specific charge storage unit CS to be calculated as the amount of electric charge corresponding to the ambient light component Qb. As a result, the amount of electric charge corresponding to the ambient light component Qb can easily be determined.

Figures 11, 12, 13:
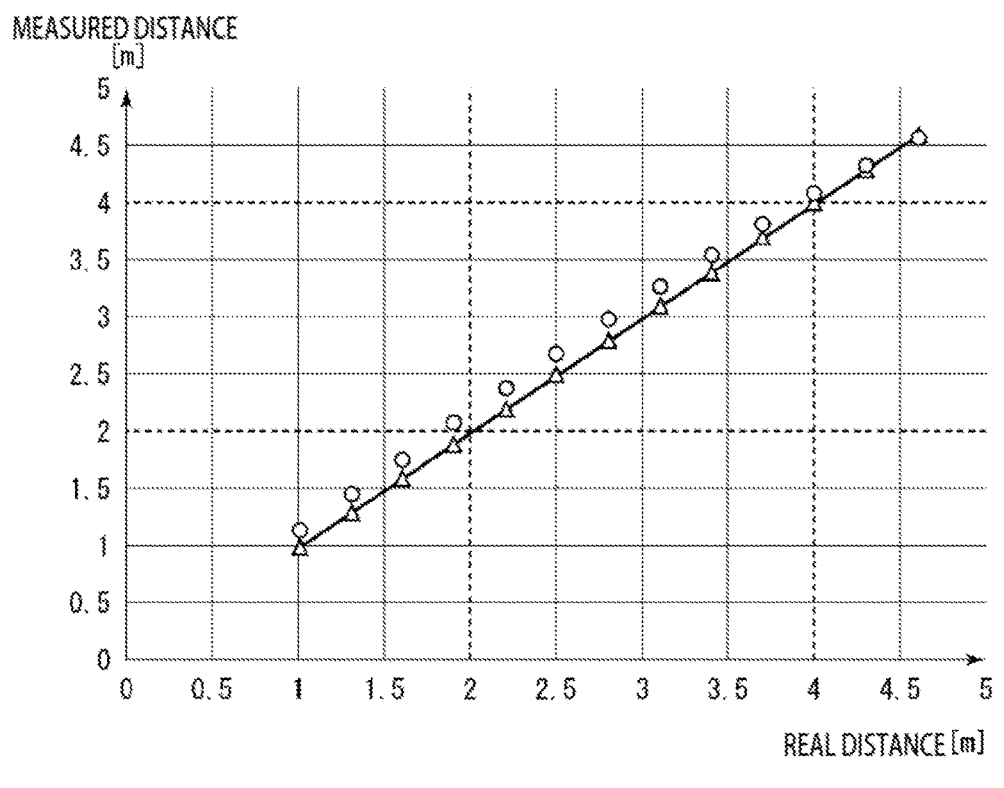
FIG. 11 illustrates advantageous effects of the first embodiment of the present invention.
FIG. 12 shows an example structure of table information according to a first modification of the first embodiment of the present invention.
FIG. 13 shows an example structure of table information according to a second modification of the first embodiment of the present invention.

The advantageous effects of the range imaging device 1 according to the first embodiment will now be described with reference to FIG. 11. FIG. 11 illustrates the advantageous effects of the first embodiment. FIG. 11 shows the relationship between the actual distance (real distance) and the measured distance. FIG. 11 shows the real distance on the horizontal axis and the measured distance on the vertical axis. The distances here are distances to the object OB. In FIG. 11, white circles indicate distances measured without the use of the table information 440 (with table information not used), such as distances calculated by substituting the amounts of electric charge Q1 to Q3 into equation (1). White triangles indicate distances measured using the table information 440 (with table information used), which are distances calculated using the table information 440. As illustrated in FIG. 11, the distances measured with table information used match the real distances. In contrast, the distances measured with table information not used are values inconsistent with the real distances and including errors. In other words, the range imaging device 1 according to the first embodiment can calculate the value closer to the real distance by determining the measured distance using the table information 440.

First Modification of First Embodiment

A first modification of the first embodiment will now be described. The first modification is different from the above-described first embodiment in that the storage unit 44 stores two sets of table information 440 (440A) divided by a threshold Th.

FIG. 12 shows an example structure of the table information 440A according to the first modification of the first embodiment. As illustrated in FIG. 12, the upper row of the table information 440A indicates the relationship between the electric charge ratio R and the distance D when the unit amount of accumulated electric charge Qint is smaller than the threshold Th. The lower row of the table information 440A indicates the relationship between the electric charge ratio R and the distance D when the unit amount of accumulated electric charge Qint is equal to or greater than the threshold Th. As shown in the example in FIG. 12, the table information 440 (440A) may be a two-dimensional correspondence table in which the unit amount of accumulated electric charge Qint and the electric charge ratio R are variables.

As described above, the degree of transfer efficiency depends on the absolute quantity of electric charge transferred per accumulation process. Thus, when an amount of electric charge smaller than a certain threshold Th is transferred, the transfer efficiency may lower, and when an amount of electric charge equal to or greater than the threshold is transferred, the transfer efficiency may not lower. In the first modification, the two sets of table information 440 divided by the threshold Th (the upper row and the lower row in the table information 440A) are created in advance and stored in the storage unit 44. The distance calculation unit 42 compares the calculated unit amount of accumulated electric charge Qint and the threshold Th and selects one of the upper row and the lower row in the table information 440A in accordance with the comparison results. Specifically, when the unit amount of accumulated electric charge Qint is smaller than the threshold Th, the distance calculation unit 42 selects the correspondence table of the upper row in the table information 440A. When the unit amount of accumulated electric charge Qint is equal to or greater than the threshold Th, the distance calculation unit 42 selects the correspondence table of the lower row in the table information 440A. The distance calculation unit 42 uses the selected correspondence table to determine the distance.

As described above, in the range imaging device 1 according to the first modification of the first embodiment, the storage unit 44 stores two information sets: the information corresponding to the upper row in the table information 440A (an example of first table information) and the information corresponding to the lower row in the table information 440A (an example of second table information). The information corresponding to the upper row in the table information 440A is associated with the unit amount of accumulated electric charge Qint smaller than the threshold Th. The information corresponding to the lower row in the table information 440A is associated with the unit amount of accumulated electric charge Qint greater than the threshold Th. The threshold Th is a value determined in accordance with the charge transfer efficiency on the path from the photoelectric conversion element PD to the charge storage units CS. The range image processing unit 4 calculates the unit amount of accumulated electric charge Qint and the electric charge ratio R based on the amounts of electric charge accumulated in the charge storage units CS1 to CS3. When the calculated unit amount of accumulated electric charge Qint is smaller than the threshold Th, the range image processing unit 4 selects the information corresponding to the upper row in the table information 440A. When the calculated unit amount of accumulated electric charge Qint is equal to or greater than the threshold Th, the range image processing unit 4 selects the information corresponding to the lower row in the table information 440A.

Thus, the range imaging device 1 according to the first modification of the first embodiment can select one of the two sets of table information 440 corresponding to the degree of charge transfer efficiency, enabling the distance to be determined with high accuracy even when the storage unit 44 stores a small number of sets of table information 440.

Second Modification of First Embodiment

A second modification of the first embodiment will now be described. The second modification is different from the above-described first embodiment in that the storage unit 44 stores sets of table information 440 (440B) associated with ranges of the unit amount of accumulated electric charge Qint.

FIG. 13 shows an example structure of the table information 440B according to the second modification of the first embodiment. The upper row of the table information 440B indicates the relationship between the electric charge ratio R and the distance D when the unit amount of accumulated electric charge Qint is equal to or greater than a threshold Th1 and smaller than a threshold Th2. The lower row of the table information 440B indicates the relationship between the electric charge ratio R and the distance D when the unit amount of accumulated electric charge Qint is equal to or greater than the threshold Th2 and smaller than a threshold Th3.

In the second modification, the ranges of the unit amount of accumulated electric charge Qint in the table information 440B are each associated with, for example, a range having a similar tendency of transfer efficiency. The distance calculation unit 42 determines the range of the unit amount of accumulated electric charge Qint in the multiple sets of table information 440B to which the calculated unit amount of accumulated electric charge Qint corresponds, and based on the determination results, selects one of the multiple sets of table information 440B. The distance calculation unit 42 uses the selected correspondence table to determine the distance. In this manner, one of the multiple sets of table information 440B can be selected in accordance with the tendency of charge transfer efficiency, enabling the distance to be determined with high accuracy.

Third Modification of First Embodiment

A third modification of the first embodiment will now be described. The third modification is different from the above-described first embodiment in that the storage unit 44 stores table information 440 for each of multiple time windows. The time windows correspond to combinations of charge storage units for distance measurement.

For example, in FIG. 4, the combination of charge storage units for distance measurement is the set of the charge storage units CS1 and CS2. This combination corresponds to the first time window. The distance is determined in accordance with the electric charge ratio R of electric charge distributed and accumulated within the first time window.

In FIG. 8, the combination of charge storage units for distance measurement is the set of the charge storage units CS2 and CS3. This combination corresponds to the second time window. The distance is determined in accordance with the electric charge ratio R of electric charge distributed and accumulated within the second time window.

Figures 14, 15, 16:
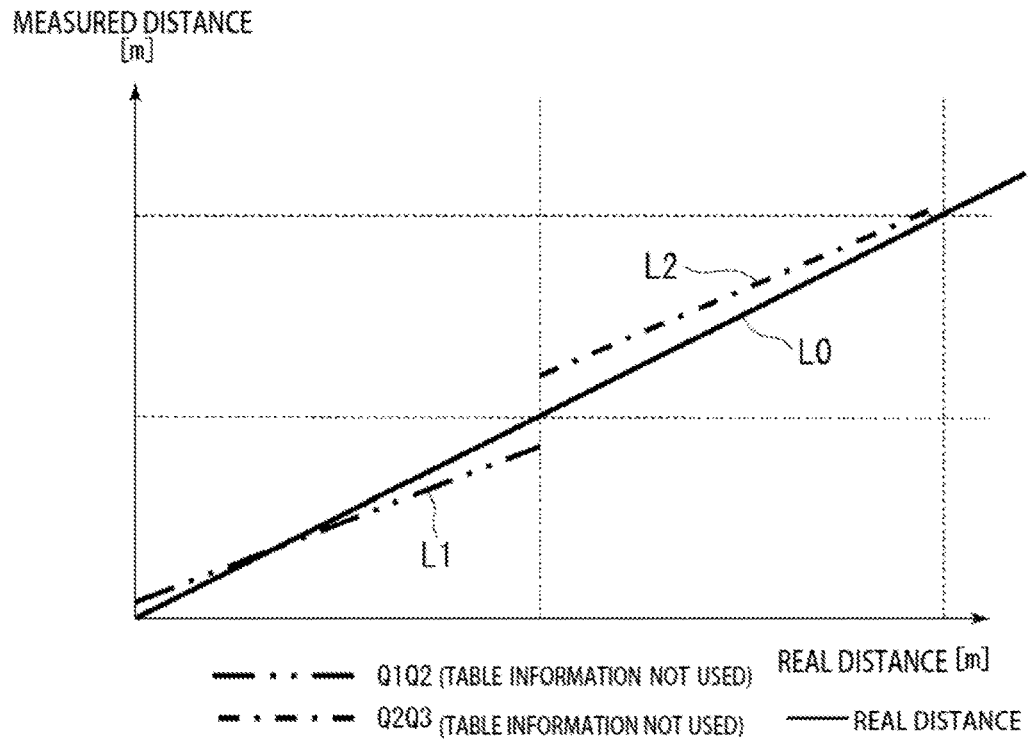
FIG. 14 illustrates two time windows according to a third modification of the first embodiment of the present invention.
FIG. 15 shows an example structure of table information according to the third modification of the first embodiment of the present invention.
FIG. 16 shows an example structure of table information according to the third modification of the first embodiment of the present invention.

FIG. 14 illustrates the profiles of two time windows according to the third modification of the first embodiment. The profiles here represent correspondences between the real distance and the measured distance. FIG. 14 shows the real distance on the horizontal axis and the measured distance on the vertical axis. Profile L0 represents an ideal relationship between the real distance and the measured distance. Profile L1 represents the relationship between the real distance and the measured distance within the first time window. Profile L2 represents the relationship between the real distance and the measured distance within the second time window. As shown in the example in FIG. 14, one time window and another time window often have different correspondences between the real distance and the measured distance. Thus, the table information 440 that enables accurate correction within one time window may not enable accurate distance correction within another time window.

As a measure against the issue, in the third modification, the table information 440 for each time window is created beforehand in the storage unit 44 and stored in the storage unit 44.

FIGS. 15 and 16 show example structures of table information 440C and table information 440D according to the third modification of the first embodiment. FIG. 15 shows the table information 440C used for a combination of charge storage units for distance measurement corresponding to one time window (for example, the charge storage units CS1 and CS2). FIG. 16 shows the table information 440D used for a combination of charge storage units for distance measurement corresponding to another time window (for example, the charge storage units CS2 and CS3). As illustrated in FIGS. 15 and 16, in the table information 440C (440D), different time windows are associated with different distances D even at the same unit amount of accumulated electric charge Qint and electric charge ratio R. In other words, even when the values of a unit amount of accumulated electric charge Qint and an electric charge ratio R in the table information 440C are identical to the values of a unit amount of accumulated electric charge Qint and an electric charge ratio R in the table information 440D, the value of the distance D associated with the values of the unit amount of accumulated electric charge Qint and the electric charge ratio R in the table information 440C is different from the value of the distance D associated with the values of the unit amount of accumulated electric charge Qint and the electric charge ratio R in the table information 440D. The table information 440 created for each time window in the manner described above enables correction appropriate to the corresponding time window.

As described above, in the range imaging device 1 according to the third modification of the first embodiment, the storage unit 44 stores the table information 440C and the table information 440D for the time windows (combinations of two charge storage units for distance calculation) on a one-to-one basis. The range image processing unit 4 determines the combination of two charge storage units for distance calculation based on the amount of electric charge accumulated in each of the charge storage units CS1 to CS3. The range image processing unit 4 determines, among the charge storage units CS1 to CS3, the combination of charge storage units for distance calculation to be the combination of two charge storage units CS storing electric charge successively (for example, the charge storage units CS1 and CS2) and having a total amount of accumulated electric charge (Q1+Q2) greater than the amount of electric charge accumulated in the other combination of two charge storage units CS. The range image processing unit 4 selects one of the table information 440C and the table information 400D in accordance with the determined combination of charge storage units for distance calculation.

In this manner, the range imaging device 1 according to the third modification of the first embodiment can select the table information 440 on a time window basis. Thus, even when each time window has a different correspondence between the real distance and the measured distance, the table information 440 appropriate to each time window can be selected, enabling the distance to be determined with high accuracy.

Fourth Modification of First Embodiment

A fourth modification of the first embodiment will now be described. The fourth modification is different from the above-described first embodiment in that the electric charge ratio R is calculated without identifying the charge storage unit CS in which only the ambient light is accumulated or the two charge storage units CS in which the reflected light RL is distributed and accumulated (the charge storage units for distance calculation).

In the fourth modification, the distance calculation unit 42 uses the method described in Patent Literature WO2019/031510. Patent Literature WO2019/031510 describes a technique for selecting an operational expression used for distance calculation depending on whether an index value exceeds a predetermined threshold. The index value is "the distance data validity determination signal" in Patent Literature WO2019/031510. The operational expression is "the distance reference value" in Patent Literature WO2019/031510 and corresponds to "the electric charge ratio R" in the present embodiment. In the following, a specific method for calculating the electric charge ratio R is described for cases where the pixel 321 includes three charge storage units CS and where the pixel 321 includes four charge storage units CS.

For Pixel 321 Including Three Charge storage units CS

In the fourth modification, the distance calculation unit 42 uses equation (8) or (9) below to calculate the electric charge ratio R. In this modification, the charge storage units CS1, CS2, and CS3 store the electric charge in the stated order in accordance with the timing charts shown in FIGS. 4 and 8. In other words, the distance calculation unit 42 performs control in such a way that the charge storage units CS1, CS2, and CS3 store the electric charge in the stated order in synchronization with the emission of the optical pulse PO. In this case, the charge storage unit CS1 is an example of a first charge storage unit. The charge storage unit CS2 is an example of a second charge storage unit. The charge storage unit CS3 is an example of a third charge storage unit. The amount of electric charge accumulated in the charge storage unit CS1 is an example of a first amount of electric charge.

The amount of electric charge accumulated in the charge storage unit CS2 is an example of a second amount of electric charge. The amount of electric charge accumulated in the charge storage unit CS3 is an example of a third amount of electric charge.

$$R = 1 - (Q1 - Q3)/SA \tag{8}$$

$$R = (Q1 - Q3)/SA \tag{9}$$

In the equations, $$SA = |Q1 - Q3| + Q2 - 0.5 \times SB,$$

$$SB = |Q1 + Q3| - |Q1 - Q3|,$$

Q1 denotes the amount of electric charge accumulated in the charge storage unit CS1, Q2 denotes the amount of electric charge accumulated in the charge storage unit CS2, and Q3 denotes the amount of electric charge accumulated in the charge storage unit CS3.

The storage unit 44 stores, for each unit amount of accumulated electric charge Qint, table information 440 in which electric charge ratios R are associated with distances. The distance calculation unit 42 calculates the unit amount of accumulated electric charge Qint and uses the table information 440 corresponding to the calculated unit amount of accumulated electric charge Qint to determine the distance associated with the electric charge ratio R as the measured distance.

For Pixel 321 Including Four Charge storage units CS

The timing of driving each pixel 321 including four charge storage units CS will be described first. In this case, for example, the section of a readout gate transistor G4 is added to FIGS. 4 and 8, and the charge storage units CS1, CS2, CS3, and CS4 store the electric charge in the stated order. In this case, the charge storage unit CS1 is an example of a first charge storage unit. The charge storage unit CS2 is an example of a second charge storage unit. The charge storage unit CS3 is an example of a third charge storage unit. The charge storage unit CS4 is an example of a fourth charge storage unit. The amount of electric charge accumulated in the charge storage unit CS1 is an example of a first amount of electric charge. The amount of electric charge accumulated in the charge storage unit CS2 is an example of a second amount of electric charge. The amount of electric charge accumulated in the charge storage unit CS3 is an example of a third amount of electric charge. The amount of electric charge accumulated in the charge storage unit CS4 is an example of a fourth amount of electric charge.

Specifically, in accordance with the timing shown in FIGS. 4 and 8, the optical pulse PO is emitted, the drain gate transistor GD is controlled to the off state, and the readout gate transistors G1 to G3 are controlled to the on state. Next, when ending the accumulation of the electric charge in the charge storage unit CS3, the vertical scanning circuit 323 turns on the readout gate transistor G4 and turns off the readout gate transistor G4 after the elapse of the accumulation time Ta. As a result, the electric charge generated through photoelectric conversion by the photoelectric conversion element PD while the readout gate transistor G4 is controlled in the on state is accumulated in the charge storage unit CS4 via the readout gate transistor G4. Next, when ending the accumulation of the electric charge in the charge storage unit CS4, the vertical scanning circuit 323 turns on the drain gate transistor GD to discharge the electric charge. As a result, the electric charge generated through photoelectric conversion by the photoelectric conversion element PD is discarded via the drain gate transistor GD.

On the basis of the amount of electric charge controlled in accordance with the above timing and accumulated in each of the charge storage units CS1 to CS4, the distance calculation unit 42 uses equation (10) or (11) below to calculate an electric charge ratio XR.

$$XR = 1 - (Q1 - Q3)/SA \tag{10}$$

$$XR = (Q1 - Q3)/SA \tag{11}$$

In the equations, $$SA = |Q1 - Q3| + |Q2 - Q4|,$$

Q1 denotes the amount of electric charge accumulated in the charge storage unit CS1, Q2 denotes the amount of electric charge accumulated in the charge storage unit CS2, and Q3 denotes the amount of electric charge accumulated in the charge storage unit CS3, and Q4 denotes the amount of electric charge accumulated in the charge storage unit CS4.

The distance calculation unit 42 also uses equation (12) or (13) below to calculate an electric charge ratio YR.

$$YR = 2 - (Q2 - Q4)/SA \tag{12}$$

$$YR = 1 + (Q2 - Q4)/SA \tag{13}$$

In the equations, $$SA = |Q1 - Q3| + |Q2 - Q4|,$$

Q1 denotes the amount of electric charge accumulated in the charge storage unit CS1, Q2 denotes the amount of electric charge accumulated in the charge storage unit CS2, and Q3 denotes the amount of electric charge accumulated in the charge storage unit CS3, and Q4 denotes the amount of electric charge accumulated in the charge storage unit CS4.

The distance calculation unit 42 compares the electric charge ratio XR with a threshold ThR. The threshold ThR is set to be near the value of an electric charge ratio XR corresponding to a border area between time windows. When the electric charge ratio XR is equal to or smaller than the threshold ThR, the distance calculation unit 42 selects the electric charge ratio XR as the electric charge ratio R. In contrast, when the electric charge ratio XR exceeds the threshold ThR, the distance calculation unit 42 selects the electric charge ratio YR as the electric charge ratio R.

The storage unit 44 stores, for each unit amount of accumulated electric charge Qint, table information 440 in which electric charge ratios R are associated with distances. The distance calculation unit 42 calculates the unit amount of accumulated electric charge Qint and uses the table information 440 corresponding to the calculated unit amount of accumulated electric charge Qint to determine the distance associated with the electric charge ratio R as the measured distance.

As described above, in the range imaging device 1 according to the fourth modification of the first embodiment, the pixel 321 may include the three charge storage units CS1 to CS3. The range image processing unit 4 performs control in such a way that the charge storage units CS1, CS2, and CS3 store the electric charge in the stated order in synchronization with the emission of the optical pulse PO. The distance calculation unit 42 determines, as in equation (8) or (9), (Q1−Q3) as the amount of electric charge corresponding to the reflected light RL accumulated in any one charge storage unit CS of two charge storage units for distance calculation (the amount of electric charge for distance calculation). Q1 is the amount of electric charge accumulated in the charge storage unit CS1. Q3 is the amount of electric charge accumulated in the charge storage unit CS3.

In this manner, the range imaging device 1 according to the fourth modification of the first embodiment can calculate the amount of electric charge for distance calculation accumulated in any one of two charge storage units for distance calculation without identifying the two charge storage units for distance calculation. This allows the electric charge ratio R to be calculated by, as expressed by SA in equation (8) or (9), calculating the sum of the amounts of electric charge for distance calculation accumulated in the two charge storage units for distance calculation. Thus, the range imaging device 1 according to the fourth modification of the first embodiment can easily calculate the electric charge ratio R without determining whether equation (2) or (3) is used or whether equation (6) or (7) is used, and without identifying the charge storage unit CS in which only the ambient light is accumulated for the calculation of the amount of electric charge corresponding to the ambient light component Qb, depending on the length of the delay time Td. In addition, the same operational expression (equation (8) or (9)) may be used on the boundary between two time windows. This can eliminate the boundary discontinuity between time windows.

In the range imaging device 1 according to the fourth modification of the first embodiment, the pixel 321 may also include the four charge storage units CS1 to CS4. The range image processing unit 4 performs control in such a way that the charge storage units CS1, CS2, CS3, and CS4 store the electric charge in the stated order in synchronization with the emission of the optical pulse PO. The distance calculation unit 42 determines (Q1−Q3) as the amount of signal calculated from the amount of electric charge accumulated in one charge storage unit CS of two charge storage units for distance calculation. The distance calculation unit 42 determines (Q2−Q4) as the amount of signal calculated from the amount of electric charge accumulated in the other charge storage unit CS of the two charge storage units for distance calculation. The distance calculation unit 42 determines |Q1−Q3|+|Q2−Q4| as the sum of the amounts of signal calculated from the amount of electric charge accumulated in each charge storage unit CS of the two charge storage units for distance calculation.

Thus, the range imaging device 1 according to the fourth modification of the first embodiment can calculate the sum of the amounts of electric charge for distance calculation accumulated in the two charge storage units for distance calculation, the amount of electric charge for distance calculation accumulated in one of the two charge storage units for distance calculation, and the amount of electric charge for distance calculation accumulated in the other. This enables the electric charge ratio R to be calculated without identifying the two charge storage units for distance calculation.

Furthermore, in this case, the electric charge ratio XR in equation (10) and the electric charge ratio YR in equation (12) have the same value on the boundary between time windows. This can eliminate the boundary discontinuity between time windows.

The at least one embodiment has been described with an example in which the electric charge ratio R is the ratio of the amount of electric charge for distance calculation in any one of the two charge storage units for distance calculation to the sum of the amounts of electric charge for distance calculation accumulated in the two charge storage units for distance calculation. However, this is not restrictive. The electric charge ratio R may be any ratio as long as the ratio is expressed using the amount of electric charge for distance calculation accumulated in each of the at least two charge storage units for distance calculation. For example, the electric charge ratio R may be the ratio of the amount of electric charge for distance calculation in one of the two charge storage units for distance calculation to the amount of electric charge for distance calculation in the other.

Additionally, in the example described with reference to FIG. 9, control is performed to cause the charge storage unit CS1 to store only an amount of electric charge corresponding to the ambient light component Qb by accumulating electric charge in the charge storage unit CS1 before the emission of the optical pulse PO. However, this is not restrictive. Control may be performed to cause the charge storage unit CS3 to store electric charge after the emission of the optical pulse PO and the reception of the reflected light RL. In this case, the charge storage unit CS3 stores only an amount of electric charge corresponding to the ambient light component Qb. In this case, the charge storage unit CS3 is an example of a predetermined charge storage unit for storing ambient light.

When a fixed charge storage unit CS stores only an amount of electric charge corresponding to the ambient light component Qb, as illustrated in FIG. 8, the charge storage units CS1 to CS3 may be sequentially turned on.

In the case where the charge storage units CS1 to CS3 are sequentially turned on, driving may be controlled to provide a gap (GAP) when their on states are switched. GAP refers to the drive to inhibit the on states of charge storage units CS from overlapping each other, and to control all the charge storage units CS to the off state. For example, when the emission time To for the emission of the optical pulse PO is 10 clk, the accumulation time Ta for the accumulation of electric charge in a charge storage unit CS is 9 clk, and GAP takes 1 clk. Then, driving is controlled to provide GAP when a charge storage unit CS is switched from the off state to the on state or when a charge storage unit CS is switched from the on state to the off state.

The range imaging device 1 and the range image processing unit 4 according to the above-described embodiment may be partially or entirely implemented by a computer. In this case, programs for implementing the functions may be stored in a computer-readable storage medium, and the functions may be implemented by causing a computer system to load and execute the programs stored in the storage medium. The term "computer system" here is to be construed to cover an OS and hardware such as a peripheral device. The term "computer-readable storage medium" refers to a storage device such as a portable medium, for example, a flexible disk, a magneto-optical disk, a ROM, or a CD-ROM, or a hard disk drive incorporated in the computer system. The term "computer-readable storage medium" may further include a component that dynamically holds programs for a short period, such as a communication line used when the programs are transmitted through a network such as the internet or communication lines such as a telephone line, and also include a component that holds the programs for a certain period, such as volatile memory inside the computer system operating as a server or a client in such a case. The programs may be designed to achieve some of the above-described functions and may also be designed to achieve the functions in combination with programs prestored in the computer system. Furthermore, the programs may be implemented using a programmable logic device such as an FPGA.

Although the first embodiment of the present invention has been described in detail above with reference to the drawings, the specific components are not limited to the embodiment. The component design may be modified without departing from the sprit and scope of the present invention.

Second Embodiment

A range imaging device according to a second embodiment will now be described with reference to the drawings.

Figure 17:
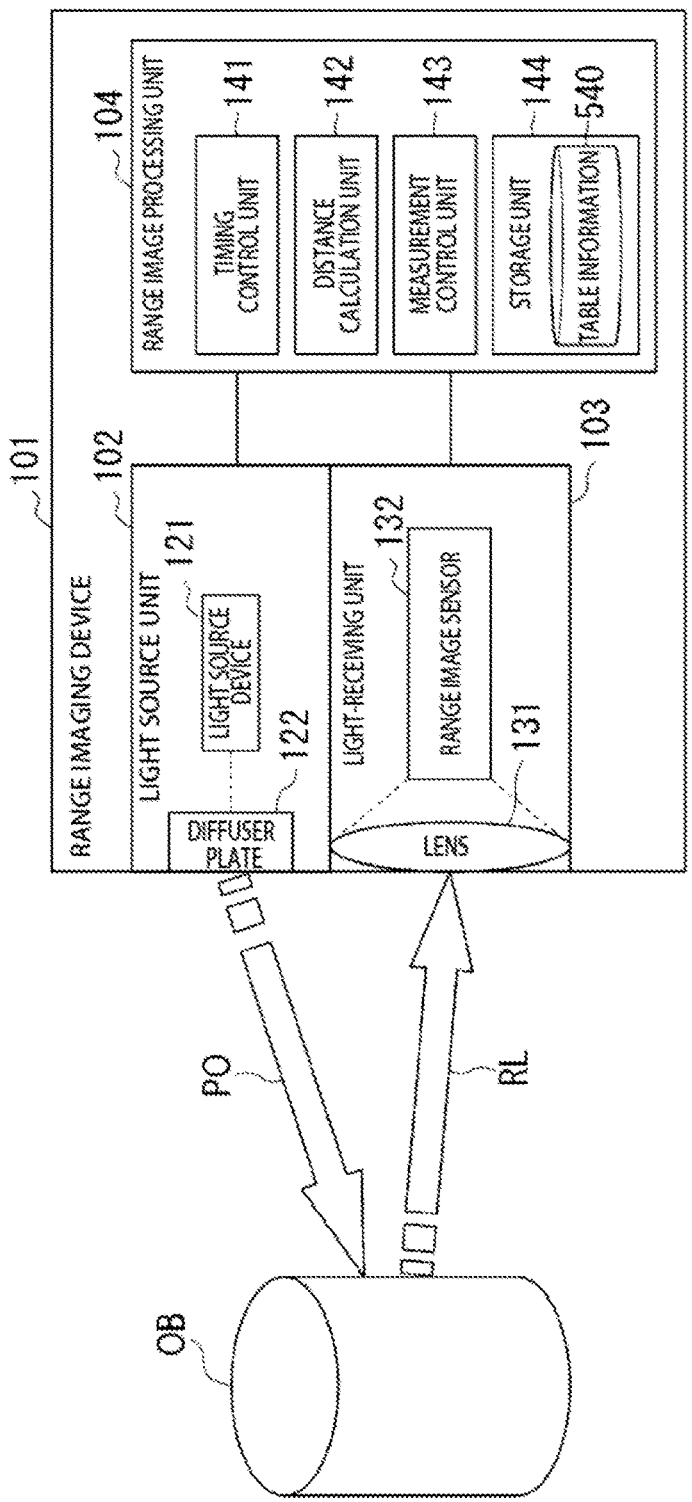
FIG. 17 is a schematic block diagram of a range imaging device according to a second embodiment of the present invention.

The embodiment will be described first. FIG. 17 is a schematic block diagram of a range imaging device according to the second embodiment of the present invention. A range imaging device 101 having the configuration illustrated in FIG. 17 includes a light source unit 102, a light-receiving unit 103, and a range image processing unit 104. In FIG. 17, an object OB subjected to distance measurement in the range imaging device 101 is also illustrated together with the range imaging device 101.

In accordance with control from the range image processing unit 104, the light source unit 102 emits an optical pulse PO to a space to be imaged where the object OB subjected to distance measurement in the range imaging device 101 is located. The light source unit 2 is, for example, a surface emitting semiconductor laser module such as a vertical cavity surface emitting laser (VCSEL). The light source unit 102 includes a light source device 121 and a diffuser plate 122.

The light source device 121 is a light source that emits near-infrared laser light (for example, in the wavelength range of 850 nm to 940 nm) to be the optical pulse PO applied to the object OB. The light source device 121 is, for example, a semiconductor laser light emitting device. The light source device 121 emits pulsed laser light in accordance with control from a timing control unit 141.

The diffuser plate 122 is an optical component that diffuses the near-infrared laser light emitted from the light source device 121 over the area of a surface for application to the object OB. The pulsed laser light diffused by the diffuser plate 122 is emitted as the optical pulse PO and applied to the object OB.

The light-receiving unit 103 receives reflected light RL resulting from the optical pulse PO reflected by the object OB subjected to distance measurement in the range imaging device 101 and outputs a pixel signal corresponding to the received reflected light RL. The light-receiving unit 103 includes a lens 131 and a range image sensor 132.

The lens 131 is an optical lens that guides the incident reflected light RL to the range image sensor 132. The lens 131 emits the incident reflected light RL to the range image sensor 132, causing the reflected light RL to be received by (incident on) pixels included in the light receiving area of the range image sensor 132.

The range image sensor 132 is an imaging device used in the range imaging device 101. The range image sensor 132 includes multiple pixels in its two-dimensional light receiving area. The pixels of the range image sensor 132 each include a single photoelectric conversion element, multiple charge storage units corresponding to the single photoelectric conversion element, and a component that distributes electric charge to each charge storage unit. In other words, each pixel is a distribution imaging element that causes electric charge to be distributed and accumulated in the charge storage units.

In accordance with control from the timing control unit 141, the range image sensor 132 distributes electric charge generated by the photoelectric conversion element to each charge storage unit. The range image sensor 132 also outputs a pixel signal corresponding to the amount of the electric charge distributed to the charge storage units. The range image sensor 132, in which the multiple pixels are positioned in a two-dimensional matrix, outputs a one-frame pixel signal corresponding to each pixel.

The range image processing unit 104 controls the range imaging device 101 and calculates the distance to the object OB. The range image processing unit 104 includes the timing control unit 141, a distance calculation unit 142, a measurement control unit 143, and a storage unit 144.

On the basis of control by the measurement control unit 143, the timing control unit 141 controls the output timing of various control signals needed for measurement. Examples of the various control signals include a signal for controlling the emission of the optical pulse PO, a signal for distributing and accumulating the reflected light RL in the charge storage units, and a signal for controlling the number of distributions (the accumulation count) per frame. The number of distributions refers to the number of times the process of distributing electric charge to charge storage units CS (see FIG. 19) is repeated. The product of the number of charge distributions and the time during which electric charge is accumulated in each charge storage unit per charge distribution process (accumulation time Ta described later) is the exposure time.

The distance calculation unit 142 calculates the distance to the object OB based on the pixel signal output from the range image sensor 132 and outputs the calculated distance information. The distance calculation unit 142 calculates the distance to the object OB based on the amounts of electric charge accumulated in multiple charge storage units.

In the second embodiment, the distance calculation unit 142 determines the distance to the object OB using table information 540 described later. The table information 540 will be described in detail later. The way the distance calculation unit 142 determines the distance to the object OB using the table information 540 will also be described in detail later.

The measurement control unit 143 controls the timing control unit 141. For example, the measurement control unit 143 sets parameters such as the number of distributions and the accumulation time Ta for one frame and controls the timing control unit 141 to capture an image based on the set parameters.

The storage unit 144 includes a storage medium, such as a hard disk drive (HDD), a flash memory, an electrically erasable programmable read-only memory (EEPROM), a random access read/write memory (RAM), or a read-only memory (ROM), or any combination of these storage media. For example, the storage unit 144 stores the table information 540. The table information 540 will be described in detail later.

In the range imaging device 101 with this configuration, the light-receiving unit 103 receives the reflected light RL resulting from the near-infrared optical pulse PO emitted by the light source unit 102 to the object OB and reflected by the object OB, and the range image processing unit 104 outputs the distance information obtained by measuring the distance to the object OB.

Although FIG. 17 illustrates the range imaging device 101 with the range image processing unit 104 inside, the range image processing unit 104 may be a component outside the range imaging device 101.

Figure 18:
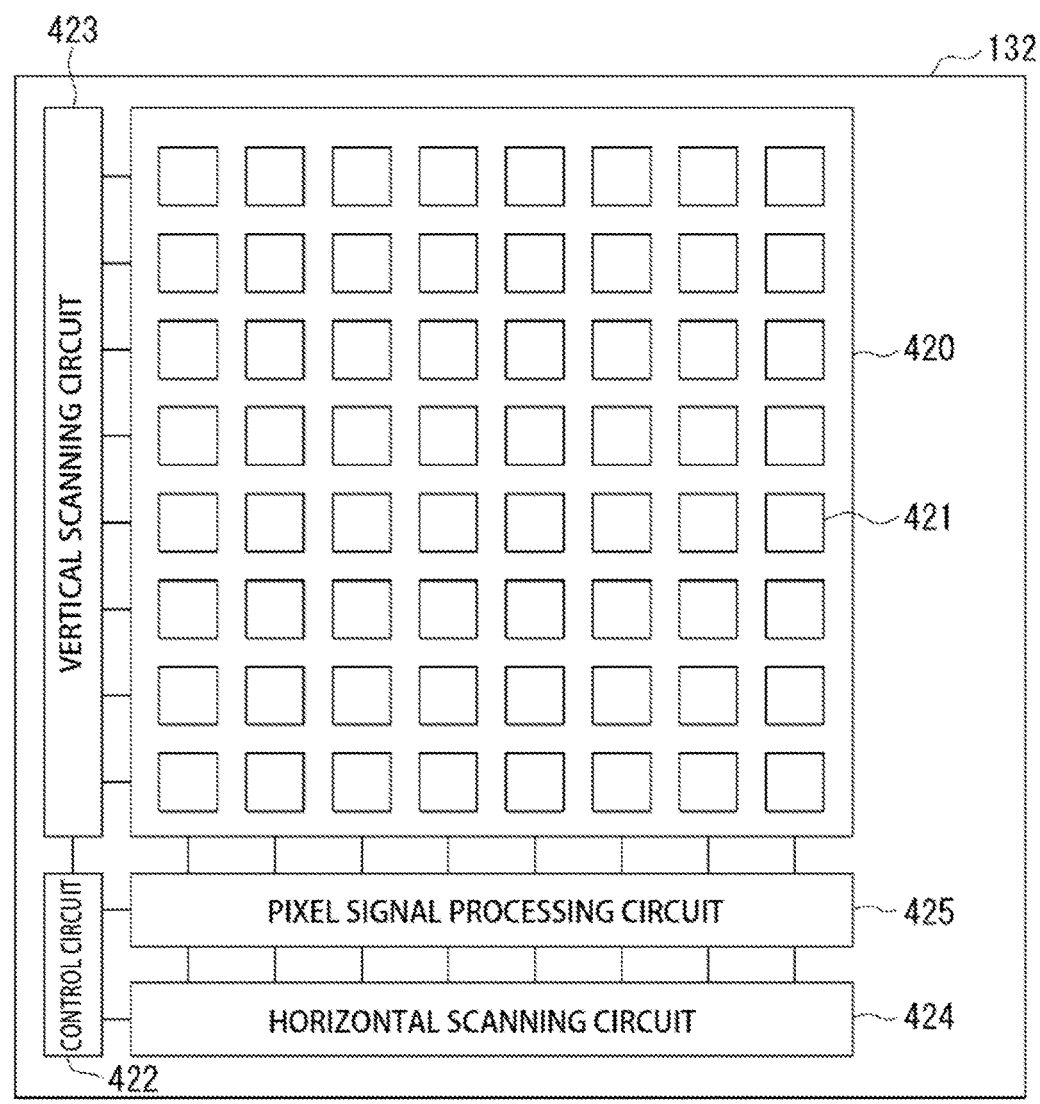
FIG. 18 is a schematic block diagram of a range image sensor according to the second embodiment of the present invention.

The configuration of the range image sensor 132 used as an imaging device in the range imaging device 101 will now be described. FIG. 18 is a schematic block diagram of the imaging device (the range image sensor 132) used in the range imaging device 101 according to the embodiment.

As illustrated in FIG. 18, the range image sensor 132 includes, for example, a light receiving area 420 in which multiple pixels 421 are positioned, a control circuit 422, a vertical scanning circuit 423 having the function of distribution, a horizontal scanning circuit 424, and a pixel signal processing circuit 425.

The light receiving area 420 is an area in which the multiple pixels 421 are positioned, and FIG. 18 illustrates an example arrangement that is an 8 by 8 two-dimensional matrix. The pixels 421 store electric charge corresponding to the intensity of received light. The control circuit 422 performs overall control of the range image sensor 132. For example, the control circuit 422 controls the operation of the components in the range image sensor 132 based on instructions from the timing control unit 141 in the range image processing unit 104. It is noted that the components included in the range image sensor 132 may be directly controlled by the timing control unit 141. In this case, the control circuit 422 may be omitted.

The vertical scanning circuit 423 is a circuit that controls the pixels 421 positioned in the light receiving area 420, on a row-by-row basis in accordance with control from the control circuit 422. The vertical scanning circuit 423 causes the voltage signal corresponding to the amount of electric charge accumulated in each charge storage unit CS of each pixel 421 to be output to the pixel signal processing circuit 425. In this case, the vertical scanning circuit 423 distributes the electric charge produced through conversion by the photoelectric conversion element to each charge storage unit in the pixel 421. In other words, the vertical scanning circuit 423 is an example of a pixel driving circuit.

The pixel signal processing circuit 425 is a circuit that, in accordance with control from the control circuit 422, performs predetermined signal processing (for example, noise suppression processing or A/D conversion processing) on voltage signals output from the pixels 421 in each column to the corresponding vertical signal line.

The horizontal scanning circuit 424 is a circuit that, in accordance with control from the control circuit 422, causes signals output from the pixel signal processing circuit 425 to be sequentially output to a horizontal signal line. As a result, the pixel signals corresponding to the amounts of electric charge accumulated for one frame are sequentially output to the range image processing unit 104 through the horizontal signal line.

In the following description, the pixel signal processing circuit 425 performs A/D conversion processing, and pixel signals are digital signals.

Figure 19:
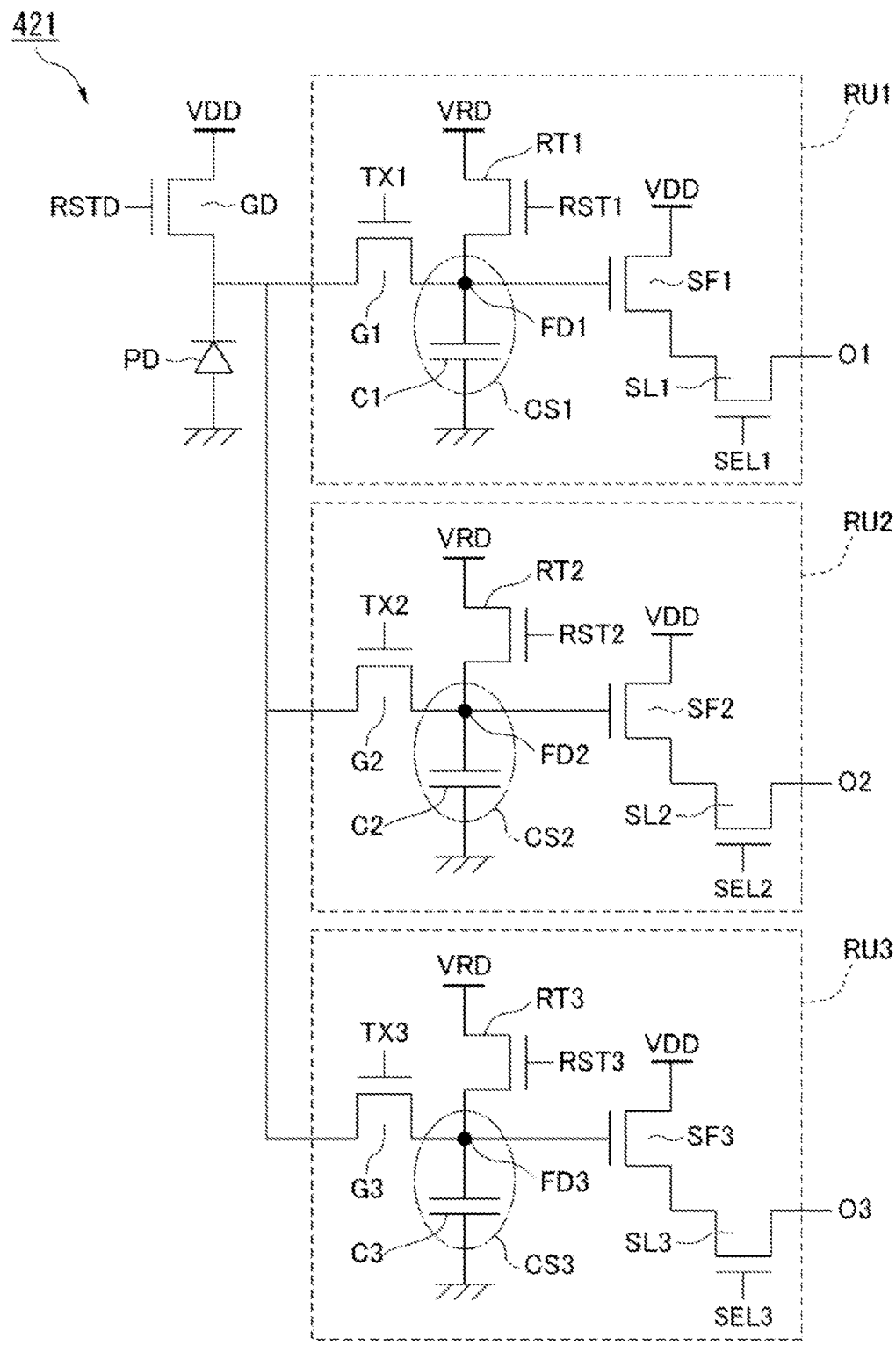
FIG. 19 is a circuit diagram illustrating an example of the structure of a pixel according to the second embodiment of the present invention.

The structure of the pixels 421 positioned in the light receiving area 420 included in the range image sensor 132 will now be described. FIG. 19 is a circuit diagram illustrating an example of the structure of the pixels 421 positioned in the light receiving area 420 of the range image sensor 132 according to the embodiment. FIG. 19 shows an example of the structure of one pixel 421 of the multiple pixels 421 positioned in the light receiving area 420. The pixel 421 is an example of the structure including three pixel signal readout units.

As illustrated in FIG. 19, the pixel 421 includes a single photoelectric conversion element PD, a drain gate transistor GD, and three pixel signal readout units RU that output a voltage signal through their corresponding output terminals O. Each of the pixel signal readout units RU includes a readout gate transistor G, a floating diffusion FD, a charge storage capacitor C, a reset gate transistor RT, a source follower gate transistor SF, and a selection gate transistor SL. In each pixel signal readout unit RU, the floating diffusion FD and the charge storage capacitor C form a charge storage unit CS.

In FIG. 19, the three pixel signal readout units RU are distinguished from each other by adding the numerals 1, 2, and 3 after the reference signs "RU" of the individual pixel signal readout units RU. Similarly to the three pixel signal readout units RU, the components included in the three pixel signal readout units RU are also distinguished from each other by appending the numerals of their corresponding pixel signal readout units RU after the reference signs of the components.

In the pixel 421 illustrated in FIG. 19, a pixel signal readout unit RU1 that outputs a voltage signal through an output terminal O1 includes a readout gate transistor G1, a floating diffusion FD1, a charge storage capacitor C1, a reset gate transistor RT1, a source follower gate transistor SF1, and a selection gate transistor SL1. In the pixel signal readout unit RU1, the floating diffusion FD1 and the charge storage capacitor C1 form a charge storage unit CS1. A pixel signal readout unit RU2 and a pixel signal readout unit RU3 have a structure similar to the structure of the pixel signal readout unit RU1.

The photoelectric conversion element PD is an embedded photodiode that photoelectrically converts incident light to generate electric charge and accumulates the generated electric charge. The photoelectric conversion element PD may have any structure. The photoelectric conversion element PD may be, for example, a PN photodiode with a p-type semiconductor and an n-type semiconductor joined together or a PIN photodiode with an I-type semiconductor sandwiched between a p-type semiconductor and an n-type semiconductor. The photoelectric conversion element PD is not limited to a photodiode, but it may be, for example, a photogate photoelectric conversion element.

In the pixel 421, the electric charge generated by the photoelectric conversion element PD through the photoelectric conversion of the incident light is distributed to each of the three charge storage units CS, and voltage signals corresponding to the amounts of the distributed electric charge are output to the pixel signal processing circuit 425.

The structure of the pixels positioned in the range image sensor 132 is not limited to the structure including the three pixel signal readout units RU as illustrated in FIG. 19, but the pixels may have a structure including multiple pixel signal readout units RU. In other words, each of the pixels positioned in the range image sensor 132 may include two or four or more pixel signal readout units RU (charge storage units CS).

In the structure of the pixel 421 illustrated as an example in FIG. 19, charge storage unit CS is formed by the floating diffusion FD and the charge storage capacitor C. However, the charge storage unit CS may be formed by at least the floating diffusion FD, and the pixel 421 may not include the charge storage capacitor C.

Although the structure of the pixel 421 illustrated as an example in FIG. 19 includes the drain gate transistor GD, this is not restrictive. For example, in the case where it is unnecessary to discard the electric charge not accumulated in the charge storage unit CS but remaining in the photoelectric conversion element PD, the structure may not include the drain gate transistor GD.

Figure 20:
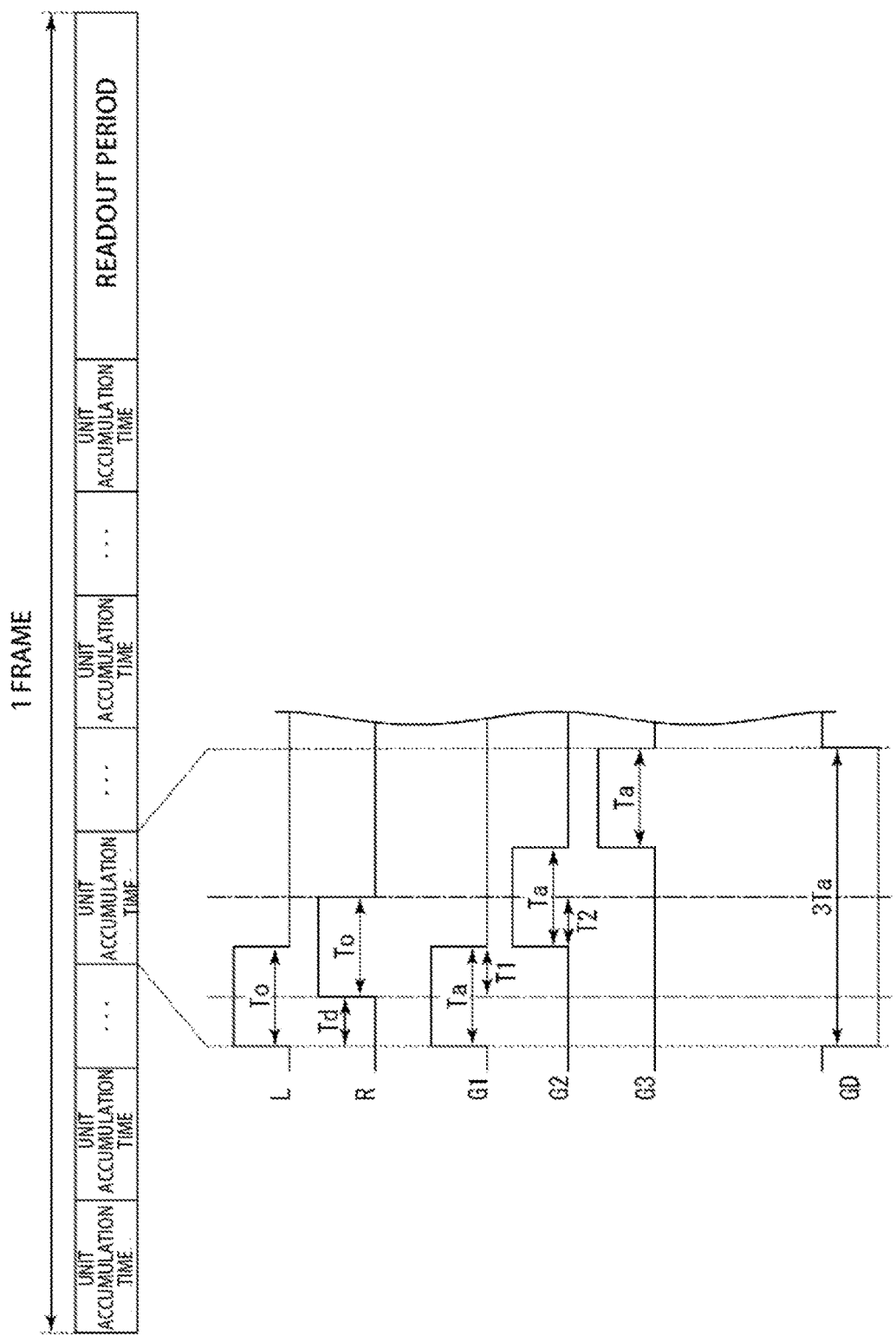
FIG. 20 is a timing chart showing an example of the timing of driving the pixel according to the second embodiment of the present invention.

The timing of driving the pixel 421 will now be described with reference to FIG. 20. FIG. 20 is a timing chart showing the timing of driving the pixel 421 according to the second embodiment.

In FIG. 20, the timing of the emission of the optical pulse PO is indicated in the section labelled L, the timing of the reception of reflected light is indicated in the section named R, the timing of a drive signal TX1 is indicated in the section labelled G1, the timing of a drive signal TX2 is indicated in the section labelled G2, the timing of a drive signal TX3 is indicated in the section labelled G3, and the timing of a drive signal RSTD is indicated in the section labelled GD. The drive signal TX1 is a signal for driving the readout gate transistor G1. The drive signals TX2 and TX3 are similar to the drive signal TX1.

As illustrated in FIG. 20, the optical pulse PO is emitted during an emission time To, and the reflected light RL is received by the range image sensor 132 after the elapse of a delay time Td. The vertical scanning circuit 423 accumulates electric charge in the charge storage units CS1, CS2, and CS3 in the stated order in synchronization with the emission of the optical pulse PO. In FIG. 20, the time for the emission of the optical pulse PO and the accumulation of the electric charge in the charge storage units CS1, CS2, and CS3 in the stated order in one distributing process is indicated as a unit accumulation period. After the distributing process for the unit accumulation period is repeated the number of times equal to the accumulation count for one frame, the amount of the electric charge accumulated during this time is read out. The time for the readout of the amount of the accumulated electric charge is indicated as a readout period.

The reception of the reflected light RL from a near object will be described first with reference to FIG. 20. The vertical scanning circuit 423 turns off the drain gate transistor GD and also turns on the readout gate transistor G1 in synchronization with the emission of the optical pulse PO. After the accumulation time Ta has elapsed from when the readout gate transistor G1 is turned on, the vertical scanning circuit 423 turns off the readout gate transistor G1. As a result, the electric charge generated through photoelectric conversion by the photoelectric conversion element PD while the readout gate transistor G1 is controlled in the on state is accumulated in the charge storage unit CS1 via the readout gate transistor G1.

Next, when turning off the readout gate transistor G1, the vertical scanning circuit 423 turns on the readout gate transistor G2 for the accumulation time Ta. As a result, the electric charge generated through photoelectric conversion by the photoelectric conversion element PD while the readout gate transistor G2 is controlled in the on state is accumulated in the charge storage unit CS2 via the readout gate transistor G2.

Next, when ending the accumulation of the electric charge in the charge storage unit CS2, the vertical scanning circuit 423 turns on the readout gate transistor G3 and turns off the readout gate transistor G3 after the elapse of the accumulation time Ta. As a result, the electric charge generated through photoelectric conversion by the photoelectric conversion element PD while the readout gate transistor G3 is controlled to be in the on state is accumulated in the charge storage unit CS3 via the readout gate transistor G3.

Next, when ending the accumulation of the electric charge in the charge storage unit CS3, the vertical scanning circuit 423 turns on the drain gate transistor GD to discharge the electric charge. As a result, the electric charge generated through photoelectric conversion by the photoelectric conversion element PD is discarded via the drain gate transistor GD.

The vertical scanning circuit 423 repeats the above-described drive the same number of times as the predetermined number of distributions over one frame. Then, the vertical scanning circuit 423 outputs voltage signals corresponding to the amounts of electric charge distributed to the individual charge storage units CS. Specifically, the vertical scanning circuit 423 turns on the selection gate transistor SL1 for a predetermined time, causing the voltage signal corresponding to the amount of electric charge accumulated in the charge storage unit CS1 through the pixel signal readout unit RU1 to be output from the output terminal O1. Likewise, the vertical scanning circuit 423 turns on the selection gate transistors SL2 and SL3 sequentially, causing the voltage signals corresponding to the amounts of electric charge accumulated in the charge storage units CS2 and CS3 to be output from the output terminals O2 and O3. Then, the electrical signal corresponding to the amount of the one-frame electric charge accumulated in each of the charge storage units CS is output to the distance calculation unit 142 through the pixel signal processing circuit 425 and the horizontal scanning circuit 424.

In the example described above, when the readout gate transistor G1 is turned on, the light source unit 102 emits the optical pulse PO. However, this is not restrictive. The light source unit 102 only emits the optical pulse PO at least when the reflected light RL from a near object is received across the charge storage units CS1 and CS2. For example, the light source unit 102 may emit the optical pulse PO before the readout gate transistor G1 is turned on. Additionally, in the example described above, the emission time To for the emission of the optical pulse PO has the same length as the accumulation time Ta. However, this is not restrictive. The emission time To and the accumulation time Ta may be different time intervals.

In the near-range light receiving pixel shown in FIG. 20, on the basis of the relationship between when the optical pulse PO is emitted and when electric charge is accumulated in each of the charge storage units CS1 to CS3, an amount of electric charge corresponding to the reflected light RL and the ambient light component is distributed to and held in the charge storage units CS1 and CS2. The charge storage unit CS3 holds an amount of electric charge corresponding to the ambient light component including background light. In this case, the charge storage units CS1 and CS2 are examples of charge storage units for distance calculation.

The allocation of electric charge distributed to the charge storage units CS1 and CS2 (distribution ratio) corresponds to a ratio that is based on the delay time Td taken for the optical pulse PO to be reflected by the object OB and enter the range imaging device 101.

For a conventional near-range light receiving pixel, the distance calculation unit 142 calculates the delay time Td based on the above principle using equation (14) below.

$$Td = To \times (Q2-Q3)/(Q1+Q2-2 \times Q3) \tag{14}$$

In the equation, To denotes the period for which the optical pulse PO is emitted, Q1 denotes the amount of electric charge accumulated in the charge storage unit CS1, Q2 denotes the amount of electric charge accumulated in the charge storage unit CS2, and Q3 denotes the amount of electric charge accumulated in the charge storage unit CS3. Equation (14) is based on the assumption that, in the amounts of electric charge accumulated in the charge storage units CS1 and CS2, the amount of electric charge corresponding to the ambient light component is equal to the amount of electric charge accumulated in the charge storage unit CS3.

For the near-range light receiving pixel, the distance calculation unit 142 multiplies the delay time Td determined from equation (14) by the speed (velocity) of light to calculate the round trip distance to the object OB. The distance calculation unit 142 then halves the calculated round trip distance to determine the distance to the object OB.

Factors causing an error in the distance (measured distance) calculated in a conventional range imaging device 101 from the amount of the accumulated electric charge will now be described.

A factor causing such an error may be that the light incident on the range imaging device 101 is reflected diffusely from an optical system such as the lens 131. In other words, such diffused reflection may affect the intensity of light received by the pixels, causing an error in the measured distance. As a measure against the factor, for example, a method is adopted for correcting the error using a correspondence table in which electric charge ratios R are associated with distances D (an example of table information). The distances herein refer to distances to the object OB. The electric charge ratio R is an example of a variable. The distance D is an example of a corresponding distance.

The electric charge ratio R herein refers to the ratio between the amounts of electric charge accumulated in the two charge storage units CS in which the reflected light RL is distributed and accumulated (the charge storage units CS1 and CS2 in FIG. 20). In this case, the electric charge ratio R is expressed as, for example, a ratio H1 in equation (15) or a ratio H2 in equation (16) below. The ratio H1 is an example of an electric charge ratio. The ratio H2 is an example of an electric charge ratio. Hereinafter, the ratio H1 or H2 is simply referred to as an electric charge ratio R.

$$H1 = Q1\#/(Q1\# + Q2\#) \quad (15)$$

$$H2 = Q2\#/(Q1\# + Q2\#) \quad (16)$$

In the equations, $Q1\# = Q1 - Qb$, $Q2\# = Q2 - Qb$,

Q1 denotes the amount of electric charge accumulated in the charge storage unit CS1,
Q2 denotes the amount of electric charge accumulated in the charge storage unit CS2, and
Qb denotes the amount of electric charge corresponding to the ambient light component accumulated in the charge storage units CS.

Even with an error in the distance calculated from equation (14), the use of the correspondence table in which electric charge ratios R are associated with distances D enables the distance to be corrected to reduce the error. A method for calculating the amount of electric charge corresponding to the ambient light component Qb will be described in detail later.

In addition, an error may be likely to occur when the two charge storage units CS in which the reflected light RL is distributed and accumulated (the charge storage units CS1 and CS2 in FIG. 20) store electric charge at an unbalanced ratio. The unbalance herein means that almost all of the electric charge resulting from the reflected light RL is accumulated in one of the two charge storage units CS, and only a small amount of the electric charge resulting from the reflected light RL is accumulated in the other charge storage unit CS. In other words, the electric charge ratio R is a value close to 0 or a value close to 1.

For example, an amount of electric charge corresponding to about 90% of the intensity of the reflected light RL may be accumulated in the charge storage unit CS1, and an amount of electric charge corresponding to the remaining about 10% of the intensity of the light may be accumulated in the charge storage unit CS2. In this case, the electric charge ratio R based on equation (15) is about 0.9, and the electric charge ratio R based on equation (16) is about 0.1. Alternatively, an amount of electric charge corresponding to about 10% of the intensity of the reflected light RL may be accumulated in the charge storage unit CS1, and an amount of electric charge corresponding to about 90% of the intensity of the light may be accumulated in the charge storage unit CS2. In this case, the electric charge ratio R based on equation (15) is about 0.1, and the electric charge ratio R based on equation (16) is about 0.9.

The charge storage units CS also store a noise component as electric charge. The noise component herein is an amount of electric charge resulting from rounding of light different from the reflected light RL (for example, an optical pulse and a gate pulse) and a delay in charge transfer. The two charge storage units CS in which the reflected light RL is distributed and accumulated also store such a noise component in a certain amount irrespective of the amount of the electric charge resulting from the reflected light RL.

When the reflected light RL is accumulated in an unbalanced manner, the noise component is accumulated in a certain amount both in the charge storage unit CS that accumulates almost all of the electric charge resulting from the reflected light RL and the charge storage unit CS that accumulates a small amount of the electric charge resulting from the reflected light RL. This lowers the SN ratio in the charge storage unit CS that accumulates a small amount of the electric charge resulting from the reflected light RL. The letter S in the SN ratio refers to an intended signal component, which is an amount of electric charge resulting from the reflected light RL and used for distance calculation. The letter N refers to an amount of electric charge resulting from the noise component. When an amount of electric charge with a low SN ratio is used for distance calculation, the calculation result is likely to have an error. With a low SN ratio, that is, with the electric charge ratio R in an unbalanced state in which the electric charge ratio R exceeds a predetermined threshold (for example, 0.9), an ideal formula, which does not take noise into account, is no longer applicable, resulting in a larger error in distance measurement. As a measure against the issue, table intervals may be uniformly fine (narrow). However, with a high SN ratio, that is, with the electric charge ratio R not in the unbalanced state, the unnecessarily narrow table intervals cause the table to occupy a larger amount of memory.

As a measure against the issue, in the second embodiment, the table information 540 is created in such a way that table intervals differ between balanced accumulation and unbalanced accumulation of the reflected light RL. The table intervals herein refer to intervals corresponding to the difference between adjacent ones of the variables (the electric charge ratios R or the distances D) listed in ascending or descending order in the table information 540.

In the example described below, the variables in the table information 540 are the electric charge ratios R. However, this is not restrictive. The table information 540 can be created in such a way that table intervals differ between balanced accumulation and unbalanced accumulation of the reflected light RL also when the variables in the table information 540 are the distances D.

The unbalanced accumulation of the reflected light RL corresponds, for example, to cases in which the ratio between the amounts of electric charge accumulated in the two charge storage units CS in which the reflected light RL is distributed and accumulated (the charge storage units CS1 and CS2 in FIG. 20) is equal to or greater than a predetermined value. The predetermined value herein may be freely determined depending on the target accuracy of distance measurement. Such a state in which the reflected light RL is accumulated in an unbalanced manner is an example of an unbalanced state.

For example, the table information 540 is created in such a way that among the electric charge ratios R included in the table information 540, the electric charge ratios R within a certain range (the possible range of electric charge ratios when the reflected light RL is accumulated in an unbalanced manner) have a narrow and fine table interval. In contrast, the table information 540 is created in such a way that the electric charge ratios R within another range (the possible range of electric charge ratios when the reflected light RL is not accumulated in an unbalanced manner) have a wide and coarse table interval (see FIGS. 22, 31, and 33). As a result, when the distance D is to be determined from the electric charge ratios R within a range in which an error is likely to occur, the appropriate electric charge ratio can be selected from the set of electric charge ratios defined with the narrow table interval. This can improve the accuracy in distance determination.

Figures 21, 22:
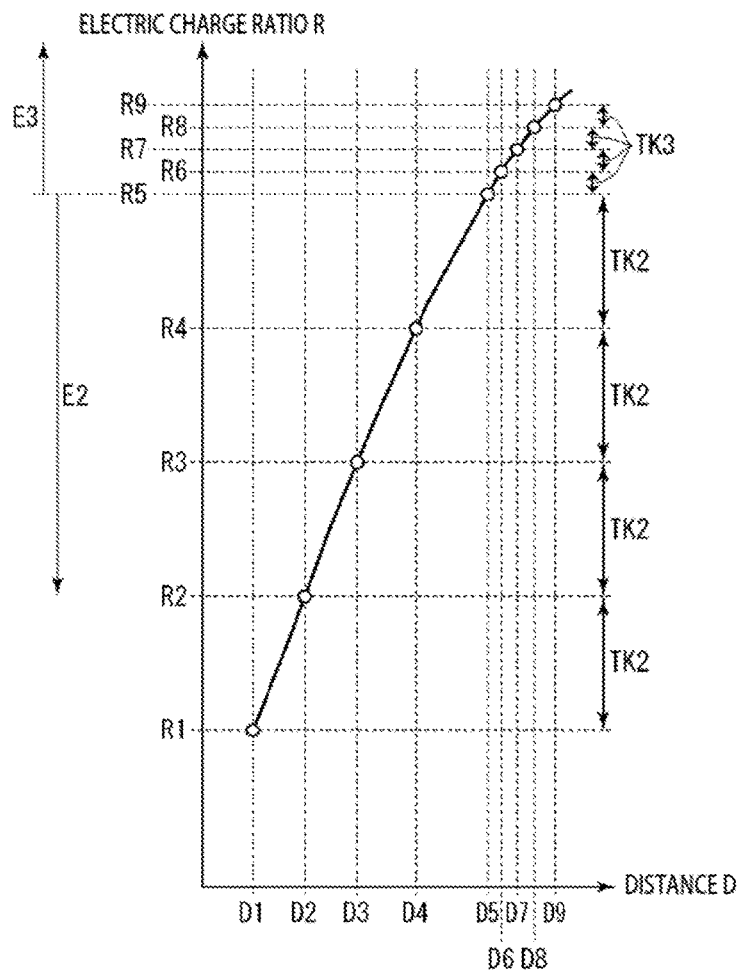
FIG. 21 shows an example structure of table information according to the second embodiment of the present invention.
FIG. 22 illustrates the table information according to the second embodiment of the present invention.

The table information 540 will now be described with reference to FIGS. 21 and 22. FIG. 21 shows an example structure of the table information 540 according to the second embodiment. As shown in FIG. 21, the table information 540 includes, for example, a threshold electric charge ratio section, a table interval section, an electric charge ratio section, and a distance section. The threshold electric charge ratio section indicates information representing a threshold for changing table intervals. The table interval section indicates information representing intervals between electric charge ratios in the table information 540. The electric charge ratio section indicates ratio s expressed by equation (15) or (16). The distance section indicates the distances associated with the electric charge ratios. In the example in FIGS. 21 and 22, the set of electric charge ratios smaller than a threshold electric charge ratio R5 (the electric charge ratios R1 to R4) has a table interval TK2, whereas the set of electric charge ratios equal to or greater than the threshold electric charge ratio R5 (the electric charge ratios R5 to R9) has a table interval TK3.

FIG. 22 illustrates the table information 540 according to the embodiment. FIG. 22 shows the electric charge ratio R on the vertical axis and the distance D on the horizontal axis. In FIG. 22, two ranges E2 and E3 are set in accordance with the magnitude of the electric charge ratio R on the vertical axis. The range E2 is a range in which the electric charge ratio is smaller than the electric charge ratio R5. The range E3 is a range in which the electric charge ratio is equal to or greater than the electric charge ratio R5. The range E2 is an example of a second range. The range E3 is an example of a third range.

FIG. 22 shows the relationship between the electric charge ratio R and the distance D based on the table information 540 in FIG. 21. In the table information 540 in FIG. 21, the electric charge ratio R5 is set as a threshold electric charge ratio. In this case, the electric charge ratios R1 to R4 in the range E2 have the table interval TK2. The electric charge ratios R5 to R9 in the range E3 have the table interval TK3. The interval TK3 is smaller than the interval TK2.

FIG. 22 shows an example in which the electric charge ratio R is expressed by equation (16). In other words, FIG. 22 shows a steadily rising profile in which the distance D increases as the electric charge ratio R increases. When the electric charge ratio R is expressed by equation (15), the profile declines steadily, or the distance D decreases as the electric charge ratio R increases. In this case, the threshold electric charge ratio is set to (1.0—the electric charge ratio R5), and the table interval for the electric charge ratios equal to or smaller than the threshold electric charge ratio set finely, whereas the table interval for the electric charge ratios greater than the threshold electric charge ratio is set coarsely.

Figure 23:
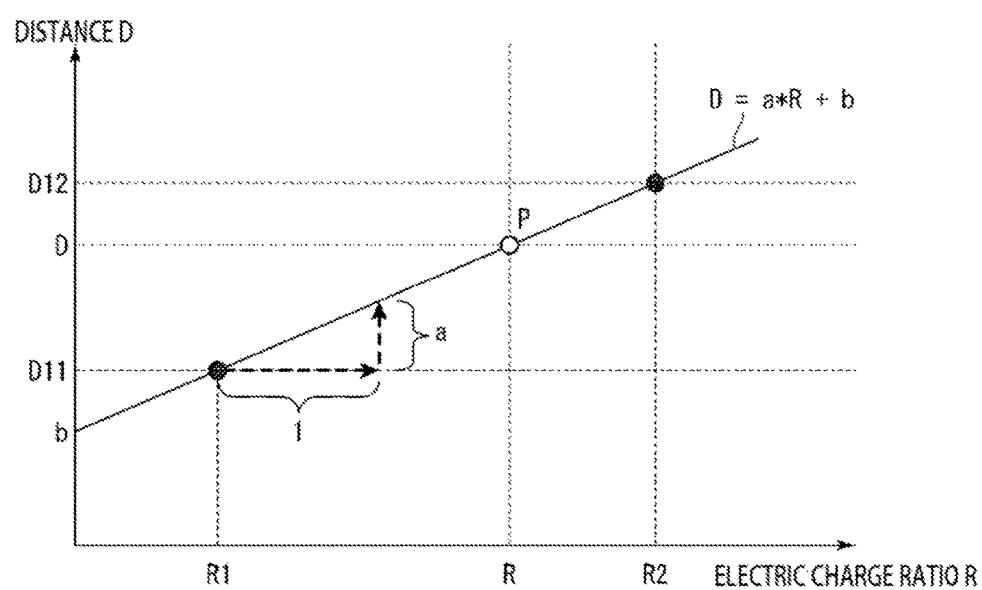
FIG. 23 illustrates linear interpolation processing performed by a range image processing unit according to the second embodiment of the present invention using the table information.

FIG. 23 illustrates linear interpolation processing performed by the range image processing unit 104 according to the second embodiment using the table information 540. FIG. 23 shows a part of the profile in FIG. 22 (the range of the electric charge ratios R1 to R2). In the example of FIG. 23, the electric charge ratio calculated based on the amount of electric charge accumulated in the photoelectric conversion element PD is an electric charge ratio R corresponding to the middle value between the electric charge ratio R1 and the electric charge ratio R2. In this case, the distance calculation unit 142 may calculate the distance corresponding to the electric charge ratio R through linear interpolation between the distance D11 corresponding to the electric charge ratio R1 and the distance D12 corresponding to the electric charge ratio R2. The linear interpolation enables the distance to be calculated with higher accuracy.

Furthermore, the multiple electric charge ratios R in the table information 540 may have an interval determined so that the distance resulting from linear interpolation between two distances D has accuracy within a predetermined range. In this case, the interval between the multiple electric charge ratios R in the table information 540 is determined to be, for example, within a range in which the profile can be regarded as being linear.

As described above, when the reflected light RL is accumulated in an unbalanced manner, rounding of an optical pulse and a gate pulse and a delay in charge transfer tend to lower the SN ratio for the electric charge ratio R, causing the relationship between the electric charge ratio R and the distance D to be nonlinear. In such a range in which the relationship is nonlinear, the table interval is narrowed. This enables the distance to be determined with higher accuracy through linear interpolation.

Figure 24:
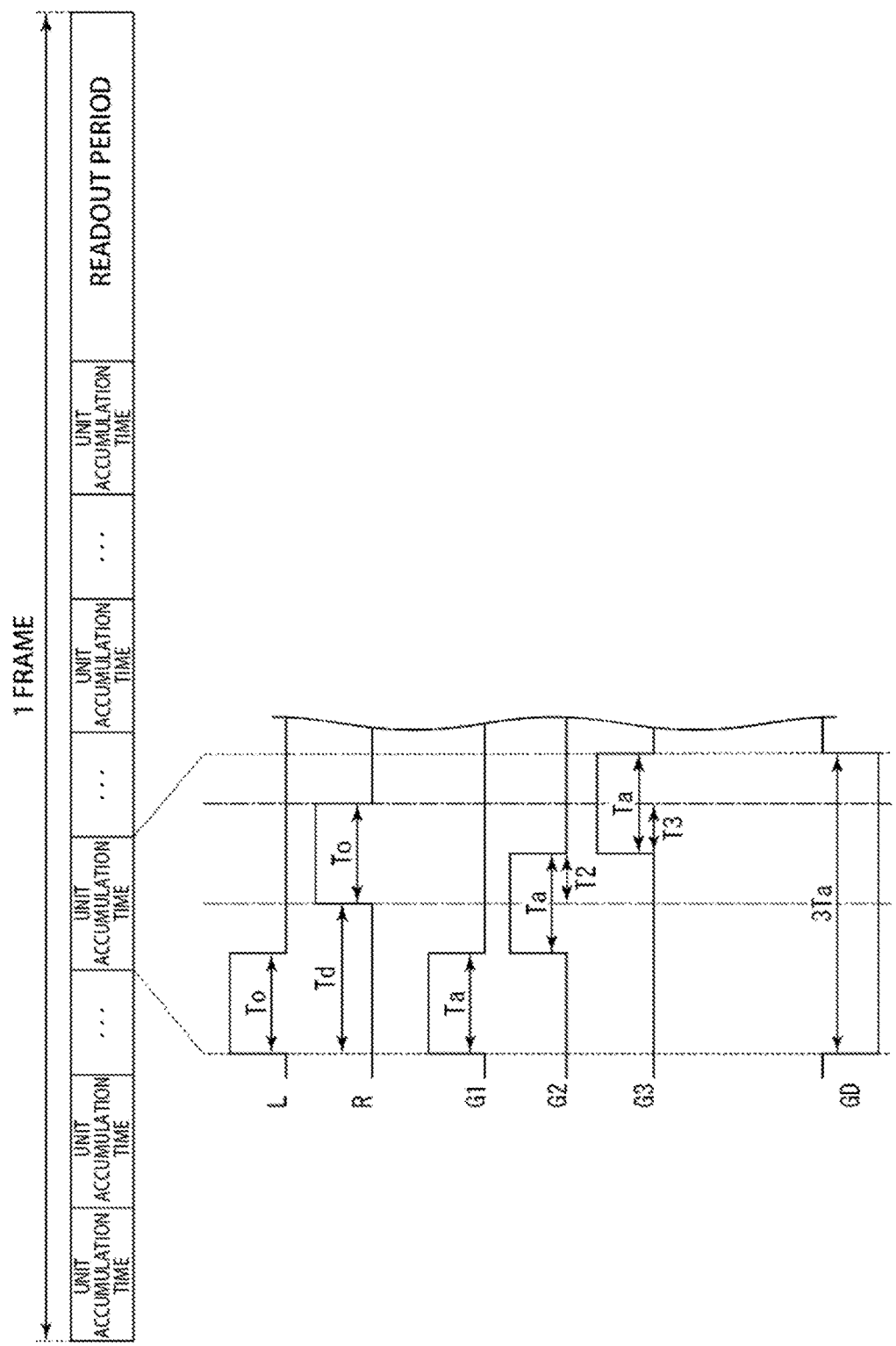
FIG. 24 illustrates ambient light component determination processing performed by the range image processing unit according to the second embodiment of the present invention.
Figure 25:
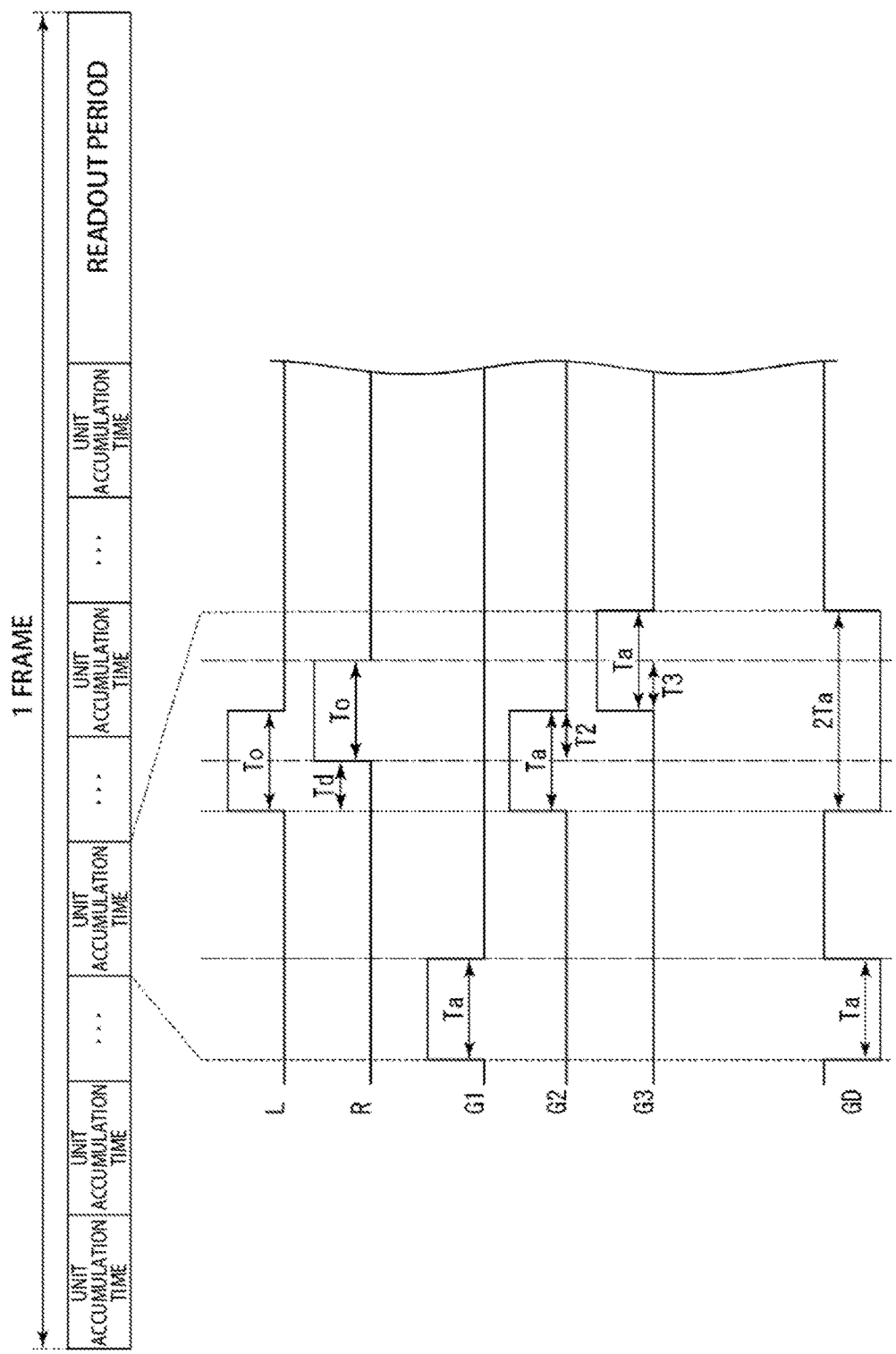
FIG. 25 illustrates ambient light component determination processing performed by the range image processing unit according to the second embodiment of the present invention.

A method for calculating the amount of electric charge corresponding to the ambient light component Qb will now be described with reference to FIGS. 24 and 25. FIGS. 24 and 25 illustrate ambient light component determination processing performed by the range image processing unit 104 according to the second embodiment.

(Method 3 for Calculating Amount of Electric Charge Corresponding to Ambient Light Component Qb)

FIG. 24 is a timing chart for the reception of the reflected light RL from a distant object compared with FIG. 20. In FIG. 24, the time at which the vertical scanning circuit 423 emits the optical pulse PO, and the times at which the readout gate transistors G1 to G3 and the drain gate transistor GD are turned on are the same as in FIG. 20 and will thus not be described.

As illustrated in FIG. 24, in which the delay time Td is greater than in the timing chart of FIG. 20, when electric charge is accumulated in each of the charge storage units CS1 to CS3 at the same time as in FIG. 20, an amount of electric charge corresponding to the ambient light component Qb is accumulated in the charge storage unit CS1, and the reflected light RL and an amount of electric charge corresponding to the ambient light component Qb are distributed and accumulated in the charge storage units CS2 and CS3. In this case, the charge storage units CS2 and CS3 are examples of charge storage units for distance calculation.

In other words, when the delay time Td is not great (in the case of FIG. 20), an amount of electric charge corresponding to the ambient light component Qb is accumulated in the charge storage unit CS3, and when the delay time Td is great (in the case of FIG. 24), an amount of electric charge corresponding to the ambient light component Qb is accumulated in the charge storage unit CS1. In both FIGS. 20 and 24, an equal amount of electric charge corresponding to the ambient light component Qb is accumulated in each of the charge storage units CS1 to CS3. Thus, the charge storage units CS in which the reflected light RL is distributed and accumulated store a greater amount of electric charge than the other charge storage unit CS storing only the ambient light component.

Based on this property, the distance calculation unit 142 determines the smallest amount of electric charge among the amounts of electric charge accumulated in the charge storage units CS1 to CS3, as the amount of electric charge corresponding to the ambient light component Qb.

Method 4 for Calculating Amount of Electric Charge Corresponding to Ambient Light Component Qb The range imaging device 101 may control timing in such a way that a predetermined specific charge storage unit CS stores only an amount of electric charge corresponding to the ambient light component Qb. In this case, the distance calculation unit 142 may determine the amount of electric charge accumulated in the specific charge storage unit CS as the amount of electric charge corresponding to the ambient light component Qb irrespective of the length of the delay time Td.

FIG. 25 is a timing chart with timing controlled in such a way that the charge storage unit CS1 stores only an amount of electric charge corresponding to the ambient light component Qb. In FIG. 25, the time at which the vertical scanning circuit 423 emits the optical pulse PO, and the times at which the readout gate transistors G1 to G3 and the drain gate transistor GD are turned on are the same as in FIG. 20 and will thus not be described.

As shown in the example in FIG. 25, the accumulation of electric charge in the charge storage unit CS1 before the emission of the optical pulse PO allows the charge storage unit CS1 to store only an amount of electric charge corresponding to the ambient light component Qb. In this case, the distance calculation unit 142 determines the amount of electric charge accumulated in the charge storage unit CS1 as the amount of electric charge corresponding to the ambient light component Qb. In this case, the charge storage unit CS1 is an example of a predetermined charge storage unit for storing ambient light.

Figure 26:
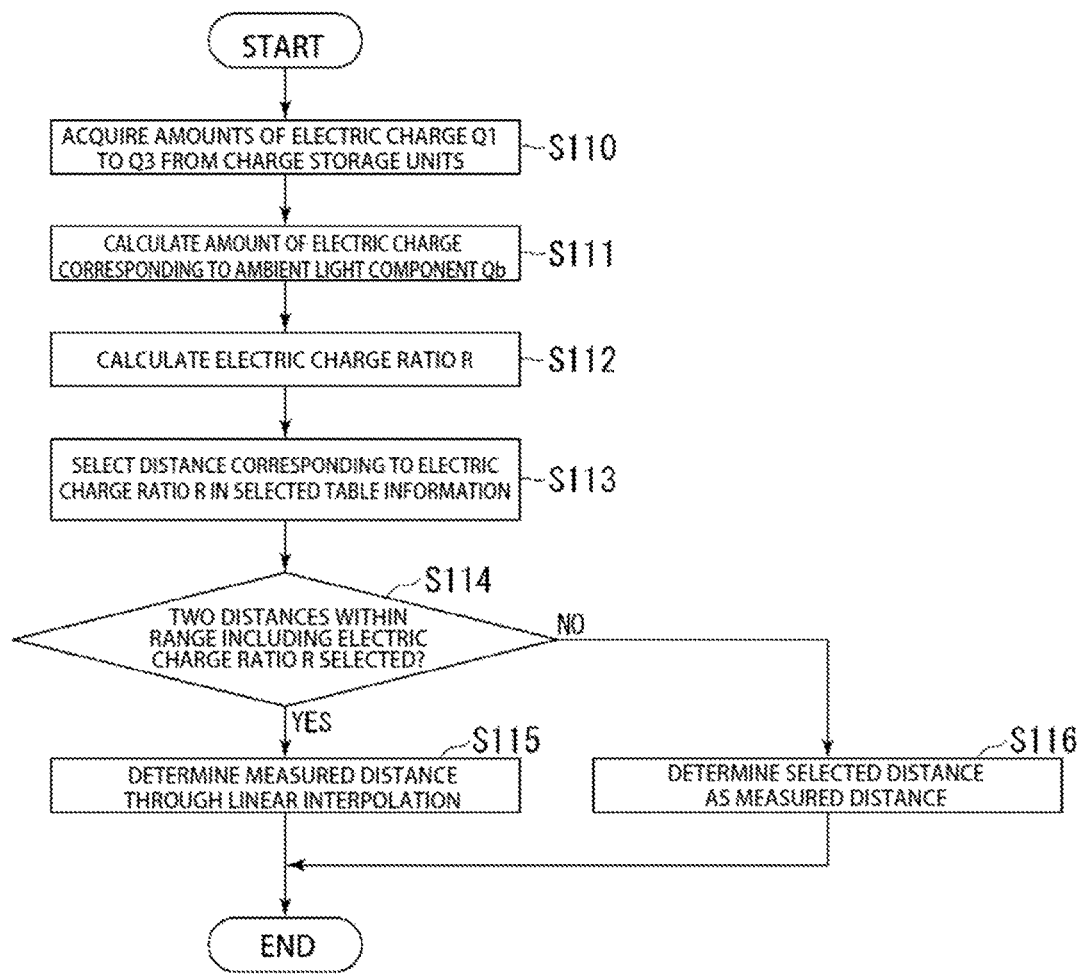
FIG. 26 is a flowchart showing the procedure performed by the range image processing unit according to the second embodiment of the present invention.

FIG. 26 is a flowchart showing the procedure performed by the range image processing unit 104 according to the second embodiment. The distance calculation unit 142 acquires the amounts of electric charge Q1 to Q3 accumulated respectively in the charge storage units CS1 to CS3 (step S110). The distance calculation unit 142 uses the acquired amounts of electric charge Q1 to Q3 to calculate the amount of electric charge corresponding to the ambient light component Qb (step S111). The distance calculation unit 142 may determine the smallest amount of electric charge among the amounts of electric charge Q1 to Q3 as the amount of electric charge Qb or determine the amount of electric charge accumulated in a predetermined specific charge storage unit CS (for example, the charge storage unit CS1 in FIG. 25) as the amount of electric charge Qb.

The distance calculation unit 142 uses the amounts of electric charge Q1 to Q3 and the amount of electric charge Qb to calculate the electric charge ratio R (step S112). For example, the distance calculation unit 142 calculates the electric charge ratio R by substituting the amounts of electric charge Q1 to Q3 and the amount of electric charge Qb into equation (2) or (3). In this case, the distance calculation unit 142 selects equation (15) or (16) in a manner that matches the list of the electric charge ratios R indicated in the table information 540, and uses the selected equation to calculate the electric charge ratio R.

The distance calculation unit 142 uses the table information 540 to select the distance corresponding to the electric charge ratio R calculated in step S112 (step S113). In this case, the distance calculation unit 142 may select the two distances corresponding to two electric charge ratios for linear interpolation or select the one distance corresponding to the electric charge ratio closest to the electric charge ratio R calculated in step S112.

If selecting two distances (YES in step S114), the distance calculation unit 142 determines the distance (measured distance) through linear interpolation (step S115). If selecting one distance (NO in step S114), the distance calculation unit 142 determines the selected distance as the corrected distance (measured distance) (step S116).

In the example described above, the pixel 421 in the range imaging device 101 includes the three charge storage units CS1 to CS3. However, this is not restrictive. The pixel 421 in the range imaging device 101 may include four or more (for example, N (N≥4)) charge storage units CS.

When the pixel 421 in the range imaging device 101 includes N (N≥4) charge storage units CS, in step S110, the distance calculation unit 142 acquires the amounts of electric charge Q1 to QN accumulated respectively in the charge storage units CS1 to CSN. In step S111, the distance calculation unit 142 uses the acquired amounts of electric charge Q1 to QN to calculate the amount of electric charge corresponding to the ambient light component Qb. The method by which the distance calculation unit 142 calculates the amount of electric charge Qb is the same as when the pixel 421 in the range imaging device 101 includes the three charge storage units CS1 to CS3.

In step S112, the distance calculation unit 142 selects, from the charge storage units CS1 to CSN, the two charge storage units CS in which the electric charge corresponding to the reflected light RL is distributed and accumulated (charge storage units for distance measurement). The method by which the distance calculation unit 142 selects the two charge storage units CS is described below. For example, among combinations of two charge storage units CS in which electric charge is accumulated successively, the distance calculation unit 142 determines the combination in which the sum of the amounts of electric charge accumulated in the respective charge storage units CS is largest, as the two charge storage units CS in which the electric charge corresponding to the reflected light RL is distributed and accumulated (charge storage unit for distance measurement). The distance calculation unit 142 calculates the electric charge ratio R using the amount of electric charge accumulated in each of the two charge storage units CS in which the electric charge corresponding to the reflected light RL is distributed and accumulated and also using the amount of electric charge corresponding to the ambient light component Qb. The processing in steps S13 to S16 is the same as when the pixel 421 in the range imaging device 101 includes the three charge storage units CS1 to CS3.

Alternatively, the pixel 421 in the range imaging device 1 may include two charge storage units CS. In this case, per measurement, the range imaging device 1 performs two types of charge accumulation processing: the processing of accumulating only the electric charge corresponding to the ambient light component (referred to as first processing), and the processing of accumulating electric charge including the reflected light RL (referred to as second processing). For example, the range imaging device 1 performs the first processing in the first frame and the second processing in the next frame. In the first processing, the range imaging device 101 accumulates the electric charge in each of the charge storage units CS1 and CS2 without emitting the optical pulse PO. In the second processing, the range imaging device 101 emits the optical pulse PO and accumulates the electric charge in each of the charge storage units CS1 and CS2.

In this case, in step S110, the distance calculation unit 142 acquires the amounts of electric charge Q1$f$ and Q2$f$ accumulated respectively in the charge storage units CS1 and CS2 in the first processing. The distance calculation unit 142 also acquires the amounts of electric charge Q1$s$ and Q2$s$ accumulated respectively in the charge storage units CS1 and CS2 in the second processing. In step S111, the distance calculation unit 142 determines one or both of the acquired amounts of electric charge Q1$f$ and Q2$f$ as the amount of electric charge corresponding to the ambient light component Qb. In step S112, the distance calculation unit 142 uses the acquired amounts of electric charge Q1$s$ and Q2$s$ and the amount of electric charge Qb to calculate the electric charge ratio R. The method by which the distance calculation unit 142 calculates the electric charge ratio R is the same as when the pixel 421 in the range imaging device 101 includes the three charge storage units CS1 to CS3.

As described above, the range imaging device 101 according to the second embodiment includes the light source unit 102, the light-receiving unit 103, the storage unit 144, and the range image processing unit 104. The light source unit 102 emits the optical pulse PO to a measurement space where the object OB is located. The light-receiving unit 103 includes the pixel 421 and the vertical scanning circuit 423 (an example of a driving circuit). The pixel 421 includes the photoelectric conversion element PD and the at least three charge storage units CS. The vertical scanning circuit 423 distributes and accumulates electric charge in each of the charge storage units CS in the pixel 421 at a predetermined time in synchronization with the emission of the optical pulse PO. The storage unit 144 stores the table information 540. The table information 540 is information associating the electric charge ratio R with the distance to the object OB (corresponding distance). The range image processing unit 104 determines the measured distance to the object OB using the amount of electric charge accumulated in each of the charge storage units CS and the table information 540. The electric charge ratio R is a ratio indicated using the amounts of electric charge (the amounts of electric charge for distance calculation) obtained by subtracting the amount of electric charge corresponding to the ambient light component from each of the amounts of electric charge accumulated in, among the at least three charge storage units CS, at least two charge storage units CS in which the electric charge corresponding to the reflected light RL is distributed and accumulated. Specifically, the electric charge ratio R is a ratio expressed using the amounts of electric charge Q1 # and Q2 #, such as the ratio of the amount of electric charge Q2 # to the sum of the amounts of electric charge Q1 # and Q2 #. The amount of electric charge Q1 # is the amount of electric charge (a first amount of electric charge for distance calculation) obtained by subtracting the amount of electric charge corresponding to the ambient light component Qb from the amount of electric charge Q1 (a first amount of electric charge) accumulated in the charge storage unit CS1 in FIG. 20. The charge storage unit CS1 is the charge storage unit CS in which an amount of electric charge corresponding to the reflected light RL being the optical pulse PO reflected from the object OB is accumulated first among the multiple charge storage units CS and is an example of a first charge storage unit. The amount of electric charge Q2 # is the amount of electric charge (a second amount of electric charge for distance calculation) obtained by subtracting the amount of electric charge corresponding to the ambient light component Qb from the amount of electric charge Q2 (a second amount of electric charge) accumulated in the charge storage unit CS2 in FIG. 20. The charge storage unit CS2 is the charge storage unit CS in which an amount of electric charge corresponding to the reflected light RL being the optical pulse PO reflected from the object OB is accumulated next to the charge storage unit CS1 among the multiple charge storage units CS and is an example of a second charge storage unit. In the table information 540, the variables in the unbalanced state have a table interval narrower than the table interval of the variables not in the unbalanced state. The unbalanced state refers to a state in which the amount of electric charge Q1 # and the amount of electric charge Q2 # are extremely unbalanced, and the ratio between the amount of electric charge Q1 # and the amount of electric charge Q2 #(the electric charge ratio R) is greater than a predetermined threshold. The unbalanced state is, for example, a state in which the electric charge ratio R is higher than a predetermined upper limit or lower than a predetermined lower limit. The variables are the electric charge ratios R or the distances D in the table information 540. The table interval is the difference between adjacent ones of the variables listed in ascending order in the table information 540. The range image processing unit 104 calculates the electric charge ratio R based on the amount of electric charge accumulated in each of the multiple charge storage units CS, acquires the distance corresponding to the calculated electric charge ratio R from the table information 540, and uses the acquired corresponding distance to determine the measured distance.

In this manner, the range imaging device 101 according to the second embodiment can use the table information 540 to acquire the distance D corresponding to the electric charge ratio R. Thus, even with an error in the distance calculated based on the amounts of electric charge Q1 to Q3 accumulated in the charge storage units CS1 to CS3, the distance can be corrected to be closer to the actual distance. That is, the distance calculated based on the amounts of electric charge Q1 to Q3 accumulated in the charge storage units CS1 to CS3 can be corrected to be closer to the actual distance D. Moreover, in the second embodiment, the table information 540 is created in such a way that the table interval is narrower when the amounts of accumulated electric charge Q1 # and Q2 # are unbalanced than when the amounts of accumulated electric charge Q1 # and Q2 # are balanced. Thus, even when the amounts of accumulated electric charge Q1 # and Q2 # are unbalanced, and an error is likely to occur, the distance can be corrected with high accuracy. In addition, the memory allocation to the table can be regulated compared with the case in which the table information 540 includes uniformly narrowed table intervals. Accordingly, the nonlinear table intervals enable regulation of the memory allocation and also accurate calculation for a distance deviation region. The distance deviation region refers to a region in the unbalanced state in which the SN ratio is low, or the electric charge ratio R exceeds the predetermined threshold.

In the range imaging device 101 according to the second embodiment, each of the electric charge ratios R (variables) included in the table information 540 is a value within one of the ranges E2 and E3 in FIG. 22. The range E2 is a range in which the electric charge ratio R is smaller than the threshold electric charge ratio R5 (a second threshold) and is an example of a second range. The range E3 is a range in which the electric charge ratio R is equal to or greater than the threshold electric charge ratio R5 and is an example of a third range. The table interval in the range E3 is narrower than the table interval in the range E2. Thus, even in an unbalanced state in which an error is likely to occur with the amount of accumulated electric charge Q1 # greater than the amount of accumulated electric charge Q2 #, the distance can be corrected with high accuracy.

Also, in the range imaging device 101 according to the second embodiment, the range image processing unit 104 determines the corrected distance through linear interpolation. The range image processing unit 104 uses the table information 540 to extract a first distance (for example, the distance D11) associated with an electric charge ratio (for example, the electric charge ratio R1) smaller than the calculated electric charge ratio R and a second distance (for example, the distance D12) associated with an electric charge ratio (for example, the electric charge ratio R2) greater than the electric charge ratio R. The range image processing unit 104 performs linear interpolation between the extracted first distance (for example, the distance D11) and the extracted second distance (for example, the distance D12), and determines the resultant distance as the corrected distance (measured distance). In the second embodiment, the table information 540 is created in such a way that the table interval is narrowed when the amounts of accumulated electric charge Q1 # and Q2 # are unbalanced than when the amounts are balanced, thus enabling the distance to be corrected with higher accuracy through linear interpolation.

The range image processing unit 104 according to the second embodiment determines the smallest amount of electric charge among the amounts of electric charge accumulated in the charge storage units CS1 to CS3, as the amount of electric charge corresponding to the ambient light component Qb. Thus, the range imaging device 101 according to the second embodiment enables the amount of electric charge corresponding to the ambient light component Qb to be calculated by simply comparing the amounts of electric charge accumulated in the charge storage units CS1 to CS3.

The range image processing unit 104 according to the second embodiment controls accumulation timing in such a way that a specific charge storage unit CS of the charge storage units CS1 to CS3 stores only an amount of light corresponding to the ambient light component. The distance calculation unit 142 determines the amount of electric charge accumulated in the specific charge storage unit CS, as the amount of electric charge corresponding to the ambient light component Qb. Thus, the range imaging device 101 according to the second embodiment enables the amount of electric charge accumulated in the specific charge storage unit CS to be calculated as the amount of electric charge corresponding to the ambient light component Qb, and the amount of electric charge corresponding to the ambient light component Qb can easily be determined.

Figure 27:
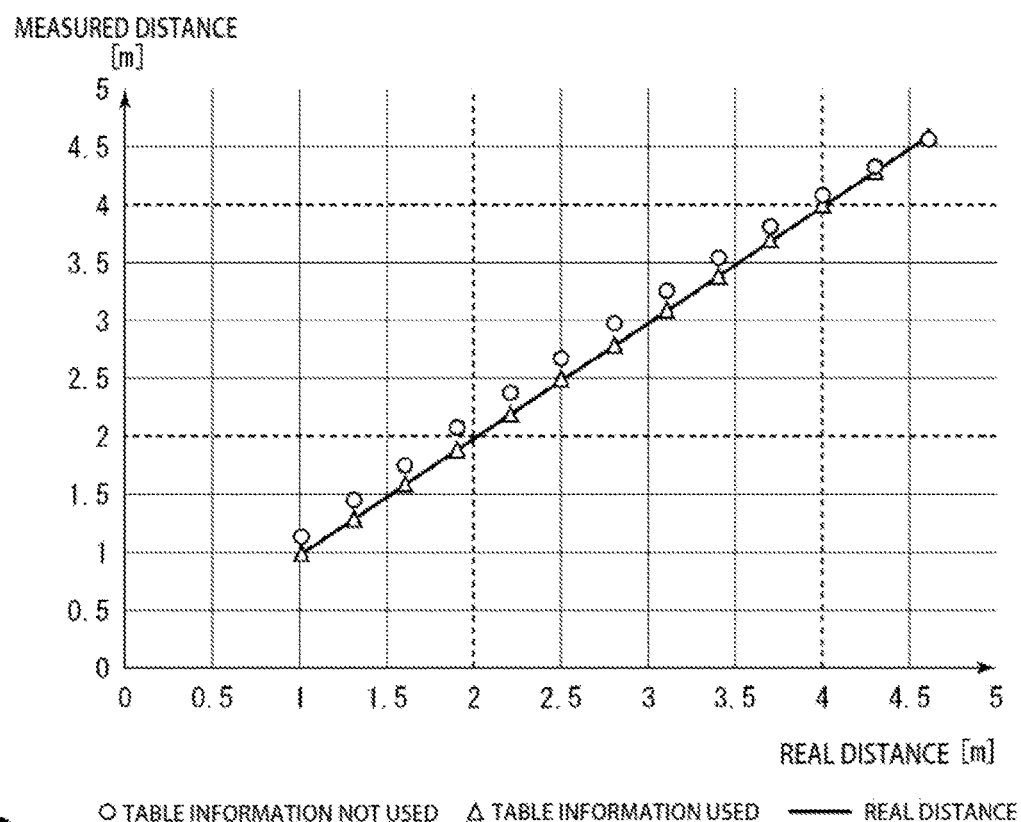
FIG. 27 illustrates advantageous effects of the second embodiment of the present invention.

The advantageous effects of the range imaging device 101 according to the second embodiment will now be described with reference to FIG. 27. FIG. 27 illustrates the advantageous effects of the first embodiment and also the advantageous effects of the second embodiment. FIG. 27 shows the relationship between the actual distance (real distance) and the measured distance. FIG. 27 shows the real distance on the horizontal axis and the measured distance on the vertical axis. The distances here are distances to the object OB. In FIG. 27, white circles indicate distances measured without the use of the table information 540 (with table information not used), such as distances calculated by substituting the amounts of electric charge Q1 to Q3 into equation (14). White triangles indicate distances measured using the table information 540 (with table information used), which are distances calculated using the table information 540. As illustrated in FIG. 27, the distances measured with table information used match the real distances. In contrast, the distances measured with table information not used are values inconsistent with the real distances and including errors. In other words, the range imaging device 101 according to the second embodiment can calculate the value closer to the real distance by determining the measured distance using the table information 540.

First Modification of Second Embodiment

A first modification of the second embodiment will now be described. The first modification is different from the above-described second embodiment in that the storage unit 144 stores table information 540 for each of multiple time windows. The time windows correspond to combinations of charge storage units for distance measurement. The charge storage units for distance measurement are two charge storage units CS in which an electric charge corresponding to the reflected light RL is distributed and accumulated.

For example, in FIG. 20, the combination of charge storage units for distance measurement is the set of the charge storage units CS1 and CS2. This combination corresponds to the first time window. The distance D is determined in accordance with the electric charge ratio R of electric charge distributed and accumulated within the first time window.

In FIG. 24, the combination of charge storage units for distance measurement is the set of the charge storage units CS2 and CS3. This combination corresponds to the second time window. The distance D is determined in accordance with the electric charge ratio R of electric charge distributed and accumulated within the second time window.

Figure 28:
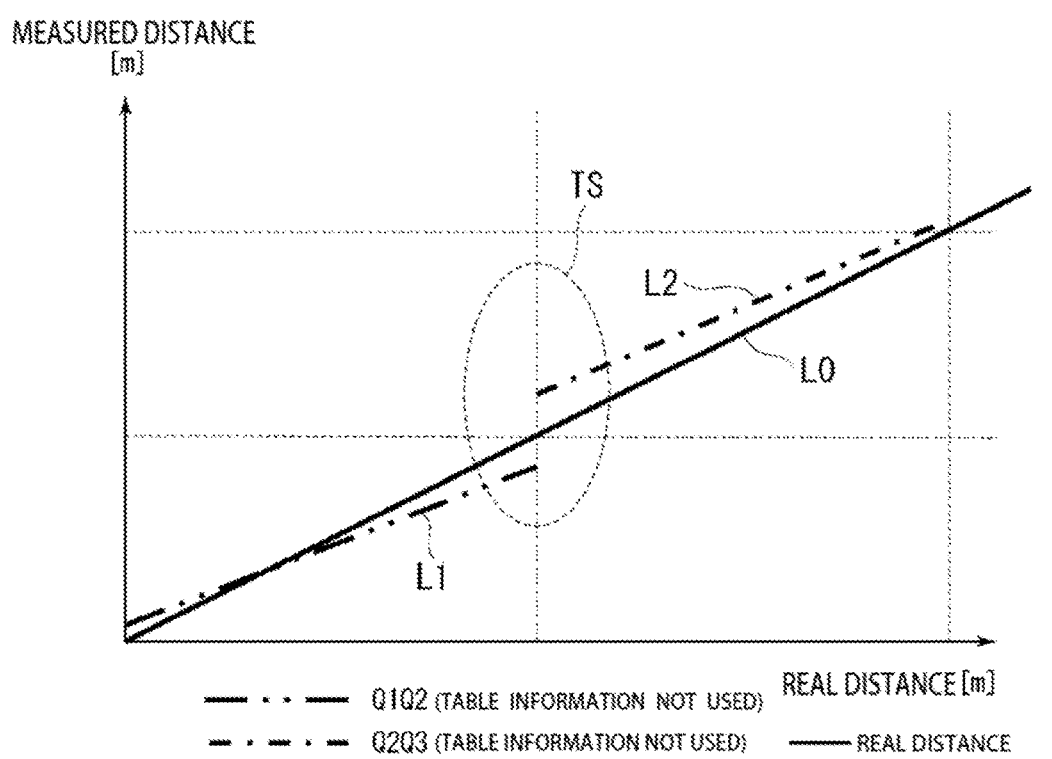
FIG. 28 illustrates two time windows according to a modification of the second embodiment of the present invention.

FIG. 28 illustrates the profiles of two time windows according to the first modification of the second embodiment. The profiles here represent correspondence between the real distance and the measured distance. FIG. 28 shows the real distance on the horizontal axis and the measured distance on the vertical axis. Profile L0 represents an ideal relationship between the real distance and the measured distance. Profile L1 represents the relationship between the real distance and the measured distance within the first time window. Profile L2 represents the relationship between the real distance and the measured distance within the second time window. As shown in the example in FIG. 28, one time window and another time window often have different correspondences between the real distance and the measured distance. Thus, the table information 540 that enables accurate correction within one time window may not enable accurate distance correction within another time window. In addition, as described above, when the electric charge corresponding to the reflected light RL is accumulated in an unbalanced manner, an error is likely to occur. As a result, a distance error may be larger in a time window connecting part TS.

In the first time window, the reflected light RL is received from an object OB located nearer than in the second time window. In this case, the table information 540 corresponding to the first time window is an example of short-range information. In contrast, in the second time window, the reflected light RL is received from an object OB located farther than in the first time window. In this case, the table information 540 corresponding to the second time window is an example of long-range information.

As a measure against the above issue, in the first modification of the second embodiment, the table information 540 for each time window is created beforehand in the storage unit 144 and stored in the storage unit 144.

FIGS. 29 and 30 show example structures of table information 540A and table information 540B according to the first modification of the second embodiment. FIG. 29 shows the table information 540A used for a combination of charge storage units for distance measurement corresponding to one time window (in this example, the charge storage units CS1 and CS2). FIG. 30 shows the table information 540B used for a combination of charge storage units for distance measurement corresponding to another time window (for example, the charge storage units CS2 and CS3). The table information 540A, 540B created for each time window in this manner enables correction appropriate to the corresponding time window.

As illustrated in FIG. 29, the table information 540A includes, for example, a time window section, a threshold electric charge ratio section, a table interval section, an electric charge ratio section, and a distance section. The time window section indicates information representing a combination of charge storage units for distance measurement. In the example in FIG. 29, the time window section contains Q1Q2, which indicates that the combination of charge storage units for distance measurement is the set of the charge storage units CS1 and CS2. The threshold electric charge ratio section, the table interval section, the electric charge ratio section, and the distance section are the same as in FIG. 21 and will thus not be described.

As illustrated in FIG. 30, the table information 540B includes, for example, a time window section, a threshold electric charge ratio section, a table interval section, an electric charge ratio section, and a distance section. The time window section is the same as in FIG. 29, and the threshold electric charge ratio section, the table interval section, the electric charge ratio section, and the distance section are the same as in FIG. 21. These sections will thus not be described. In the example in FIG. 30, the time window section contains Q2Q3, which indicates that the combination of charge storage units for distance measurement is the set of the charge storage units CS2 and CS3. In this example, the set of electric charge ratios smaller than a threshold electric charge ratio R15 (electric charge ratios R11 to R14) has a table interval TK4, whereas the set of electric charge ratios equal to or greater than the threshold electric charge ratio R15 (electric charge ratios R15 to R19) has a table interval TK5.

Figures 31, 32:
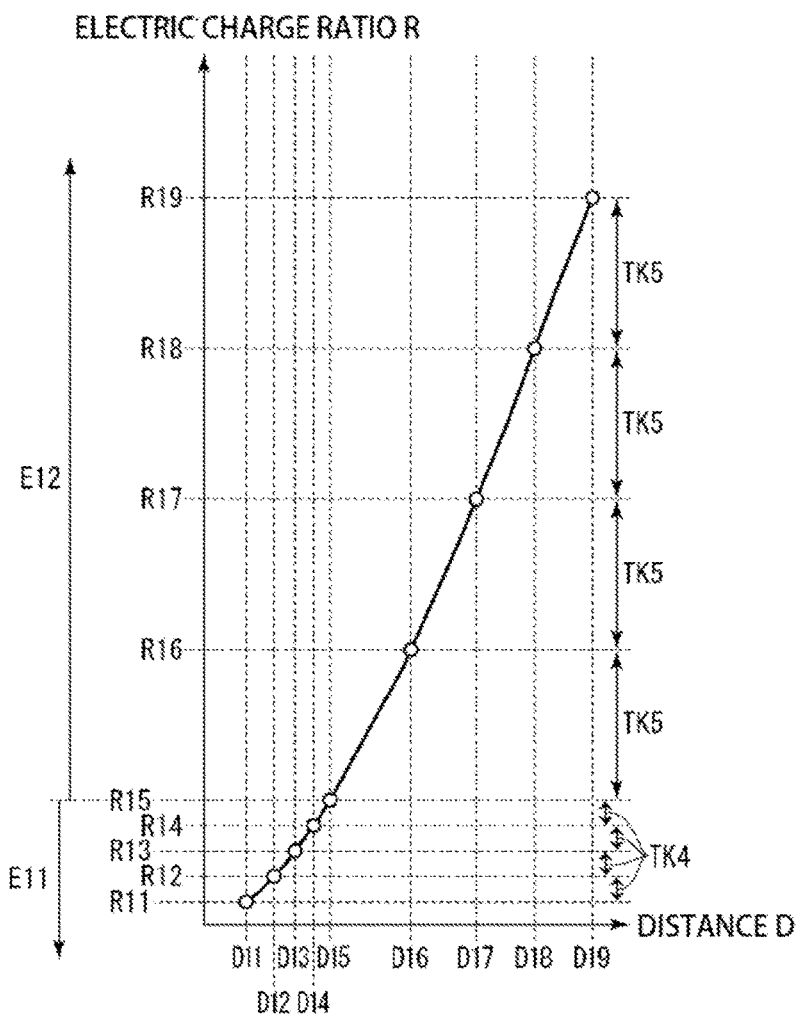
FIG. 31 illustrates the table information according to the modification of the second embodiment of the present invention.
FIG. 32 shows an example structure of table information according to the modification of the second embodiment of the present invention.

FIG. 31 illustrates the table information 540B according to the modification of the second embodiment. FIG. 31 shows the electric charge ratio R on the vertical axis and the distance D on the horizontal axis. In FIG. 31, two ranges E11 and E12 are set in accordance with the magnitude of the electric charge ratio R on the vertical axis. The range E11 is a range in which the electric charge ratio is smaller than the electric charge ratio R15. The range E12 is a range in which the electric charge ratio is equal to or greater than the electric charge ratio R15. The range E11 is an example of a first range. The range E12 is an example of a second range. The range E11 is also an example of a fourth range. The range E12 is also an example of a fifth range.

FIG. 31 shows the relationship between the electric charge ratio R and the distance D based on the table information 540B in FIG. 30. In the table information 540B, the electric charge ratio R15 is set as a threshold electric charge ratio. In this case, the electric charge ratios R11 to R14 in the range E11 have the table interval TK4. The electric charge ratios R15 to R19 in the range E12 have the table interval TK5. The interval TK4 is smaller than the interval TK5.

FIG. 31 shows an example in which the electric charge ratio R is expressed by equation (16). In other words, FIG. 31 shows a steadily rising profile in which the distance D increases as the electric charge ratio R increases. When the electric charge ratio R is expressed by equation (15), the profile declines steadily, or the distance D decreases as the electric charge ratio R increases. In this case, the threshold electric charge ratio is set to (1.0—the electric charge ratio R15), and the table interval for the electric charge ratios equal to or smaller than the threshold electric charge ratio is set coarsely (that is, widened), whereas the table interval for the electric charge ratios greater than the threshold electric charge ratio is set finely (that is, narrowed).

In this manner, in the first modification of the second embodiment, the table information 540 is created for each time window in such a way that the table interval is narrower and finer for a time window connecting part TS than for the parts other than the connecting part TS. This enables the selection of the table information 540 appropriate to each time window and more accurate distance determination even in the connecting part TS, in which a distance error is likely to occur.

Alternatively, the table information 540 may be created in such a way that the table interval is narrower and finer for the time window connecting part TS as well as for both end parts of the second time window. This enables more accurate distance determination at the time window ends, in which a distance error is likely to occur.

FIG. 32 shows an example structure of table information 540C according to the first modification of the second embodiment. As shown in FIG. 32, the table information 540C includes, for example, a time window section, a threshold electric charge ratio section, a table interval section, an electric charge ratio section, and a distance section. The time window is the same as in FIG. 29, and the table interval section, the electric charge ratio section, and the distance section are the same as in FIG. 21. These sections will thus not be described.

In the threshold electric charge ratio section, an upper limit and a lower limit are set. In the example in FIG. 32, the upper-limit threshold electric charge ratio is set to an electric charge ratio R20, and the lower-limit threshold electric charge ratio is set to an electric charge ratio R15. The set of electric charge ratios smaller than the lower-limit threshold electric charge ratio R15 (electric charge ratios R11 to R14) has a table interval TK4. The set of electric charge ratios equal to or greater than the lower-limit threshold electric charge ratio R15 and smaller than the upper-limit threshold electric charge ratio R20 (electric charge ratios R15 to R19) has a table interval TK5. The set of electric charge ratios equal to or greater than the upper-limit threshold electric charge ratio R20 (electric charge ratios R20 to R24) has a table interval TK6.

Figure 33:
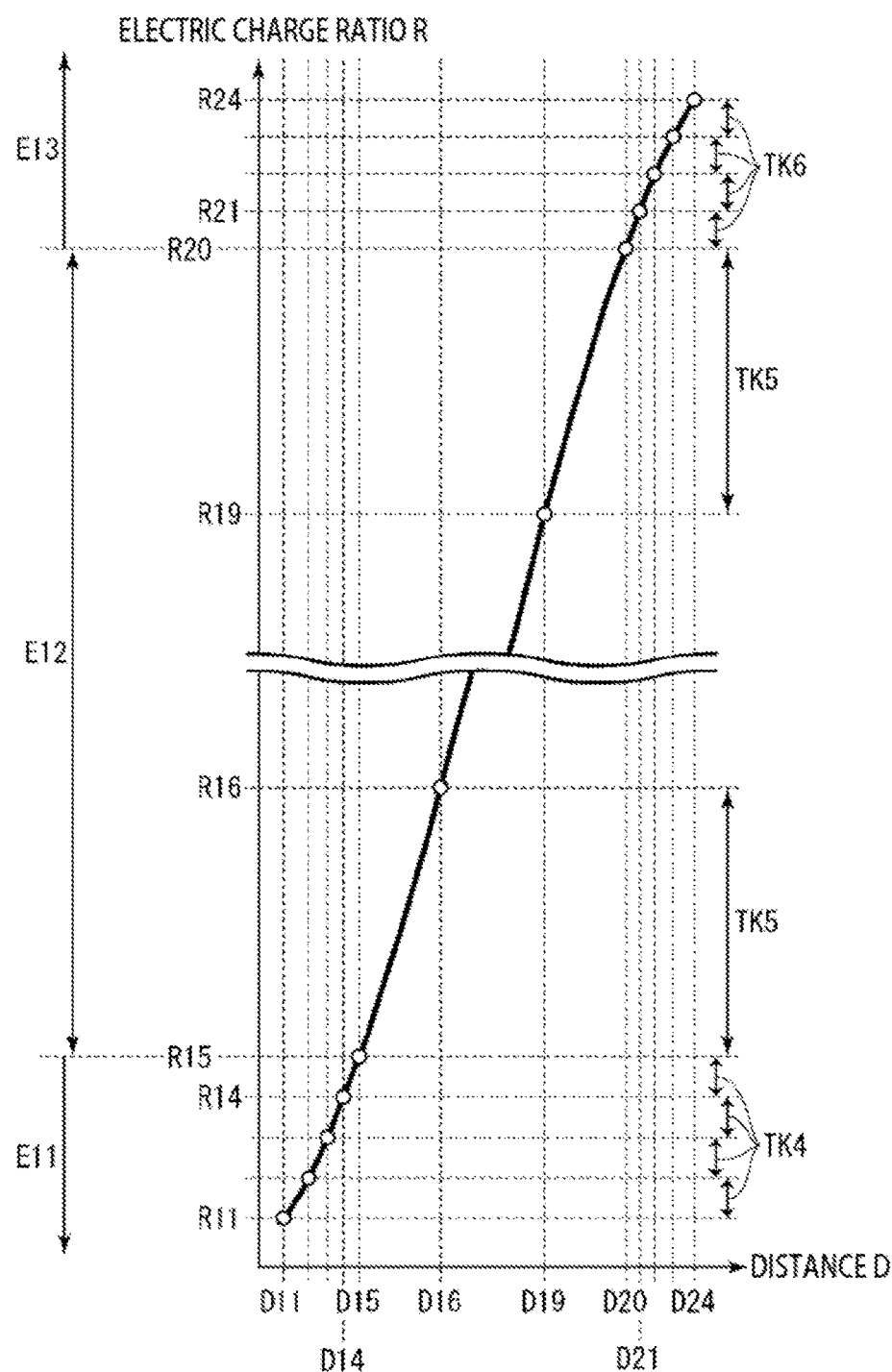
FIG. 33 illustrates the table information according to the modification of the second embodiment of the present invention.

FIG. 33 illustrates the table information 540C according to the first modification of the second embodiment. FIG. 33 shows the electric charge ratio R on the horizontal axis and the distance D on the vertical axis. In FIG. 33, three ranges E11 to E13 are set in accordance with the magnitude of the electric charge ratio R on the horizontal axis. The range E11 is a range in which the electric charge ratio is smaller than the electric charge ratio R15. The range E12 is a range in which the electric charge ratio is equal to or greater than the electric charge ratio R15 and smaller than the electric charge ratio R20. The range E13 is a range in which the electric charge ratio is equal to or greater than the electric charge ratio R20. The range E11 is an example of a first range. The range E12 is an example of a second range. The range E13 is an example of a third range. The range E11 is also an example of a fourth range. The range E12 is also an example of a fifth range. The range E13 is also an example of a sixth range.

FIG. 33 shows the relationship between the electric charge ratio R and the distance D based on the table information 540C in FIG. 32. In the table information 540C, the electric charge ratio R20 is set as the upper-limit threshold electric charge ratio, and the electric charge ratio R15 is set as the lower-limit threshold electric charge ratio. In this case, the table interval of the electric charge ratios R11 to R14 within the range E11 is the interval TK4. The table interval of the electric charge ratios R15 to R19 within the range E12 is the interval TK5. The table interval of the electric charge ratios R20 to R24 within the range E13 is the interval TK6. The interval TK4 is smaller than the interval TK5. The interval TK6 is smaller than the interval TK5.

FIG. 32 shows an example in which the electric charge ratio R is expressed by equation (16). In other words, FIG. 32 shows a steadily rising profile in which the distance D increases as the electric charge ratio R increases. When the electric charge ratio R is expressed by equation (15), the profile declines steadily, or the distance D decreases as the electric charge ratio R increases. In this case, the threshold electric charge ratios are set to (1.0—the electric charge ratio R15) and (1.0—the electric charge ratio R20). The table interval for the electric charge ratios equal to or greater than the threshold (1.0—the electric charge ratio R20) and smaller than the threshold (1.0—the electric charge ratio R15) is set coarsely (that is, widened). The table interval for the electric charge ratios smaller than the threshold (1.0—the electric charge ratio R20) is set finely (that is, narrowed). The table interval for the electric charge ratios equal to or greater than the threshold (1.0—the electric charge ratio R15) is set finely (that is, narrowed).

In this manner, in the first modification of the second embodiment, the table information 540 is created for each time window in such a way that the table interval is narrower and finer for both ends of the second time window. This enables the selection of the table information 540 appropriate to each time window and more accurate distance determination even in the time window end parts, in which a distance error is likely to occur.

In the example described above, the table information 540C is created in such a way that the table interval is narrower and finer for both ends of the second time window. However, this is not restrictive. The table information 540A may be created in such a way that the table interval is narrower and finer for both ends of the first time window. Alternatively, when the range imaging device 101 does not include multiple time windows, the table information 540 may be created in such a way that the table interval is narrower and finer for both ends of the single time window.

As described above, in the range imaging device 101 according to the first modification of the embodiment, each of the electric charge ratios R (variables) included in the table information 540 is a value within one of the ranges E11 and E12 in FIG. 31. The range E11 is a range in which the electric charge ratio R is smaller than the threshold electric charge ratio R15, and is an example of a first range. The range E12 is a range in which the electric charge ratio R is equal to or greater than the threshold electric charge ratio R15, and is an example of a second range. The table interval in the range E11 is narrower than the table interval in the range E12. Thus, even in an unbalanced state in which an error is likely to occur with the amount of accumulated electric charge Q2 # much smaller than the amount of accumulated electric charge Q1 #, the distance can be corrected with high accuracy.

In the range imaging device 101 according to the first modification of the second embodiment, the pixel 421 includes the at least three charge storage units CS. The storage unit 144 stores the table information 540 for each combination of a first charge storage unit and a second charge storage unit among the at least three charge storage units CS. The range image processing unit 4 determines the combination of the first charge storage unit and the second charge storage unit based on the amount of electric charge accumulated in the at least three charge storage units CS. The range image processing unit 104 determines, among the at least three charge storage units CS, the combination of the first charge storage unit and the second charge storage unit to be the combination of two charge storage units storing electric charge successively and having a total amount of accumulated electric charge greater than the amount of electric charge accumulated in the other combination of two charge storage units. The range image processing unit 104 selects the table information 540 in accordance with the determined combination of the first charge storage unit and the second charge storage unit. Thus, in the first modification of the second embodiment, the table information 540 can be selected appropriately for each time window, enabling the distance to be determined with higher accuracy even when each time window has a different profile.

In the range imaging device 101 according to the first modification of the second embodiment, the storage unit 144 stores the table information 540A and the table information 540B. The table information 540A is the table information 540 corresponding to the first time window and is an example of short-range information. The table information 540B is the table information 540 corresponding to the second time window and is an example of long-range information. Each of the electric charge ratios R (variables) included in the table information 540A is a value within one of the ranges E2 and E3 in FIG. 22. The table interval in the range E3 is narrower than the table interval in the range E2. Each of the electric charge ratios R (variables) included in the table information 540B is a value within one of the ranges E11 and E12 in FIG. 31. The table interval in the range E11 is narrower than the table interval in the range E12. In the range imaging device 101 according to the first modification of the second embodiment, this enables the selection of the table information 540 appropriate to each time window and also more appropriate distance selection even in the time window connecting part TS, in which a distance error is likely to occur. Accordingly, the distance can be determined with high accuracy.

Second Modification of Second Embodiment

A second modification of the second embodiment will now be described. The second modification is different from the above-described second embodiment in that the electric charge ratio R is calculated without identifying the charge storage units CS in which only the ambient light is accumulated or the two charge storage units CS in which the reflected light RL is distributed and accumulated (the charge storage units for distance calculation).

In the second modification, the distance calculation unit 142 uses the method described in Patent Literature WO2019/031510. Patent Literature WO2019/031510 describes a technique for selecting an operational expression used for distance calculation depending on whether an index value exceeds a predetermined threshold. The index value is "the distance data validity determination signal" in Patent Literature WO2019/031510. The operational expression is "the distance reference value" in Patent Literature WO2019/031510 and corresponds to "the electric charge ratio R" in the present embodiment. In the following, a specific method for calculating the electric charge ratio R is described for cases where the pixel 421 includes three charge storage units CS and where the pixel 421 includes four charge storage units CS.

(For Pixel 421 Including Three Charge Storage Units CS)

In the second modification, the distance calculation unit 142 uses equation (17) or (18) below to calculate the electric charge ratio R. In this modification, the charge storage units CS1, CS2, and CS3 store the electric charge in the stated order in accordance with the timing charts shown in FIGS. 20 and 24. In other words, the distance calculation unit 42 performs control in such a way that the charge storage units CS1, CS2, and CS3 store the electric charge in the stated order in synchronization with the emission of the optical pulse PO. In this case, the charge storage unit CS1 is an example of a first charge storage unit. The charge storage unit CS2 is an example of a second charge storage unit. The charge storage unit CS3 is an example of a third charge storage unit. The amount of electric charge accumulated in the charge storage unit CS1 is an example of a first amount of electric charge. The amount of electric charge accumulated in the charge storage unit CS2 is an example of a second amount of electric charge. The amount of electric charge accumulated in the charge storage unit CS3 is an example of a third amount of electric charge.

$$R = 1 - (Q1 - Q3)/SA \quad (17)$$

$$R = (Q1 - Q3)/SA \quad (18)$$

*In* the equations, $$SA = |Q1 - Q3| + Q2 - 0.5 \times SB,$$

$$SB = |Q1 + Q3| - |Q1 - Q3|,$$

Q1 denotes the amount of electric charge accumulated in the charge storage unit CS1, Q2 denotes the amount of electric charge accumulated in the charge storage unit CS2, and Q3 denotes the amount of electric charge accumulated in the charge storage unit CS3.

The storage unit 144 stores, for each unit amount of accumulated electric charge Qint, table information 540 in which electric charge ratios R are associated with distances. The distance calculation unit 142 calculates the unit amount of accumulated electric charge Qint and uses the table information 540 corresponding to the calculated unit amount of accumulated electric charge Qint to determine the distance associated with the electric charge ratio R as the measured distance.

(For Pixel 421 Including Four Charge Storage Units CS)

The timing of driving each pixel 421 including four charge storage units CS will be described first. In this case, for example, the section of a readout gate transistor G4 is added to FIGS. 20 and 24, and the charge storage units CS1, CS2, CS3, and CS4 store the electric charge in the stated order. In this case, the charge storage unit CS1 is an example of a first charge storage unit. The charge storage unit CS2 is an example of a second charge storage unit. The charge storage unit CS3 is an example of a third charge storage unit. The charge storage unit CS4 is an example of a fourth charge storage unit. The amount of electric charge accumulated in the charge storage unit CS1 is an example of a first amount of electric charge. The amount of electric charge accumulated in the charge storage unit CS2 is an example of a second amount of electric charge. The amount of electric charge accumulated in the charge storage unit CS3 is an example of a third amount of electric charge. The amount of electric charge accumulated in the charge storage unit CS4 is an example of a fourth amount of electric charge.

Specifically, in accordance with the timing shown in FIGS. 20 and 24, the optical pulse PO is emitted, the drain gate transistor GD is controlled to the off state, and the readout gate transistors G1 to G3 are controlled to the on state. Next, when ending the accumulation of the electric charge in the charge storage unit CS3, the vertical scanning circuit 423 turns on the readout gate transistor G4 and turns off the readout gate transistor G4 after the elapse of the accumulation time Ta. As a result, the electric charge generated through photoelectric conversion by the photoelectric conversion element PD while the readout gate transistor G4 is controlled in the on state is accumulated in the charge storage unit CS4 via the readout gate transistor G4. Next, when ending the accumulation of the electric charge in the charge storage unit CS4, the vertical scanning circuit 423 turns on the drain gate transistor GD to discharge the electric charge. As a result, the electric charge generated through photoelectric conversion by the photoelectric conversion element PD is discarded via the drain gate transistor GD.

On the basis of the amount of electric charge controlled in accordance with the above timing and accumulated in each of the charge storage units CS, the distance calculation unit 142 uses equation (19) or (20) below to calculate an electric charge ratio XR.

$$XR = 1 - (Q1 - Q3)/SA \quad (19)$$

$$XR = (Q1 - Q3)/SA \quad (20)$$

In the equations, $$SA = |Q1 - Q3| + |Q2 - Q4|,$$

Q1 denotes the amount of electric charge accumulated in the charge storage unit CS1, Q2 denotes the amount of electric charge accumulated in the charge storage unit CS2, and Q3 denotes the amount of electric charge accumulated in the charge storage unit CS3, and Q4 denotes the amount of electric charge accumulated in the charge storage unit CS4.

The distance calculation unit 142 also uses equation (21) or (22) below to calculate an electric charge ratio YR.

$$YR = 2 - (Q2 - Q4)/SA \quad (21)$$

$$YR = 1 + (Q2 - Q4)/SA \quad (22)$$

In the equations, $$SA = |Q1-Q3| + |Q2-Q4|,$$

Q1 denotes the amount of electric charge accumulated in the charge storage unit CS1,
Q2 denotes the amount of electric charge accumulated in the charge storage unit CS2, and
Q3 denotes the amount of electric charge accumulated in the charge storage unit CS3, and
Q4 denotes the amount of electric charge accumulated in the charge storage unit CS4.

The distance calculation unit 142 compares the electric charge ratio XR with a threshold ThR. The threshold ThR is set to be near the value of an electric charge ratio XR corresponding to a border area between time windows. When the electric charge ratio XR is equal to or smaller than the threshold ThR, the distance calculation unit 142 selects the electric charge ratio XR as the electric charge ratio R. In contrast, when the electric charge ratio XR exceeds the threshold ThR, the distance calculation unit 142 selects the electric charge ratio YR as the electric charge ratio R.

The storage unit 144 stores, for each unit amount of accumulated electric charge Qint, table information 540 in which electric charge ratios R are associated with distances. The distance calculation unit 142 calculates the unit amount of accumulated electric charge Qint and uses the table information 540 corresponding to the calculated unit amount of accumulated electric charge Qint to determine the distance associated with the electric charge ratio R as the measured distance.

As described above, in the range imaging device 101 according to the second modification of the second embodiment, the pixel 421 includes the three charge storage units CS1 to CS3. The range image processing unit 104 performs control in such a way that the charge storage units CS1, CS2, and CS3 store the electric charge in the stated order in synchronization with the emission of the optical pulse PO. The distance calculation unit 142 determines, as in equation (17) or (18), (Q1−Q3) as the amount of electric charge corresponding to the reflected light RL accumulated in any one charge storage unit CS of two charge storage units for distance calculation (the amount of electric charge for distance calculation). Q1 is the amount of electric charge accumulated in the charge storage unit CS1. Q3 is the amount of electric charge accumulated in the charge storage unit CS3.

In this manner, the range imaging device 101 according to the second modification of the second embodiment can calculate the amount of electric charge for distance calculation accumulated in any one of two charge storage units for distance calculation without identifying the two charge storage units for distance calculation. This allows the electric charge ratio R to be calculated by, as expressed by SA in equation (17) or (18), calculating the sum of the amounts of electric charge for distance calculation accumulated in the two charge storage units for distance calculation. Thus, the range imaging device 101 according to the second modification of the second embodiment can easily calculate the electric charge ratio R without identifying the charge storage unit CS in which only the ambient light is accumulated for the calculation of the amount of electric charge corresponding to the ambient light component Qb, depending on the length of the delay time Td. In addition, the same operational expression (equation (17) or (18)) may be used on the boundary between two time windows. This can eliminate the boundary discontinuity between time windows.

In the range imaging device 101 according to the second modification of the second embodiment, the pixel 421 may also include the four charge storage units CS1 to CS4. The range image processing unit 104 performs control in such a way that the charge storage units CS1, CS2, CS3, and CS4 store the electric charge in the stated order in synchronization with the emission of the optical pulse PO. The distance calculation unit 142 determines (Q1−Q3) as the amount of signal calculated from the amount of electric charge accumulated in one charge storage unit CS of two charge storage units for distance calculation. The distance calculation unit 142 determines (Q2−Q4) as the amount of signal calculated from the amount of electric charge accumulated in the other charge storage unit CS of the two charge storage units for distance calculation. The distance calculation unit 142 determines |Q1−Q3|+|Q2−Q4| as the sum of the amounts of signal calculated from the amount of electric charge accumulated in each charge storage unit CS of the two charge storage units for distance calculation.

Thus, the range imaging device 101 according to the second modification of the second embodiment can calculate the sum of the amounts of electric charge for distance calculation accumulated in the two charge storage units for distance calculation, the amount of electric charge for distance calculation accumulated in one of the two charge storage units for distance calculation, and the amount of electric charge for distance calculation accumulated in the other. This enables the electric charge ratio R to be calculated without identifying the two charge storage units for distance calculation.

Furthermore, in this case, the electric charge ratio XR in equation (19) and the electric charge ratio YR in equation (21) have the same value on the boundary between time windows. This can eliminate the boundary discontinuity between time windows.

In the second embodiment described above, the range image processing unit 104 includes the storage unit 144. However, this is not restrictive. The storage unit 144 may be included in a functional component different from the range image processing unit 104 as long as the storage unit 144 is included in the range imaging device 101.

In the second embodiment described above, the table interval is the difference between electric charge ratios R. However, this is not restrictive. The table interval may be the difference between distances D. To create the table information 540, an object that provides a uniform measured distance (for example, a wall) is located in a measurement space as an object OB. The electric charge of the reflected light RL is accumulated while varying the distance from the range imaging device 101 to the object OB, and the relationship between the electric charge ratio R and the distance D is acquired. In this case, near the minimum and the maximum of the measurement range, the electric charge corresponding to the reflected light RL is accumulated in an unbalanced manner, and an error is likely to occur in the distance.

For example, a configuration may have three time windows, each of which has a measurement range of about 1.8 m. In this case, an error is likely to occur in the range corresponding to the end part of each time window. The range corresponding to the end part of each time window may be, for example, the range of about 1.6 m to 1.8 m corresponding to the end part of the first time window. The range may also be the range of about 1.8 m to 2.0 m and 3.4 m to 3.6 m corresponding to both the end parts of the second time window. The range may also be the range of about 3.6 m to 3.8 m and 5.2 m to 5.4 m corresponding to both the end parts of the third time window. The table information 540 is created in such a way that the table interval is narrower and finer for these ranges. Specifically, while the distance from the range imaging device 101 to the object OB (for example, a wall) is varied finely (for example, in 0.05 m increments), the electric charge of the reflected light RL is accumulated to create the table information 540. In contrast, the table information 540 is created in such a way that the table interval is wide and coarse for the ranges not corresponding to the end part of each time window. Specifically, while the distance from the range imaging device 101 to the object OB (for example, a wall) is varied coarsely (for example, in 0.5 m increments), the electric charge of the reflected light RL is accumulated to create the table information 540.

The at least one embodiment has been described with an example in which the electric charge ratio R is the ratio of the amount of electric charge for distance calculation in any one of the two charge storage units for distance calculation to the sum of the amounts of electric charge for distance calculation accumulated in the two charge storage units for distance calculation. However, this is not restrictive. The electric charge ratio R may be any ratio as long as the ratio is expressed using the amount of electric charge for distance calculation accumulated in each of the at least two charge storage units for distance calculation. For example, the electric charge ratio R may be the ratio of the amount of electric charge for distance calculation in one of the two charge storage units for distance calculation to the amount of electric charge for distance calculation in the other.

Additionally, in the example described with reference to FIG. 25, control is performed to cause the charge storage unit CS1 to store only an amount of electric charge corresponding to the ambient light component Qb by accumulating electric charge in the charge storage unit CS1 before the emission of the optical pulse PO. However, this is not restrictive. Control may be performed to cause the charge storage unit CS3 to store electric charge after the emission of the optical pulse PO and the reception of the reflected light RL. In this case, the charge storage unit CS3 stores only an amount of electric charge corresponding to the ambient light component Qb. In this case, the charge storage unit CS3 is an example of a predetermined charge storage unit for storing ambient light.

The amount of electric charge corresponding to the ambient light component Qb may be the amount of electric charge corresponding to the ambient light component acquired in another frame or the amount of electric charge corresponding to the ambient light component acquired for a specific pixel 421 for ambient light measurement provided in the range imaging device 101. For example, even when the pixel 421 includes only two charge storage units CS, the above method enables the amount of electric charge corresponding to the ambient light component to be subtracted from the amount of electric charge accumulated in each of the two charge storage units CS. Thus, even when the pixel 421 includes only two charge storage units CS, the electric charge ratio R can be calculated.

The range imaging device 101 and the range image processing unit 104 according to the above-described embodiment may be partially or entirely implemented by a computer. In this case, programs for implementing the functions may be stored in a computer-readable storage medium, and the functions may be implemented by causing a computer system to load and execute the programs stored in the storage medium. The term "computer system" here is to be construed to cover an OS and hardware such as a peripheral device. The term "computer-readable storage medium" refers to a storage device such as a portable medium, for example, a flexible disk, a magneto-optical disk, a ROM, or a CD-ROM, or a hard disk drive incorporated in the computer system. The term "computer-readable storage medium" may further include a component that dynamically holds programs for a short period, such as a communication line used when the programs are transmitted through a network such as the internet or communication lines such as a telephone line, and also include a component that holds the programs for a certain period, such as volatile memory inside the computer system operating as a server or a client in such a case. The programs may be designed to achieve some of the above-described functions and may also be designed to achieve the functions in combination with programs prestored in the computer system. Furthermore, the programs may be implemented using a programmable logic device such as an FPGA.

Although the second embodiment of the present invention has been described in detail above with reference to the drawings, the specific components are not limited to the second embodiment. The component design may be modified without departing from the sprit and scope of the present invention.

According to an embodiment of the present invention, even with an error in the distance calculated based on the amounts of electric charge accumulated in charge storage units, the distance can be corrected to be closer to the actual distance. In other words, even with an error between the actual distance and the distance calculated based on the amounts of electric charge accumulated in the charge storage units, the calculated distance can be corrected (calculated) to be closer to the actual distance.

Known techniques for measuring the distance to an object include a technique that measures the time of flight of an optical pulse. The technique is referred to as Time of Flight (hereinafter, ToF). ToF is based on the fact that the speed of light is known and emits a near-infrared optical pulse to an object. Then, the ToF method measures the time difference between the time at which the optical pulse is emitted and the time at which the optical pulse emitted and reflected by the object is received as reflected light. The ToF method calculates the distance to the object based on the time difference. A ranging sensor that detects light for distance measurement using photodiodes (photoelectric conversion elements) has been put into practical use.

Furthermore, a ranging sensor that has recently been put into practical use is capable of obtaining not only the distance to an object but also depth information for each pixel in a two-dimensional image including the object, or in other words, three-dimensional information about the object. Such a ranging sensor is also referred to as a range imaging device. In the range imaging device, multiple pixels each including a photodiode are positioned in a two-dimensional matrix on a silicon substrate, and the pixel surface receives light reflected from an object. The range imaging device can output photoelectric conversion signals for one image that are based on the intensity of light (electric charge) received by each pixel, obtaining a two-dimensional image including the object and distance information for each pixel of the image. For example, JP 4235729 B discloses a technique for calculating the distance by sequentially distributing electric charge to three charge storage units provided for each pixel.

Such a range imaging device causes the pixels to receive light reflected from an object, photoelectrically converts the intensity of the received reflected light into electric charge, stores the resultant electric charge into the charge storage units, and calculates distance information based on the amount of the accumulated electric charge. However, the distance calculated from the amount of the accumulated electric charge may have an error from the actual distance (real distance).

A range imaging device and a range imaging method according to embodiments of the present invention correct the distance calculated based on the amounts of electric charge accumulated in charge storage units to be closer to the actual distance even if the calculated distance has an error. In other words, a range imaging device and a range imaging method according to embodiments of the present invention correct (calculate) the distance calculated based on the amounts of electric charge accumulated in charge storage units to be closer to the actual distance even with an error between the calculated distance and the actual distance.

A range imaging device according to an embodiment of the present invention includes: a light source unit that emits an optical pulse to a measurement space in which an object is located; a light-receiving unit that includes a pixel including a photoelectric conversion element for generating electric charge corresponding to incident light and multiple charge storage units for storing the electric charge, and a pixel driving circuit for distributing and accumulating the electric charge in each of the charge storage units in the pixel at a predetermined time in synchronization with the emission of the optical pulse; a storage unit that stores table information in which an electric charge ratio is associated with a corresponding distance to an object; and a range image processing unit that determines the measured distance to the object using the table information and the amount of electric charge accumulated in each of the charge storage units. The range image processing unit calculates the electric charge ratio based on the amount of electric charge accumulated in each of the charge storage units, acquires the corresponding distance associated with the calculated electric charge ratio from the table information, and determines the measured distance using the acquired corresponding distance.

In the range imaging device according to an embodiment of the present invention, the storage unit stores, for each first variable based on the amount of electric charge accumulated per unit accumulation count, the table information indicating the relationship between a second variable based on the electric charge ratio and the corresponding distance associated with the distance to the object. The first variable is a variable corresponding to the sum of the amounts of electric charge accumulated in the charge storage units per unit accumulation count. The second variable is a variable corresponding to an electric charge ratio indicated using the amount of electric charge for distance calculation obtained by subtracting an ambient light component from the amount of electric charge accumulated in, among the charge storage units, each of at least two charge storage units for distance calculation in which an amount of electric charge corresponding to reflected light being the optical pulse reflected from the object is distributed and accumulated. The range image processing unit calculates the first variable and the second variable based on the amount of electric charge accumulated in each of the charge storage units, selects the table information corresponding to the calculated first variable, acquires the corresponding distance associated with the calculated second variable using the selected table information, and determines the measured distance using the acquired corresponding distance.

In the range imaging device according to an embodiment of the present invention, the electric charge ratio is a ratio of the amount of electric charge for distance calculation in one or a combination of the at least two charge storage units for distance calculation to the sum of the amounts of electric charge for distance calculation accumulated in the charge storage units for distance calculation.

In the range imaging device according to an embodiment of the present invention, the range image processing unit calculates the first variable and the second variable based on the amount of electric charge accumulated in each of the charge storage units, selects the table information corresponding to the calculated first variable, extracts, from the selected table information, a first distance associated with an electric charge ratio smaller than the second variable and a second distance associated with an electric charge ratio greater than the second variable, and determines the measured distance through linear interpolation between the extracted first distance and the extracted second distance.

In the range imaging device according to an embodiment of the present invention, the pixel includes the at least three charge storage units, and the range image processing unit determines the smallest amount of electric charge among the amounts of electric charge accumulated in the at least three charge storage units, as the amount of electric charge corresponding to the ambient light component.

In the range imaging device according to an embodiment of the present invention, the pixel includes the at least three charge storage units. The range image processing unit controls timing of accumulation of electric charge in a predetermined charge storage unit for storing ambient light among the at least three charge storage units so as not to accumulate electric charge corresponding to the reflected light in the charge storage unit for storing ambient light, and determines the amount of electric charge accumulated in the charge storage unit for storing ambient light as the amount of electric charge corresponding to the ambient light component.

In the range imaging device according to an embodiment of the present invention, the storage unit stores first table information that is the table information associated with the first variable being smaller than a threshold, and second table information that is the table information associated with the first variable being greater than the threshold. The threshold is a value determined in accordance with the distance deviation that depends on the charge transfer efficiency on a path from the photoelectric conversion element to the charge storage unit. The range image processing unit calculates the first variable and the second variable based on the amount of electric charge accumulated in each of the charge storage units, selects the first table information when the calculated first variable is smaller than the threshold, and selects the second table information when the calculated first variable is greater than the threshold.

In the range imaging device according to an embodiment of the present invention, the storage unit stores the table information for each combination of two of the charge storage units for distance calculation. The range image processing unit determines, among the at least three charge storage units, the combination of the charge storage units for distance calculation to be the combination of two of the charge storage units storing electric charge successively and having the total amount of accumulated electric charge greater than the amount of electric charge accumulated in the other combination of two of the charge storage units, and selects the table information in accordance with the determined combination of charge storage units for distance calculation.

In the range imaging device according to an embodiment of the present invention, the pixel includes a first charge storage unit, a second charge storage unit, and a third charge storage unit as three charge storage units. The range image processing unit performs control in such a way that the first charge storage unit, the second charge storage unit, and the third charge storage unit store the electric charge in the stated order in synchronization with the emission of the optical pulse, uses the first amount of electric charge accumulated in the first charge storage unit and the third amount of electric charge accumulated in the third charge storage unit to calculate a first calculated value that is the difference between the first amount of electric charge and the third amount of electric charge, and determines the first calculated value as the amount of electric charge for distance calculation in any one of the two the charge storage units for distance calculation.

In the range imaging device according to an embodiment of the present invention, the pixel includes a first charge storage unit, a second charge storage unit, a third charge storage unit, and a fourth charge storage unit as four charge storage units. The range image processing unit controls the pixel driving circuit to accumulate the electric charge in the first charge storage unit, the second charge storage unit, the third charge storage unit, and the fourth charge storage unit in the stated order in synchronization with the emission of the optical pulse, uses the first amount of electric charge accumulated in the first charge storage unit and the third amount of electric charge accumulated in the third charge storage unit to calculate a first calculated value that is the difference between the first amount of electric charge and the third amount of electric charge, uses the second amount of electric charge accumulated in the second charge storage unit and the fourth amount of electric charge accumulated in the fourth charge storage unit to calculate a second calculated value that is the difference between the second amount of electric charge and the fourth amount of electric charge, determines an addition value obtained by adding the absolute value of the first calculated value and the absolute value of the second calculated value together, as the sum of the amounts of electric charge for distance calculation in the two charge storage units for distance calculation, determines the first calculated value as the amount of electric charge for distance calculation in one of the two charge storage units for distance calculation, and determines the second calculated value as the amount of electric charge for distance calculation in the other of the two charge storage units for distance calculation.

In the range imaging device according to an embodiment of the present invention, the electric charge ratio is a ratio indicated using the amount of electric charge for distance calculation obtained by subtracting the amount of electric charge corresponding to the ambient light component from the amount of electric charge accumulated in, among the charge storage units, each of at least two charge storage units in which electric charge corresponding to reflected light being the optical pulse reflected from the object is distributed and accumulated. The table information is created in such a way that the table information contains a table interval corresponding to the difference between adjacent ones of the variables each being the electric charge ratio or the corresponding distance in the table information and listed in ascending or descending order, and the variables in an unbalanced state in which the electric charge ratio exceeds a predetermined upper limit or is below a predetermined lower limit have a table interval smaller than the table interval of the variables not in the unbalanced state.

In the range imaging device according to an embodiment of the present invention, among the charge storage units, the charge storage unit in which the electric charge corresponding to the reflected light being the optical pulse reflected from the object is accumulated first is determined as a first charge storage unit. The charge storage unit in which the electric charge corresponding to the reflected light is accumulated next to the first charge storage unit is determined as a second charge storage unit. The amount of electric charge obtained by subtracting the amount of electric charge corresponding to the ambient light component from the first amount of electric charge accumulated in the first charge storage unit is determined as a first amount of electric charge for distance calculation. The amount of electric charge obtained by subtracting the amount of electric charge corresponding to the ambient light component from the second amount of electric charge accumulated in the second charge storage unit is determined as a second amount of electric charge for distance calculation. The electric charge ratio is a ratio of the second amount of electric charge for distance calculation to the sum of the first amount of electric charge for distance calculation and the second amount of electric charge for distance calculation. The unbalanced state is a state in which the electric charge ratio exceeds the predetermined upper limit or is below the predetermined lower limit.

In the range imaging device according to an embodiment of the present invention, each of the variables included in the table information is a value within any range of a first range with the electric charge ratio smaller than a first threshold, a second range with the electric charge ratio equal to or greater than the first threshold and smaller than a second threshold, and a third range with the electric charge ratio equal to or greater than the second threshold and smaller than a third threshold. The table interval in the third range is smaller than the table interval in the second range.

In the range imaging device according to an embodiment of the present invention, each of the variables included in the table information is a value within any range of a first range with the electric charge ratio smaller than a first threshold, a second range with the electric charge ratio equal to or greater than the first threshold and smaller than a second threshold, and a third range with the electric charge ratio equal to or greater than the second threshold and smaller than a third threshold. The table interval in the first range is smaller than the table interval in the second range.

In the range imaging device according to an embodiment of the present invention, the range image processing unit calculates the electric charge ratio based on the amount of electric charge accumulated in each of the charge storage units, extracts, from the table information, a first distance associated with an electric charge ratio smaller than the calculated electric charge ratio and a second distance associated with an electric charge ratio greater than the calculated electric charge ratio, and determines the measured distance through linear interpolation between the extracted first distance and the extracted second distance.

In the range imaging device according to an embodiment of the present invention, the pixel includes the at least three charge storage units. The range image processing unit determines the smallest amount of electric charge among the amounts of electric charge accumulated in the at least three charge storage units, as the amount of electric charge corresponding to the ambient light component.

In the range imaging device according to an embodiment of the present invention, the pixel includes the at least three charge storage units. The range image processing unit controls timing of accumulation of electric charge in a predetermined charge storage unit for storing ambient light among the at least three charge storage units so as not to accumulate electric charge corresponding to the reflected light in the charge storage unit for storing ambient light, and determines the amount of electric charge accumulated in the charge storage unit for storing ambient light as the amount of electric charge corresponding to the ambient light component.

In the range imaging device according to an embodiment of the present invention, the pixel includes a first charge storage unit, a second charge storage unit, and a third charge storage unit as three charge storage units. The range image processing unit performs control in such a way that the first charge storage unit, the second charge storage unit, and the third charge storage unit store the electric charge in the stated order in synchronization with the emission of the optical pulse, uses the first amount of electric charge accumulated in the first charge storage unit and the third amount of electric charge accumulated in the third charge storage unit to calculate a first calculated value that is the difference between the first amount of electric charge and the third amount of electric charge, and determines the first calculated value as the amount of electric charge corresponding to the reflected light accumulated in, among the three charge storage units, any one of the two charge storage units for distance calculation in which an amount of electric charge corresponding to the reflected light being the optical pulse reflected from the object is distributed and accumulated.

In the range imaging device according to an embodiment of the present invention, the pixel includes a first charge storage unit, a second charge storage unit, a third charge storage unit, and a fourth charge storage unit as four charge storage units. The range image processing unit controls the pixel driving circuit to accumulate the electric charge in the first charge storage unit, the second charge storage unit, the third charge storage unit, and the fourth charge storage unit in the stated order in synchronization with the emission of the optical pulse, uses the first amount of electric charge accumulated in the first charge storage unit and the third amount of electric charge accumulated in the third charge storage unit to calculate a first calculated value that is the difference between the first amount of electric charge and the third amount of electric charge, uses the second amount of electric charge accumulated in the second charge storage unit and the fourth amount of electric charge accumulated in the fourth charge storage unit to calculate a second calculated value that is the difference between the second amount of electric charge and the fourth amount of electric charge, determines an addition value obtained by adding the absolute value of the first calculated value and the absolute value of the second calculated value together, as the sum of the amounts of electric charge for distance calculation that are the amounts of electric charge corresponding to the reflected light accumulated in, among the four charge storage units, the two charge storage units for distance calculation in which an amount of electric charge corresponding to the reflected light being the optical pulse reflected from the object is distributed and accumulated, determines the first calculated value as the amount of electric charge for distance calculation in one of the two the charge storage units for distance calculation, and determines the second calculated value as the amount of electric charge for distance calculation in the other of the two charge storage units for distance calculation.

In the range imaging device according to an embodiment of the present invention, the pixel includes the at least three charge storage units. Among the at least three charge storage units, the charge storage unit in which the electric charge corresponding to the reflected light being the optical pulse reflected from the object is accumulated first is determined as a first charge storage unit. The charge storage unit in which the electric charge corresponding to the reflected light is accumulated next to the first charge storage unit is determined as a second charge storage unit. The storage unit stores the table information for each combination of the first charge storage unit and the second charge storage unit. The range image processing unit determines, among the at least three charge storage units, the combination of the first charge storage unit and the second charge storage unit to be the combination of two of the charge storage units storing electric charge successively and having the total amount of accumulated electric charge greater than the amount of electric charge accumulated in the other combination of two of the charge storage units, and selects the table information in accordance with the determined combination of the first charge storage unit and the second charge storage unit.

In the range imaging device according to an embodiment of the present invention, among the charge storage units, the charge storage unit in which the electric charge corresponding to the reflected light being the optical pulse reflected from the object is accumulated first is determined as a first charge storage unit. The charge storage unit in which the electric charge corresponding to the reflected light is accumulated next to the first charge storage unit is determined as a second charge storage unit. The storage unit stores short-range information that is the table information corresponding to the combination of the first charge storage unit and the second charge storage unit for storing an amount of electric charge corresponding to reflected light from the object located in a short range, and long-range information that is the table information corresponding to the combination of the first charge storage unit and the second charge storage unit for storing an amount of electric charge corresponding to reflected light from the object located in a long range. Each of the variables included in the short-range information is a value within any range of a first range with the electric charge ratio smaller than a first threshold, a second range with the electric charge ratio equal to or greater than the first threshold and smaller than a second threshold, and a third range with the electric charge ratio equal to or greater than the second threshold and smaller than a third threshold. The table interval in the third range is smaller than the table interval in the second range. Each of the variables included in the long-range information is a value within any range of a fourth range with the electric charge ratio smaller than a fourth threshold, a fifth range with the electric charge ratio equal to or greater than the fourth threshold and smaller than a fifth threshold, and a sixth range with the electric charge ratio equal to or greater than the fifth threshold and smaller than a sixth threshold. The table interval in the fourth range is smaller than the table interval in the fifth range.

A range imaging method according to an embodiment of the present invention is implemented by a range imaging device including: a light source unit that emits an optical pulse to a measurement space in which an object is located; a light-receiving unit that includes a pixel including a photoelectric conversion element for generating electric charge corresponding to incident light and multiple charge storage units for storing the electric charge, and a pixel driving circuit for distributing and accumulating the electric charge in each of the charge storage units in the pixel at a predetermined time in synchronization with the emission of the optical pulse; a storage unit that stores table information in which an electric charge ratio is associated with a corresponding distance to an object; and a range image processing unit that determines the measured distance to the object using the table information and the amount of electric charge accumulated in each of the charge storage units. The range image processing unit calculates the electric charge ratio based on the amount of electric charge accumulated in each of the charge storage units, acquires the corresponding distance associated with the calculated electric charge ratio from the table information, and determines the measured distance using the acquired corresponding distance.

The range imaging method according to an embodiment of the present invention is a range imaging method implemented by the range imaging device, in which the storage unit stores, for each first variable based on the amount of electric charge accumulated per unit accumulation count, the table information indicating the relationship between a second variable that is the electric charge ratio and the corresponding distance associated with the distance to the object. In the range imaging method according to an embodiment of the present invention, the first variable is a variable corresponding to the sum of the amounts of electric charge accumulated in the charge storage units per unit accumulation count. The second variable is a variable corresponding to an electric charge ratio indicated using the amount of electric charge for distance calculation obtained by subtracting an ambient light component from the amount of electric charge accumulated in, among the at least three charge storage units, each of at least two charge storage units for distance calculation in which an amount of electric charge corresponding to reflected light being the optical pulse reflected from the object is distributed and accumulated. The range image processing unit calculates the first variable and the second variable based on the amount of electric charge accumulated in each of the charge storage units, selects the table information corresponding to the calculated first variable, acquires the corresponding distance associated with the calculated second variable using the selected table information, and determines the measured distance using the acquired corresponding distance.

In the range imaging method according to an embodiment of the present invention, the electric charge ratio is a ratio indicated using the amount of electric charge for distance calculation obtained by subtracting the amount of electric charge corresponding to the ambient light component from the amount of electric charge accumulated in, among the charge storage units, each of at least two charge storage units in which electric charge corresponding to reflected light being the optical pulse reflected from the object is distributed and accumulated. The table information is created in such a way that the table information contains a table interval corresponding to the difference between adjacent ones of the variables each being the electric charge ratio or the corresponding distance in the table information and listed in ascending or descending order, and the variables in an unbalanced state in which the electric charge ratio exceeds a predetermined upper limit or is below a predetermined lower limit have a table interval smaller than the table interval of the variables not in the unbalanced state.

According to an embodiment of the present invention, even with an error in the distance calculated based on the amounts of electric charge accumulated in charge storage units, the distance can be corrected to be closer to the actual distance. In other words, even with an error between the actual distance and the distance calculated based on the amounts of electric charge accumulated in the charge storage units, the calculated distance can be corrected (calculated) to be closer to the actual distance.

Obviously, numerous modifications and variations of the present invention are possible in light of the above teachings. It is therefore to be understood that within the scope of the appended claims, the invention may be practiced otherwise than as specifically described herein.

The invention claimed is:

1. A range imaging device, comprising:
a light source configured to emit an optical pulse to a measurement space;
storage circuitry that stores table information in which an electric charge ratio is associated with a corresponding distance to an object;
light-receiving circuitry including a pixel driving circuit and a pixel including a photoelectric conversion element and a plurality of charge storage circuits; and
range image processing circuitry configured to determine a measured distance to the object in the measurement space using the table information and an amount of electric charge accumulated in each of the charge storage circuits,
wherein the photoelectric conversion element in the pixel of the light-receiving circuitry generates electric charge corresponding to incident light, the plurality of charge storage circuits in the pixel of the light-receiving circuitry stores the electric charge, the pixel driving circuit in the light-receiving circuitry is configured to distribute and accumulate the electric charge in each of the charge storage circuits in the pixel at a predetermined time in synchronization with emission of the optical pulse, the range image processing circuitry is configured to
calculate the electric charge ratio based on the amount of electric charge accumulated in each of the plurality of charge storage circuits,
acquire the corresponding distance associated with the calculated electric charge ratio from the table information, and
determine the measured distance using the acquired corresponding distance.

2. The range imaging device according to claim 1, wherein the storage circuitry stores the table information for each first variable based on an amount of electric charge accumulated per unit accumulation count, the table information indicating a relationship between a second variable based on the electric charge ratio and the corresponding distance associated with the distance to the object, the first variable is a variable corresponding to a sum of amounts of electric charge accumulated in the charge storage circuits per unit accumulation count, the second variable is a variable corresponding to an electric charge ratio indicated using an amount of electric charge for distance calculation, the amount obtained by subtracting an ambient light component from the amount of electric charge accumulated in, among at least three charge storage circuits, each of at least two charge storage circuits for distance calculation in which an amount of electric charge corresponding to reflected light being the optical pulse reflected from the object is distributed and accumulated, and the range image processing circuitry calculates the first variable and the second variable based on the amount of electric charge accumulated in each of the charge storage circuits, selects the table information corresponding to the calculated first variable, acquires the corresponding distance associated with the calculated second variable using the selected table information, and determines the measured distance using the acquired corresponding distance.

3. The range imaging device according to claim 2, wherein the electric charge ratio is a ratio of the amount of electric charge for distance calculation in one or a combination of the at least two charge storage circuits for distance calculation to a sum of the amounts of electric charge for distance calculation accumulated in the charge storage circuits for distance calculation.

4. The range imaging device according to claim 2, wherein the range image processing circuitry calculates the first variable and the second variable based on the amount of electric charge accumulated in each of the charge storage circuits, selects the table information corresponding to the calculated first variable, extracts, from the selected table information, a first distance associated with an electric charge ratio smaller than the second variable and a second distance associated with an electric charge ratio greater than the second variable, and determines the measured distance through linear interpolation between the extracted first distance and the extracted second distance.

5. The range imaging device according to claim 2, wherein the pixel includes the at least three charge storage circuits, and the range image processing circuitry determines a smallest amount of electric charge among the amounts of electric charge accumulated in the at least three charge storage circuits, as an amount of electric charge corresponding to the ambient light component.

6. The range imaging device according to claim 2, wherein the pixel includes the at least three charge storage circuits, and the range image processing circuitry controls timing of accumulation of electric charge in a predetermined charge storage circuit for storing ambient light among the at least three charge storage circuits so as not to accumulate electric charge corresponding to the reflected light in the charge storage circuit for storing ambient light, and determines the amount of electric charge accumulated in the charge storage circuit for storing ambient light as an amount of electric charge corresponding to the ambient light component.

7. The range imaging device according to claim 2, wherein the storage circuit stores first table information being the table information associated with the first variable being smaller than a threshold, and second table information being the table information associated with the first variable being greater than the threshold, the threshold is a value determined in accordance with charge transfer efficiency on a path from the photoelectric conversion element to the charge storage circuit, and the range image processing circuitry calculates the first variable and the second variable based on the amount of electric charge accumulated in each of the charge storage circuits, selects the first table information when the calculated first variable is smaller than the threshold, and selects the second table information when the calculated first variable is greater than the threshold.

8. The range imaging device according to claim 2, wherein the storage circuitry stores the table information for each combination of two of the charge storage circuits for distance calculation, and the range image processing circuitry determines, among the at least three charge storage circuits, a combination of the charge storage circuits for distance calculation to be a combination of two of the charge storage circuits storing electric charge successively and having a total amount of accumulated electric charge greater than an amount of electric charge accumulated in another combination of two of the charge storage circuits, and selects the table information in accordance with the determined combination of the charge storage circuits for distance calculation.

9. The range imaging device according to claim 2, wherein the pixel includes a first charge storage circuit, a second charge storage circuit, and a third charge storage circuit as three charge storage circuits, and the range image processing circuitry performs control in such a way that the first charge storage circuit, the second charge storage circuit, and the third charge storage circuit store the electric charge in stated order in synchronization with the emission of the optical pulse, uses a first amount of electric charge accumulated in the first charge storage circuit and a third amount of electric charge accumulated in the third charge storage circuit to calculate a first calculated value being a difference between the first amount of electric charge and the third amount of electric charge, and determines the first calculated value as the amount of electric charge for distance calculation in any one of the two charge storage circuits for distance calculation.

10. The range imaging device according to claim 2, wherein the pixel includes a first charge storage circuit, a second charge storage circuit, a third charge storage circuit, and a fourth charge storage circuit as four charge storage circuits, and the range image processing circuitry controls the pixel driving circuit to accumulate the electric charge in the first charge storage circuit, the second charge storage circuit, the third charge storage circuit, and the fourth charge storage circuit in stated order in synchronization with the emission of the optical pulse, uses a first amount of electric charge accumulated in the first charge storage circuit and a third amount of electric charge accumulated in the third charge storage circuit to calculate a first calculated value being a difference between the first amount of electric charge and the third amount of electric charge, uses a second amount of electric charge accumulated in the second charge storage circuit and a fourth amount of electric charge accumulated in the fourth charge storage circuit to calculate a second calculated value being a difference between the second amount of electric charge and the fourth amount of electric charge, determines an addition value obtained by adding an absolute value of the first calculated value and an absolute value of the second calculated value together, as a sum of the amounts of electric charge for distance calculation in the two charge storage circuits for distance calculation, determines the first calculated value as the amount of electric charge for distance calculation in one of the two charge storage circuits for distance calculation, and determines the second calculated value as the amount of electric charge for distance calculation in the other of the two charge storage circuits for distance calculation.

11. The range imaging device according to claim 1, wherein the electric charge ratio is a ratio indicated using an amount of electric charge for distance calculation, the amount obtained by subtracting an amount of electric charge corresponding to an ambient light component from the amount of electric charge accumulated in, among the plurality of charge storage circuits, each of at least two charge storage circuits in which electric charge corresponding to reflected light being the optical pulse reflected from the object is distributed and accumulated, and the table information is created in such a way that the table information contains a table interval corresponding to a difference between adjacent ones of variables each being the electric charge ratio or the corresponding distance in the table information and listed in ascending or descending order, and the variables in an unbalanced state in which the electric charge ratio exceeds a predetermined upper limit or is below a predetermined lower limit have a table interval smaller than a table interval of the variables not in the unbalanced state.

12. The range imaging device according to claim 11, wherein among the plurality of charge storage circuits, the charge storage circuit in which the electric charge corresponding to the reflected light being the optical pulse reflected from the object is accumulated first is determined as a first charge storage circuit, the charge storage circuit in which the electric charge corresponding to the reflected light is accumulated next to the first charge storage circuit is determined as a second charge storage circuit, the amount of electric charge obtained by subtracting the amount of electric charge corresponding to the ambient light component from a first amount of electric charge accumulated in the first charge storage circuit is determined as a first amount of electric charge for distance calculation, the amount of electric charge obtained by subtracting the amount of electric charge corresponding to the ambient light component from a second amount of electric charge accumulated in the second charge storage circuit is determined as a second amount of electric charge for distance calculation, the electric charge ratio is a ratio of the second amount of electric charge for distance calculation to a sum of the first amount of electric charge for distance calculation and the second amount of electric charge for distance calculation, and the unbalanced state is a state in which the electric charge ratio exceeds the predetermined upper limit or is below the predetermined lower limit.

13. The range imaging device according to claim 11, wherein each of the variables included in the table information is a value within any range of a first range with the electric charge ratio smaller than a first threshold, a second range with the electric charge ratio equal to or greater than the first threshold and smaller than a second threshold, and a third range with the electric charge ratio equal to or greater than the second threshold, and the table interval in the first range or third range is smaller than the table interval in the second range.

14. The range imaging device according to claim 11, wherein the range image processing circuitry calculates the electric charge ratio based on the amount of electric charge accumulated in each of the plurality of charge storage circuits, extracts, from the table information, a first distance associated with an electric charge ratio smaller than the calculated electric charge ratio and a second distance associated with an electric charge ratio greater than the calculated electric charge ratio, and determines the measured distance through linear interpolation between the extracted first distance and the extracted second distance.

15. The range imaging device according to claim 11, wherein the pixel includes at least three charge storage circuits, and the range image processing circuitry determines a smallest amount of electric charge among the amounts of electric charge accumulated in the at least three charge storage circuits, as an amount of electric charge corresponding to the ambient light component.

16. The range imaging device according to claim 11, wherein the pixel includes at least three charge storage circuits, and the range image processing circuitry controls timing of accumulation of electric charge in a predetermined charge storage circuit for storing ambient light among the at least three charge storage circuits so as not to accumulate electric charge corresponding to the reflected light in the charge storage circuit for storing ambient light, and determines the amount of electric charge accumulated in the charge storage circuit for storing ambient light as an amount of electric charge corresponding to the ambient light component.

17. The range imaging device according to claim 11, wherein the pixel includes a first charge storage circuit, a second charge storage circuit, and a third charge storage circuit as three charge storage circuits, and the range image processing circuitry performs control in such a way that the first charge storage circuit, the second charge storage circuit, and the third charge storage circuit store the electric charge in the stated order in synchronization with the emission of the optical pulse, uses a first amount of electric charge accumulated in the first charge storage circuit and a third amount of electric charge accumulated in the third charge storage circuit to calculate a first calculated value being a difference between the first amount of electric charge and the third amount of electric charge, and determines the first calculated value as the amount of electric charge corresponding to reflected light accumulated in, among the three charge storage circuits, any one of the two charge storage circuits for distance calculation in which an amount of electric charge corresponding to the reflected light being the optical pulse reflected from the object is distributed and accumulated.

18. The range imaging device according to claim 11, wherein the pixel includes a first charge storage circuit, a second charge storage circuit, a third charge storage circuit, and a fourth charge storage circuit as four charge storage circuits, and the range image processing circuitry controls the pixel driving circuit to accumulate the electric charge in the first charge storage circuit, the second charge storage circuit, the third charge storage circuit, and the fourth charge storage circuit in the stated order in synchronization with the emission of the optical pulse, uses a first amount of electric charge accumulated in the first charge storage circuit and a third amount of electric charge accumulated in the third charge storage circuit to calculate a first calculated value being a difference between the first amount of electric charge and the third amount of electric charge, uses a second amount of electric charge accumulated in the second charge storage circuit and a fourth amount of electric charge accumulated in the fourth charge storage circuit to calculate a second calculated value being a difference between the second amount of electric charge and the fourth amount of electric charge, determines an addition value obtained by adding an absolute value of the first calculated value and an absolute value of the second calculated value together, as a sum of the amounts of electric charge for distance calculation being the amounts of electric charge corresponding to the reflected light accumulated in, among the four charge storage circuits, the two charge storage circuits for distance calculation in which an amount of electric charge corresponding to the reflected light being the optical pulse reflected from the object is distributed and accumulated, determines the first calculated value as the amount of electric charge for distance calculation in one of the two charge storage circuits for distance calculation, and determines the second calculated value as the amount of electric charge for distance calculation in the other of the two charge storage circuits for distance calculation.

19. The range imaging device according to claim 11, wherein the pixel includes the at least three charge storage circuits, among the at least three charge storage circuits, the charge storage circuit in which the electric charge corresponding to the reflected light being the optical pulse reflected from the object is accumulated first is determined as a first charge storage circuit, the charge storage circuit in which the electric charge corresponding to the reflected light is accumulated next to the first charge storage circuit is determined as a second charge storage circuit, the storage circuitry stores the table information for each combination of the first charge storage circuit and the second charge storage circuit, and the range image processing circuitry determines, among the at least three charge storage circuits, a combination of the first charge storage circuit and the second charge storage circuit to be a combination of two of the charge storage circuits storing electric charge successively and having a total amount of accumulated electric charge greater than an amount of electric charge accumulated in another combination of two of the charge storage circuits, and selects the table information in accordance with the determined combination of the first charge storage circuit and the second charge storage circuit.

20. The range imaging device according to claim 11, wherein among the plurality of charge storage circuits, the charge storage circuit in which an amount of electric charge corresponding to the reflected light being the optical pulse reflected from the object is accumulated first is determined as a first charge storage circuit, the charge storage circuit in which an amount of electric charge corresponding to the reflected light is accumulated next to the first charge storage circuit is determined as a second charge storage circuit, the storage circuitry stores short-range information being the table information corresponding to a combination of the first charge storage circuit and the second charge storage circuit configured to store an amount of electric charge corresponding to reflected light from the object located in a short range, and long-range information being the table information corresponding to a combination of the first charge storage circuit and the second charge storage circuit configured to store an amount of electric charge corresponding to reflected light from the object located in a long range, each of the variables included in the short-range information is a value within any range of a first range with the electric charge ratio smaller than a first threshold, a second range with the electric charge ratio equal to or greater than the first threshold and smaller than a second threshold, and a third range with the electric charge ratio equal to or greater than the second threshold, the table interval in the third range is smaller than the table interval in the second range, each of the variables included in the long-range information is a value within any range of a fourth range with the electric charge ratio smaller than a fourth threshold, a fifth range with the electric charge ratio equal to or greater than the fourth threshold and smaller than a fifth threshold, and a sixth range with the electric charge ratio equal to or greater than the fifth threshold, and the table interval in the fourth range is smaller than the table interval in the fifth range.

21. A range imaging method, comprising:
emitting an optical pulse to a measurement space; and
determining a measured distance to an object in the measurement space using table information and an amount of electric charge accumulated in each of charge storage circuits,
wherein a range imaging device is configured to execute the range imaging method and includes a light source configured to emit the optical pulse to the measurement space, a storage circuitry unit that stores the table information in which an electric charge ratio is associated with a corresponding distance to the object, a light-receiving circuitry including and a pixel driving circuit and a pixel including a photoelectric conversion element and a plurality of charge storage circuits, and a range image processing circuitry comprising circuitry configured to determine the measured distance to the object in the measurement space using the table information and the amount of electric charge accumulated in each of the charge storage circuits, the photoelectric conversion element in the pixel of the light-receiving circuitry generates the electric charge corresponding to incident light, the plurality of charge storage circuits in the pixel of the light-receiving circuitry stores the electric charge, the pixel driving circuit in the light-receiving circuitry is configured to distribute and accumulate the electric charge in each of the charge storage circuits in the pixel at a predetermined time in synchronization with emission of the optical pulse, the circuitry of the range image processing circuitry is configured to calculate the electric charge ratio based on the amount of electric charge accumulated in each of the plurality of charge storage circuits, acquire the corresponding distance associated with the calculated electric charge ratio from the table information, and determine the measured distance using the acquired corresponding distance.

22. The range imaging method implemented by the range imaging device according to claim 21, wherein the storage circuitry stores the table information for each first variable based on an amount of electric charge accumulated per unit accumulation count, the table information indicating a relationship between a second variable being the electric charge ratio and the corresponding distance associated with the distance to the object, the first variable is a variable corresponding to a sum of amounts of electric charge accumulated in the charge storage circuits per unit accumulation count, the second variable is a variable corresponding to an electric charge ratio indicated using an amount of electric charge for distance calculation, the amount obtained by subtracting an ambient light component from the amount of electric charge accumulated in, among at least three charge storage circuits, each of at least two charge storage circuits for distance calculation in which an amount of electric charge corresponding to reflected light being the optical pulse reflected from the object is distributed and accumulated, and the range image processing circuitry calculates the first variable and the second variable based on the amount of electric charge accumulated in each of the charge storage circuits, selects the table information corresponding to the calculated first variable, acquires the corresponding distance associated with the calculated second variable using the selected table information, and determines the measured distance using the acquired corresponding distance.

23. The range imaging method according to claim 21, wherein the electric charge ratio is a ratio indicated using an amount of electric charge for distance calculation, the amount obtained by subtracting an amount of electric charge corresponding to an ambient light component from the amount of electric charge accumulated in, among the plurality of charge storage circuits, each of at least two charge storage circuits in which electric charge corresponding to reflected light being the optical pulse reflected from the object is distributed and accumulated, the table information is created such that the table information contains a table interval corresponding to a difference between adjacent ones of variables each being the electric charge ratio or the corresponding distance in the table information and listed in ascending or descending order, and the variables in an unbalanced state in which the electric charge ratio exceeds a predetermined upper limit or is below a predetermined lower limit have a table interval smaller than a table interval of the variables not in the unbalanced state.

24. The range imaging device according to claim 1, wherein the pixel driving circuit in the light-receiving circuitry is configured to distribute and accumulate the electric charge in each of the charge storage circuits in the pixel at a predetermined time in synchronization with the emission of the optical pulse starting at the emission of the optical pulse.

* * * * *